United States Patent
Tanaka et al.

(10) Patent No.: US 6,433,824 B1
(45) Date of Patent: Aug. 13, 2002

(54) APPARATUS FOR PICKING UP IMAGES OF PHOTOGRAPHED AND UNPHOTOGRAPHED SUBJECTS

(75) Inventors: Taeko Tanaka, Yokohama; Hitoshi Yasuda, Tokyo, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/998,053

(22) Filed: Dec. 24, 1997

(30) Foreign Application Priority Data

Dec. 9, 1906 (JP) .......................................... 80-349313
Dec. 27, 1996 (JP) ...................................... HEI08-349312

(51) Int. Cl.[7] ...................... H04N 5/253; H04N 5/232; H04N 5/225
(52) U.S. Cl. .......................... 348/345; 348/358; 348/96
(58) Field of Search ........................... 348/96, 107, 110, 348/373, 375, 358, 345

(56) References Cited

U.S. PATENT DOCUMENTS

| | | | | |
|---|---|---|---|---|
| 4,553,170 A | * | 11/1985 | Aoki et al. | 348/221 |
| 5,293,242 A | * | 3/1994 | Mamiya | 348/373 |
| 5,638,122 A | * | 6/1997 | Kawaguchi et al. | 348/349 |
| 5,757,430 A | * | 5/1998 | Maeda et al. | 348/373 |
| 5,767,989 A | * | 6/1998 | Sakaguchi | 348/96 |
| 5,815,745 A | * | 9/1998 | Ohsawa | 396/76 |
| 5,933,187 A | * | 8/1999 | Hirasawa et al. | 348/358 |

* cited by examiner

*Primary Examiner*—Wendy R. Garber
*Assistant Examiner*—Rashawn N. Tillery
(74) *Attorney, Agent, or Firm*—Robin, Blecker & Daley

(57) ABSTRACT

An image pickup apparatus includes a first mode for picking up an image of a subject located at a close distance and a second mode for performing normal photography, and is arranged to vary the moving range of a variator lens and/or the characteristics of an automatic focus adjustment device during the first mode.

26 Claims, 35 Drawing Sheets

$$ax = ak - \frac{(Zk - Zx)(ak - ak\text{-}1)}{(Zk - Zk\text{-}1)}$$

$$bx = bk - \frac{(Zk - Zx)(bk - bk\text{-}1)}{(Zk - Zk\text{-}1)}$$

F I G. 30
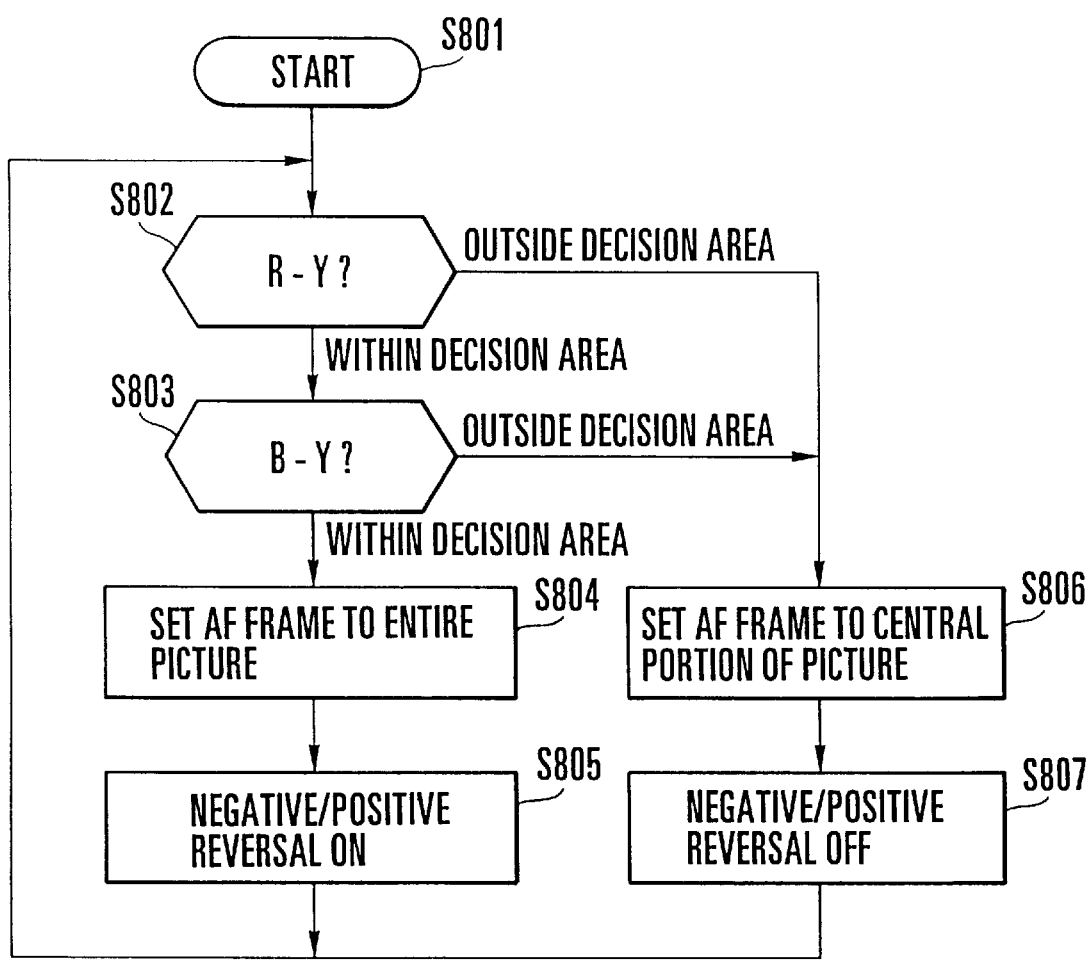

F I G. 36(a)
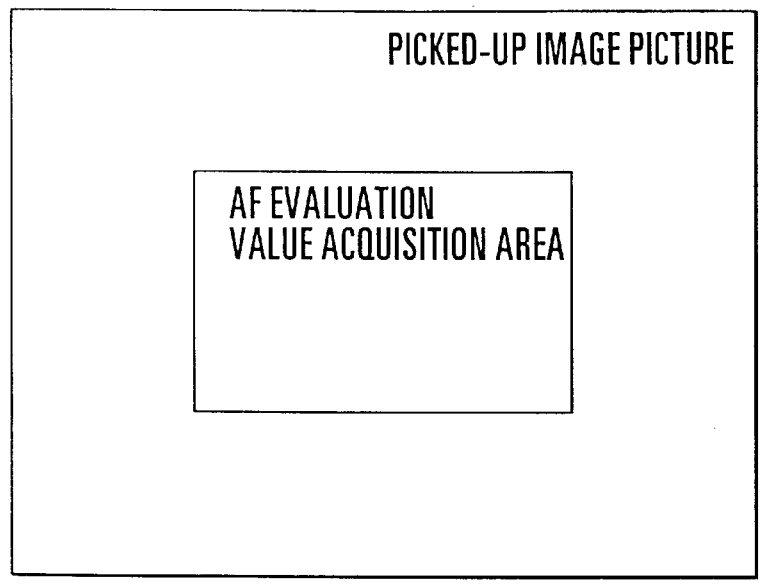
F I G. 36(b)
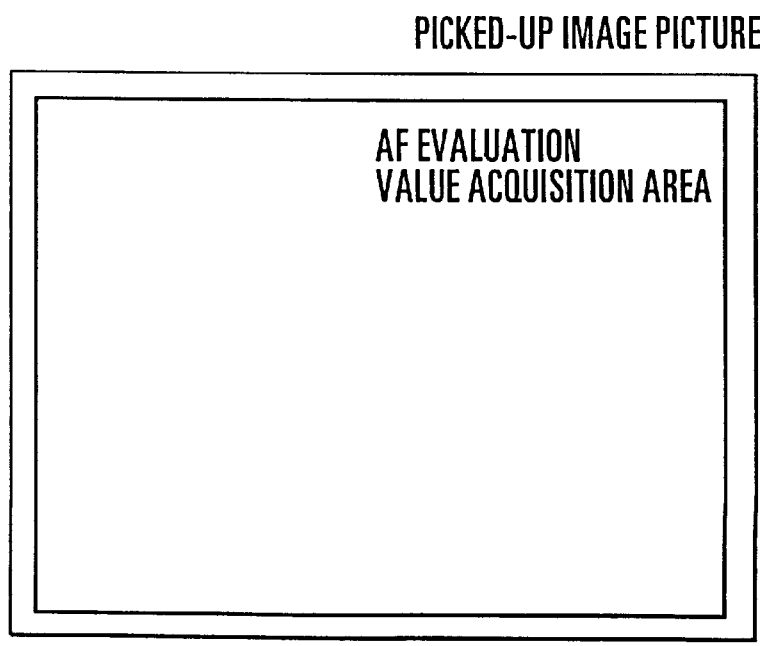

APPARATUS FOR PICKING UP IMAGES OF PHOTOGRAPHED AND UNPHOTOGRAPHED SUBJECTS

BACKGROUND OF THE INVENTION

1. Field of the Invention

The present invention relates to an image pickup apparatus suitable for use in a video camera which has a mode for photographing a subject located at a predetermined distance and is equipped with an adapter for holding a film original at the predetermined distance so that the film original is photographed, and, more specifically, to lens control in the image pickup apparatus.

2. Description of Related Art

With rapid technical improvements in personal computers and peripherals, it has been becoming easier for photographers to store, for example, photographs taken with cameras using silver-halide film in memories of personal computers and edit the stored photographs to create their original picture postcards or posters, and the demand for the field of such art has been becoming greater in markets year after year.

To input a photograph to a personal computer, it is necessary to convert image information of a photograph into an electrical signal by using a video camera, so that a device for fixing the position of a subject such as a photograph becomes necessary. Since photographs are printed on printing paper in variously different sizes, an awkward operation is needed to set a field angle and correct lighting for each photograph. It is also necessary to prepare a large-sized dedicated image pickup apparatus having a fixing base for a video camera.

FIG. 1 shows a manner in which a negative film 901 held in a film holder 902 is photographed by using a VTR-integrated type camera 904 with a film adapter 903 attached thereto. The negative film;901 is illuminated from its rear side by a backlight (not shown) provided in the film adapter 903, and a transmitted image is photographed by the VTR-integrated type camera 904. If the VTR-integrated type camera 904 has the function of converting a negative image into a positive image (a negative/positive conversion function), the electrical signal outputted from the VTR-integrated type camera 904 is a video signal indicative of a positive image even during the photography of the negative film 901. If this video signal is inputted to a personal computer 905, the positive image can be stored in a memory provided in the personal computer 905. In the method shown in FIG. 1, since the size of each frame of the negative film 901 is uniform and only the backlight can be used as a light source, a photographic image can be stored in the personal computer 905 far more readily than when an image of a photograph printed on printing paper is picked up.

FIG. 2 shows a lens system called an inner focus type lens system, which includes a fixed first lens group 102, a variator lens 103, an iris 104, a fixed third lens group 105 and a focusing/compensating lens 106. Reference numeral 107 denotes an image pickup element such as a CCD, the image pickup surface of which is shown in FIG. 2.

FIG. 3 shows the image pickup surface in-focus position of the focusing/compensating lens 106 with respect to the subject distance for leach focal length. In FIG. 3, the horizontal axis represents the position of the variator lens 103, while the vertical axis represents the position of the focusing/compensating lens 106. As can be seen from FIG. 3, in the lens system shown in FIG. 2, if the focusing/compensating lens 106 is moved to focus an image on the image pickup element 107, the position of the focusing/compensating lens 106 with respect to the subject distance varies for each local length. It is known that when the variator lens 103 is on a shortest focal length side, if the focusing/compensating lens 106 is moved to the vicinity of its closest-distance end, a minimum subject distance which can be focused by the focusing/compensating lens 106 is reduced to an immediately close distance from the first lens group 102. In FIG. 3, a curve 601 represents an in-focus curve relative to an extremely short subject distance which is several centimeters to the first lens group 102, and it can be seen from FIG. 3 that the lens-focusable focal length area of the variator lens 103 with respect to this subject distance is a limited area 602 which extends from the wide-angle end to a point A on a short focal length side. Accordingly, if an in-focus image is to be obtained on the image pickup element 107 when a film lying at an extremely close distance from the fixed first lens group 102 is being photographed by using the film adapter 903 shown in FIG. 1, the combination of the positions of the variator lens 103 and the focusing/compensating lens 106 must be contained in a portion 604 defined by three areas 601, 602 and 603 in FIG. 3.

A method of maintaining an in-focus state during zooming in the inner focus type lens system will be described below. In FIG. 3, the position of the focusing/compensating lens 106 for focusing an image on the image pickup element 107 is continuously plotted with respect to different subject distances for each focal length. During zooming, a cam locus is selected from among the loci of FIG. 3 according to the subject distance, and if the focusing/compensating lens 106 is moved along the selected cam locus, zooming free of defocusing can be effected.

FIG. 4 is a view aiding in describing one example of a locus tracing method which has previously been proposed. In FIG. 4, Z0, Z1, Z2, ..., Z6 indicate the position of a variator lens, a0, a1, a2, ..., a6 and b0, b1, b2, ..., b6 respectively indicate representative loci stored in a lens control microcomputer, and p0, p1, p2, ..., p6 indicate a locus calculated on the basis of the two loci. An equation for calculating this locus is shown below:

$$p(n+1)=(|p(n)-a(n)|/|b(n)-a(n)|)\times|b(n+1)-a(n+1)|+a(n+1). \quad (1)$$

According to Equation (1), for example, if a focusing/compensating lens is located at the point p0 in FIG. 4, the ratio in which the point p0 internally divides a line segment b0–a0 is obtained, and a point which internally divides a line segment b1–a1 in accordance with that ratio is determined as p1. The moving speed of the focusing/compensating lens required to keep an in-focus state can be found from the p1–p0 positional difference and the time required for the variator lens to move from Z0 to Z1.

A case in which the stop position of the variator lens is not limited only to boundaries having stored representative locus data will be described below with reference to FIG. 5. FIG. 5 is a view aiding in describing a method for interpolating the position of the variator lens. FIG. 5 is an extracted portion of FIG. 4 and shows a case in which the variator lens can be stopped at an arbitrary stop position.

In FIG. 5, the vertical and horizontal axes respectively represent the position of the focusing/compensating lens and the position of the variator lens. Letting Z0, Z1, ..., Zk–1, Zk, ... Zn represent the position of the variator lens, the corresponding positions of the focusing/compensating lens for different subject distances, i.e., the representative locus positions (the position of the focusing/compensating lens relative to the position of the variator lens) stored in the lens control microcomputer are as follows:

$$a0, a1, \ldots, ak-1, ak, \ldots an,$$

$$b0, b1, \ldots, bk-1, bk, \ldots bn.$$

If it is now assumed that the position of the variator lens is Zx which is not a zoom boundary position and that the position of the focusing/compensating lens is px, positions ax and bx are obtained as follows:

$$ax=ak-(Zk-Zx)\times(ak-ak-1)/(Zk-Zk-1), \quad (2)$$

$$bx=bk-(Zk-Zx)\times(bk-bk-1)/(Zk-Zk-1). \quad (3)$$

Specifically, in accordance with an internal ratio which is obtained from the current position of the variator lens and two adjacent opposite zoom boundary positions (for example, Zk and Zk−1 in FIG. 5), locus data corresponding to the same subject distance are selected from among four stored representative locus data (ak, ak−1, bk, bk−1 in FIG. 5) and are internally divided by the internal ratio shown by the above equation (1), whereby ax and bx can be obtained.

Then, in accordance with an internal ratio which is obtained from ax, px and bx, the locus data corresponding to the same focal length, which are selected from among the four stored representative locus data (ak, ak−1, bk, bk−1 in FIG. 5), are internally divided by the internal ratio shown by the above equation (1), whereby pk and pk−1 can be obtained. Furthermore, during zooming from the wide-angle end toward the telephoto end, the moving speed of the focusing/compensating lens required to keep an in-focus state can be found from the difference between the target focus position pk and the current focus position px and the time required for the variator lens to move from Zx to Zk. Furthermore, during zooming from the telephoto end toward the wide-angle end, the moving speed of the focusing/compensating lens required to keep an in-focus state can be found from the difference between the target focus position pk−1 and the current focus position px and the time required for the variator lens to move from Zx to Zk−1. The above-described locus tracing method has been devised.

However, the above-described conventional example has the problem that if a negative film or a slide film is to be photographed by using a film adapter or the like, a lens-nonfocusable focal length area occurs, and if the film adapter is attached when the, variator lens is in such area, the subject cannot be focused and is placed in a greatly defocused state.

In addition, an automatic focus adjustment (AF) operation, if it is similar in operational characteristic to that during normal photography, offers the problem of causing a malfunction during photography using a film adapter or the like. For example, the essential portion of a subject is not always located in the center of a frame of a film, or if a film is moved to a slight extent, the AF operation may be restarted even if a subject distance does not vary.

BRIEF SUMMARY OF THE INVENTION

The present invention has been made to solve the above-described problems, and its first object is to prevent a malfunction by optimizing characteristics such as zooming characteristics and AF characteristics during an image pickup operation using an accessory such as a film adapter.

A second object of the present invention is to make it possible to bring a focusing/compensating lens into focus even if a variator lens lies in a lens-nonfocusable focal length area, by forcedly moving, when photography is to be performed with a film adapter or the like, the variator lens to a lens-focusable focal length area while causing the focusing/compensating lens to trace an in-focus cam locus as accurately as possible.

To achieve the above objects, in accordance with one aspect of the present invention, there is provided an image pickup apparatus which comprises first lens means for varying a focal length and performing a magnification varying operation, second lens means for performing focus adjustment, image pickup means for picking up a subject image passing through the first and second lens means and converting the picked-up subject image into an electrical signal, setting means for setting a mode for picking up an image of a subject located at a predetermined distance, detecting means for detecting a setting of the mode, and control means for performing control for shifting an area in which the first lens means is movable during the magnification varying operation to a predetermined area when the setting of the mode is detected by the detecting means.

In accordance with another aspect of the present invention, there is provided an image pickup apparatus which comprises first lens means for varying a focal length and performing a magnification varying operation, second lens means for performing focus adjustment, image pickup means for picking up a subject image passing through the first and second lens means and converting the picked-up subject image into an electrical signal, setting means for setting a mode for picking up an image of a subject located at a predetermined distance, detecting means for detecting setting of the mode, and control means for performing control for forcedly moving the first lens means to a lens-focusable focal length area when the setting of the mode is detected by the detecting means.

A third object of the present invention is to provide an image pickup apparatus capable of automatically performing zooming free of defocusing during the attachment of a film adapter.

A fourth object of the present invention is to provide a stable and highly reliable image pickup apparatus which does not cause defocusing due to malfunction of AF nor malfunction due to movement of film during the attachment of a film adapter.

A fifth object of the present invention is to solve the above-described problems by making a wobbling amplitude larger than a normal wobbling amplitude so as to correctly determine in which direction to move a focusing/compensating lens, or by shortening a focusing time by increasing a hill-climbing speed, or by setting the amount of decrease in an AF evaluation signal value which is used for detecting whether the focusing/compensating lens has reached a peak, to a value larger than a normal amount, because there is no possibility that recording of a film, a print or the like in an out-of-focus state is performed during photography using a film adapter or the like; or by shortening the focusing time by omitting the operation of confirming through wobbling whether the focusing/compensating lens is in focus at the peak, or by increasing a restart determining time and preventing the driving of the focusing/compensating lens from being unnecessarily restarted, because panning does not occur during photography using a film adapter or the like.

A sixth object of the present invention is to provide an image pickup apparatus which does not perform an AF restart operation based on a variation in the state of a subject but performs an AF restart operation only when any key or the like is operated, because a subject distance is constant at all times when a film, a print or the like is being photographed by using a film adapter or the like.

A seventh object of the present invention is to provide an image pickup apparatus capable of enlarging an AF evaluation value acquisition area as shown in FIG. 36(b) to ensure a wider AF evaluation value acquisition area, because, when a film, a print or the like is being photographed by using a film adapter or the like, a subject distance is constant and a contention in focusing between a distant subject and a near subject need not be taken into account.

The above and other objects, features and advantages of the present invention will become apparent from the following detailed description of preferred embodiments of the present invention, taken in conjunction with the accompanying drawings.

BRIEF DESCRIPTION OF SEVERAL VIEWS OF THE DRAWINGS

FIG. 30 is a flowchart of the operation of detecting whether a subject to be photographed is a negative film and selecting an AF mode, in the sixteenth embodiment;

FIGS. 36(a) and 36(b) are schematic views showing different AF evaluation value acquisition areas.

DETAILED DESCRIPTION OF THE INVENTION

Preferred embodiments of an image pickup apparatus according to the present invention will be described below in detail with reference to the accompanying drawings.

(First Embodiment)

Figure 6:
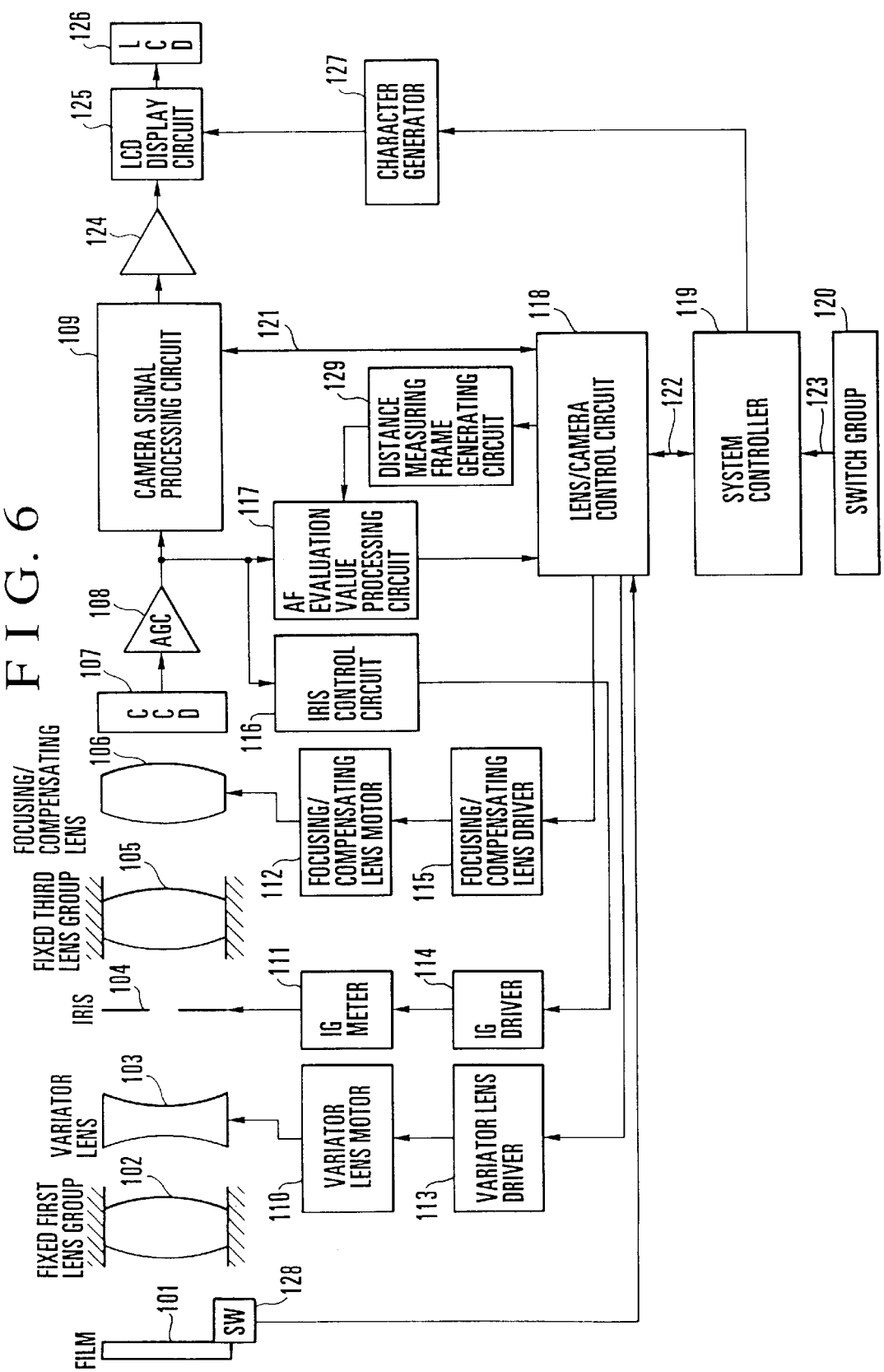
FIG. 6 is a block diagram showing the construction of an image pickup apparatus according to each of first, third and fifth embodiments of the present invention.

FIG. 6 is a block diagram showing an image pickup apparatus according to a first embodiment of the present invention.

Figure 1:
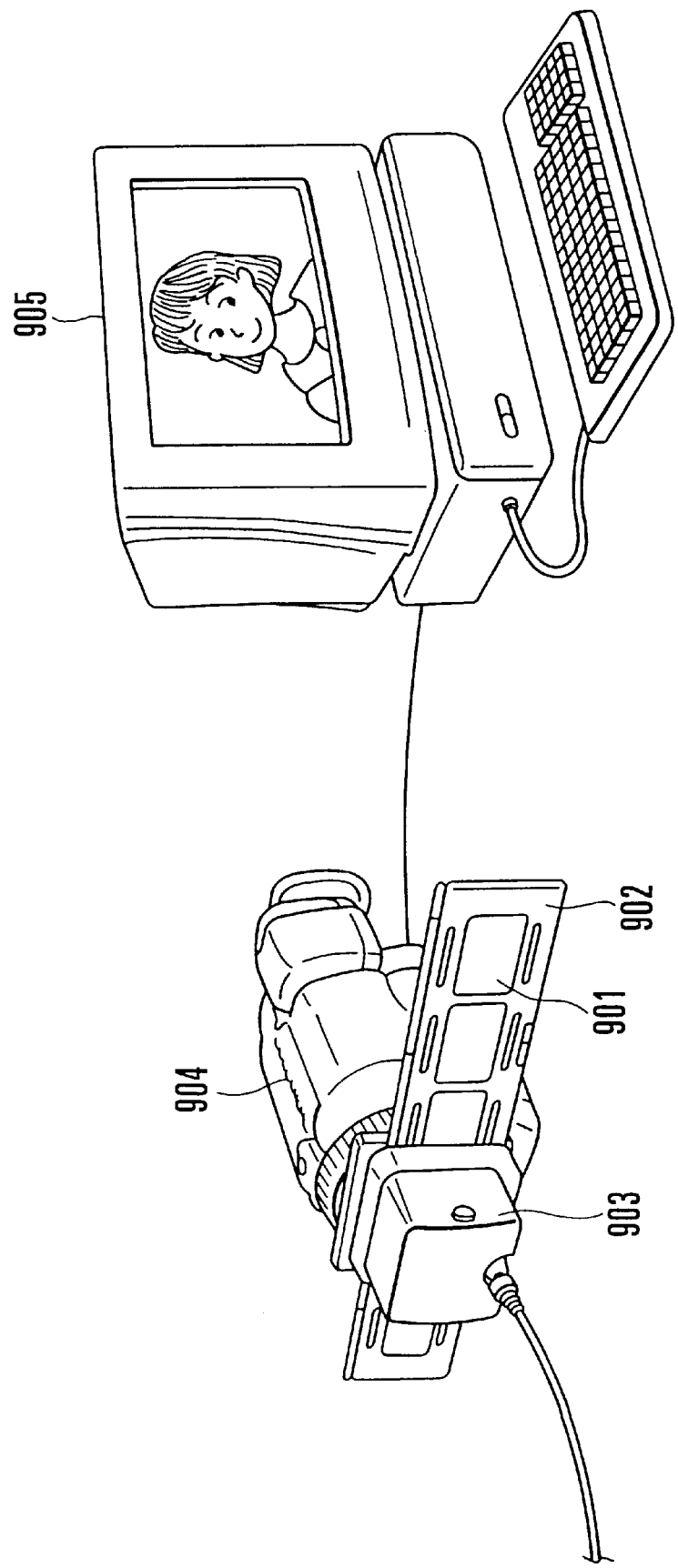
FIG. 1 is a diagrammatic perspective view showing a system for inputting an image to a personal computer by using a VTR-integrated type camera provided with a film adapter.

Specifically, FIG. 6 is a block diagram showing an arrangement in which the present invention is applied to a VTR-integrated type camera 904 which is used in the form shown in FIG. 1 referred to previously. A subject 101 to be photographed, although usually a person or a landscape, is a negative film or a slide film in the use shown in FIG. 6, and is located at an extremely short distance from the front surface of a lens system. The image pickup apparatus shown in FIG. 1 includes a fixed first lens group 102, a variator lens 103, an iris 104, a fixed third lens group 105, a focusing/compensating lens 106 which has both the function of adjusting focus and the function of correcting a movement of a focal plane due to a variation in magnification, an image pickup element 107 such as a CCD, an AGC circuit 108 and a camera signal processing circuit 109.

A video signal processed by the camera signal processing circuit 109 is amplified to a prescribed level by an amplifier 124, and the amplified video signal, after processed by an LCD display circuit 125, is displayed on an LCD 126 as an picked-up image.

The shown image pickup apparatus also includes a variator lens motor 110 for driving the variator lens 103, an IG meter 111 for driving the iris 104, a focusing/compensating lens motor 112 for driving the focusing/compensating lens 106, a variator lens driver 113 for supplying a driving energy current to the variator lens motor 110, an IG driver 114 for supplying a driving energy current to the IG meter 111, a focusing/compensating lens driver 115 for supplying a driving energy current to the focusing/compensating lens motor 112, an iris control circuit 116, an AF evaluation value processing circuit 117 for processing an evaluation value to be used in autofocus (AF) control, the AF evaluation value processing circuit 117 being arranged to extract only a high frequency component of a video signal within a distance measuring frame according to a gate signal supplied from a distance measuring frame generating circuit 129 and perform AF evaluation value processing, and a lens/camera control circuit 118 for controlling the entire lens system and the VTR-integrated type camera, the lens/camera control circuit 118 being arranged to perform predetermined control such as lens driving control and distance measuring frame control for varying a distance measuring area.

The shown image pickup apparatus also includes a system controller 119 for controlling the entire system of the VTR-integrated type camera, a switch group 120 such as a zoom switch provided on the VTR-integrated type camera, (the zoom switch is constructed as a switch unit which outputs a voltage according to the rotating angle of an operating member so that variable-speed zooming is effected according to the output voltage), and a communication line 121 which connects the camera signal processing circuit 109 and the lens/camera control circuit 118 to each other, a communication line 122 which connects the lens/camera control circuit 118 and the system controller 119 to each other, and a communication line 123 which connects the system controller 119 and the switch group 120 to each other. The communication lines 121, 122 and 123 serve to communicate magnification varying operation information such as zooming direction and focal length during zooming controlled by the lens/camera control circuit 118. Incidentally, the system controller 119 controls a character generator 127 to display photography information such as zoom information in the LCD 126. A film 101 is attached to the removable film adapter 903 shown in FIG. 1, and a film adapter detecting switch 128 detects whether the film adapter is in an attached state or a non-attached state. The detection result is sent to the lens/camera control circuit 118.

Figure 7:
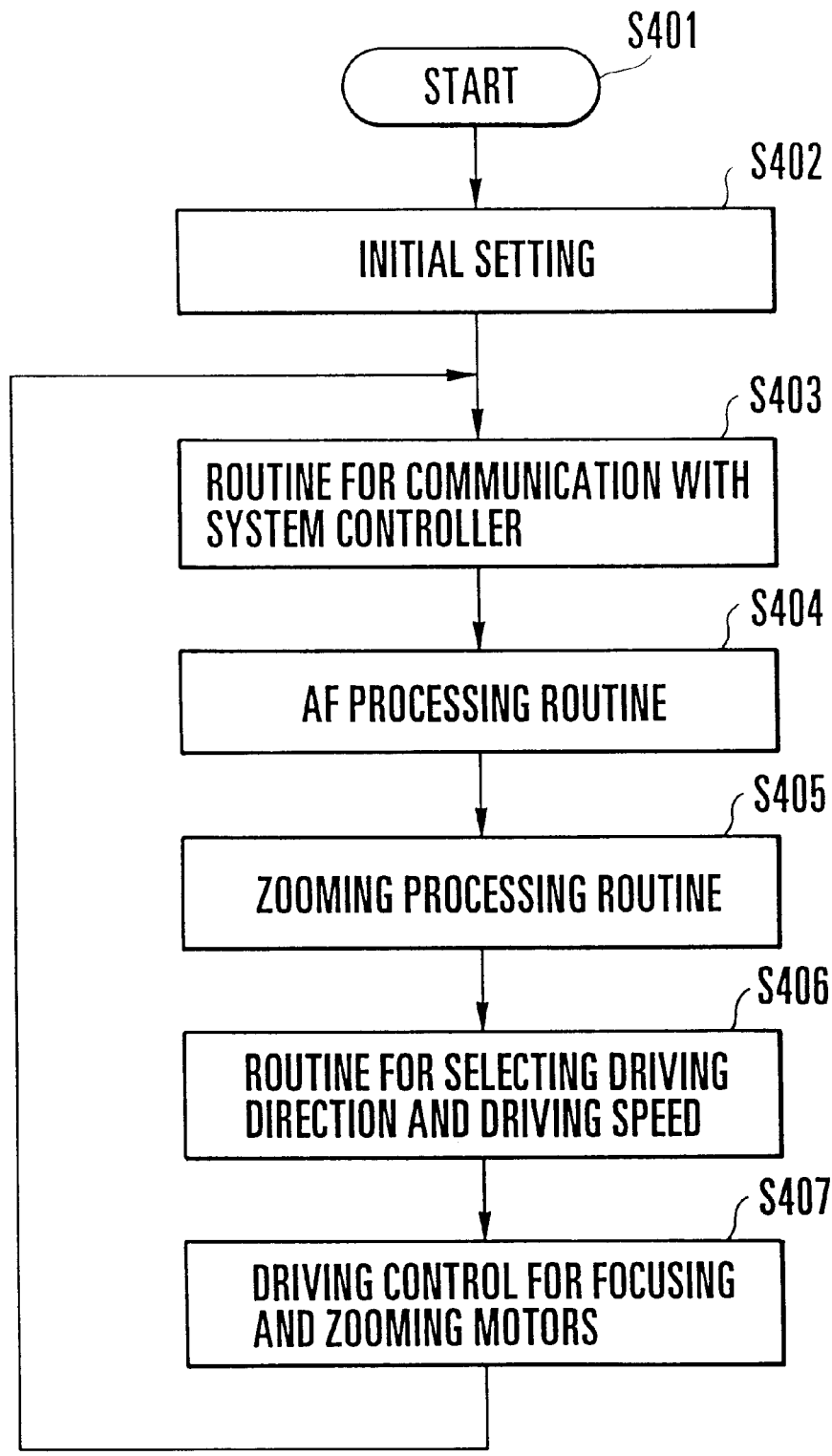
FIG. 7 is a flowchart showing a control operation according to the first embodiment.

FIG. 7 shows a control flow according to a first embodiment, which is processed in the lens/camera control circuit 118.

Step S401 indicates the start of processing. Step S402 is an initial setting routine for executing the processing of initializing various ports and a RAM in the lens/camera control circuit 118. Step S403 is a routine for intercommunication with the system controller 119. In Step S403, zoom switch unit information and magnification varying operation information, such as the position of the variator lens 103, are communicated between the lens/camera control circuit 118 and the system controller 119. Step S404 is an AF processing routine in which an AF evaluation signal is processed and automatic focus adjustment processing is performed according to a variation in the AF evaluation signal. Step S405 is a zooming processing routine which will be described later in detail with reference to FIG. 8. Step S406 is a routine for making selection from among driving directions and driving speeds for the variator lens 103 and the focusing/compensating lens 106 which have been calculated through Steps S404 and S405, according to whether to execute an AF mode or a magnification varying operation. In Step S407, the lens/camera control circuit 118 outputs control signals to the variator lens driver 113 and the focusing/compensating lens driver 115 according to the driving directions and the driving speeds for the variator lens 103 and the focusing/compensating lens 106 which have been determined in Step S406, thereby controlling the respective motors to drive or stop the variator lens 103 and the focusing/compensating lens 106. After the completion of the processing of Step S407, the process returns to Step S403. Incidentally, the entire processing shown in FIG. 7 is executed in synchronism with each vertical synchronizing period (in the processing of Step S403, the process waits for the arrival of the next vertical synchronizing signal).

Figure 8:
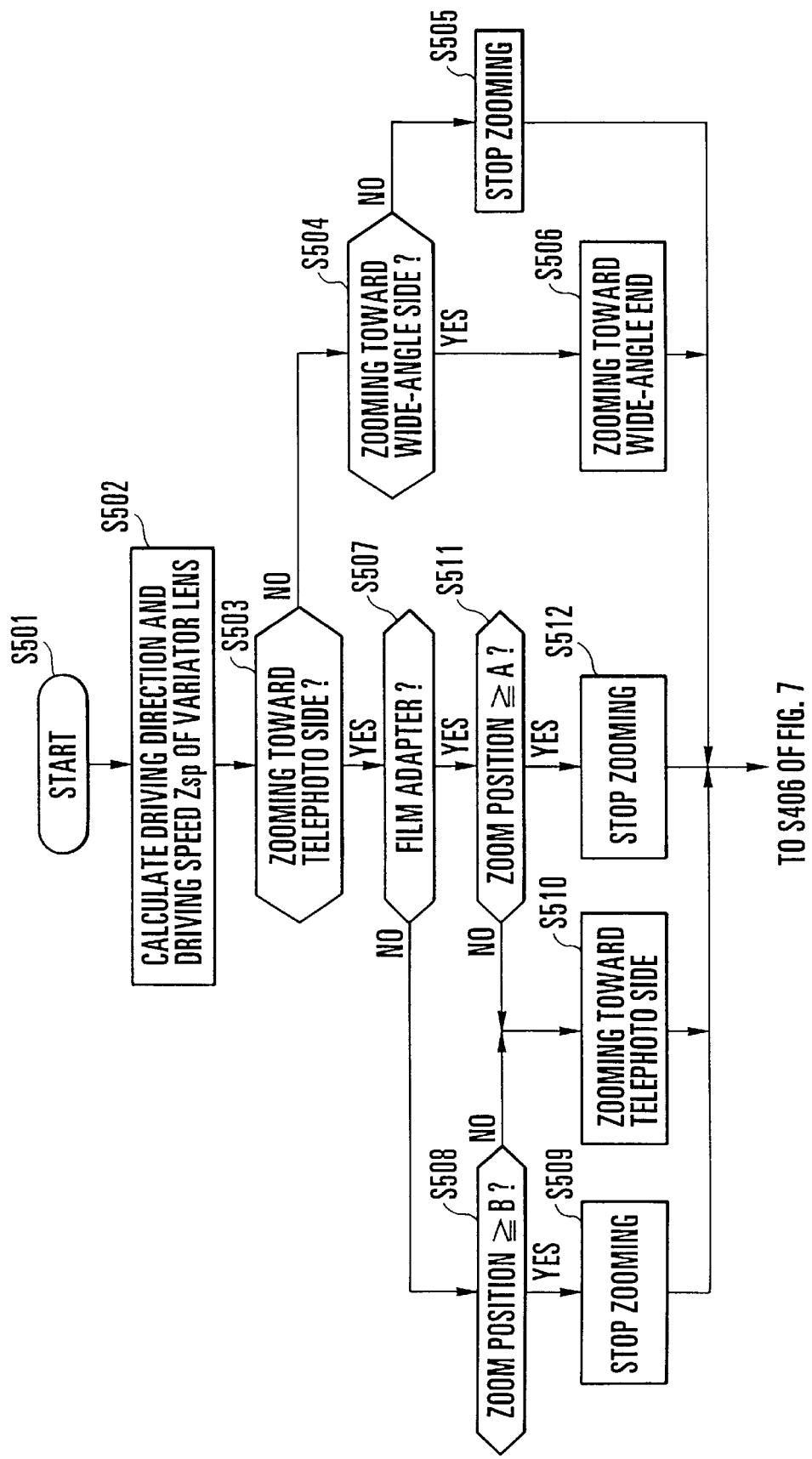
FIG. 8 is a flowchart showing a magnification varying operation according to the first embodiment.

FIG. 8 shows a magnification varying operation control flow according to the first embodiment, and shows in detail the contents of Step S405 of FIG. 7. Step S501 indicates the start of the subroutine shown in FIG. 8. In Step S502, a driving direction and a driving speed Zsp for the variator lens 103 are calculated from information (zoom switch information) indicative of the state of the zoom switch unit in the switch group 120, the zoom switch information being obtained from the system controller 119 in Step S403 of FIG. 7. The zoom switch information is sent to the lens/camera control circuit 118 as an A/D-converted value, and the lens/camera control circuit 118 calculates the driving direction and the driving speed Zsp for the variator lens 103 according to whether the A/D-converted value is larger or smaller than a reference value or the difference (absolute value) between the A/D-converted value and the reference value.

In Step S503, it is determined whether zooming toward a telephoto end has been selected. If the zooming toward the telephoto end has not been selected, the process proceeds to Step S504, in which zooming toward a wide-angle end has been selected. If the zooming toward the wide-angle end has not been selected, either, it is determined that the zoom switch is not being pressed, and zooming is stopped in Step S505. If it is determined in Step S504 that the zooming toward the wide-angle end has been selected, the process proceeds to Step S506, in which the variator lens 103 is driven toward the wide-angle end. At this time, if the position of the variator lens 103 is a far wider-angle side than the wide-angle end. (indicated at W in FIG. 3), zooming is stopped in Step S505. If it is determined in Step S503 that the zooming toward the telephoto end has been selected, the process proceeds to step S507, in which it is determined whether the film adapter is attached. If the film adapter is not attached, the process proceeds to step S508, in which it is determined whether the position of the variator lens 103 is a more telephoto side than the telephoto end (indicated at B in FIG. 3). It is assumed here that if the position of the variator lens 103 is a more telephoto side than the telephoto end, the position of the variator lens 103 exceeds the telephoto end B. If the position of the variator lens 103 exceeds the telephoto end B, the process proceeds to Step S509, in which the variator lens 103 is stopped. If it is determined in Step S508 that the position of the variator lens 103 does not exceed the telephoto end B, i.e., the position of the variator lens 103 is a wider-angle side than the telephoto end, the process proceeds to Step S510, in which the variator lens 103 is driven toward the telephoto end. If it is determined in Step S507 that the film adapter is attached, the process proceeds to Step S511, in which it is determined whether the position of the variator lens 103 is a more telephoto side than the position A shown in FIG. 3. If the position of the variator lens 103 is a more telephoto side than the position A shown in FIG. 3, the variator lens 103 is stopped because focusing is impossible with the film adapter being attached when the position of the variator lens 103 is a more telephoto side than the position A. If it is determined in Step S511 that the position of the variator lens 103 is a wider-angle side than the position A, the process proceeds to Step S510, in which the variator lens 103 is driven toward the telephoto end.

Incidentally, in Step S507, it is determined whether the film adapter is attached, but if it is determined in Step S507 whether a mode for photographing a subject located at a predetermined distance has been selected (a user can make selection from modes by operating a switch of the switch group 120), similar processing is carried out. As described above, the actual driving of the variator lens 103 is performed in Step S407 of FIG. 7.

If the variator motor 110 is a stepping motor, the driving of the variator lens 103 is performed in the following manner in accordance with a variator-lens driving bit (wide-angle or telephoto) and the variator-lens driving speed Zsp which have been determined in the processing routine shown in FIG. 8.

The lens/camera control circuit 118 sends to the variator lens driver 113 a rotating-frequency signal for the variator motor 110 according to the variator-lens driving speed Zsp and a rotating-direction signal for the variator lens motor 110 according to the variator-lens driving bit. The variator lens driver 113 sets the phase order of four motor excitation phases to a phase order for forward rotation or a phase order for reverse rotation according to the rotating-direction signal, and outputs voltages (or currents) for the four motor excitation phases while varying the voltages (or the currents), according to the received rotating-frequency signal, thereby controlling the rotating direction and rotating frequency of the variator lens motor 110. Thus, the stepping motor 110 rotates to drive the variator lens driver 113. Although the above description has referred to the operation of the variator lens 103, a similar operation is performed as to the focusing/compensating lens 106.

As described above, the range of movement of the variator lens 103 during the magnification varying operation is limited when the film adapter is attached. This is because if the variator lens 103 is positioned on a more telephoto side than the position A as viewed in FIG. 3, cam loci diverge so that an in-focus point can only be found outside the range over which the focusing/compensating lens 106 can move. However, if a photographer cannot at all times recognize that the range of movement of the variator lens 103 is limited when the film adapter is attached, the photographer will be confused about the state of photography. To solve this problem, in the processing of Step S403 of FIG. 7, film adapter attachment information is inserted into the magnification varying operation information which is sent from the lens/camera control circuit 118 to the system controller 119, and before communication, information indicative of the moving range of the variator lens 103 is switched according to whether the film adapter is in an attached state or in a non-attached state.

In addition, the system controller 119 controls the character generator 127 to display in the LCD 126 a zoom display corresponding to the received information indicative of the moving range of the variator lens 103, thereby enabling the photographer to recognize that zooming is being performed with the film adapter attached.

According to the first embodiment, it is possible to avoid the phenomenon of a film becoming incapable of being focused for particular focal lengths, by varying, when the film adapter is attached, the area in which the variator lens 103 can perform the magnification varying operation. In addition, since the photographer can be given through the LCD 126 information indicative of the state of limitation of a variator lens-movable range, which information is peculiar to the magnification varying operation carried out when the film adapter is attached, it is possible to prevent the photographer from erroneously recognizing the status of photography during zooming when the film adapter is attached.

(Second Embodiment)

In the description of the first embodiment, reference has been made to the method of detecting through the switch 128 whether the film adapter is attached, and varying the variable lens-movable range when the film adapter is attached or during the mode for photographing a subject located at a predetermined distance. However, in the following description of a second embodiment, reference will be made to a method of automatically detecting whether the film adapter is attached, without the use of the switch 128, and varying the variable lens-movable range when the film adapter is attached.

The construction of an image pickup apparatus according to the second embodiment is similar to the construction shown in FIG. 6, except that the film adapter detecting switch 128 is omitted from the block diagram of FIG. 6. The second embodiment also differs from the first embodiment in the internal constructions of the camera signal processing circuit 109 and the lens/camera control circuit 118.

Figure 9:
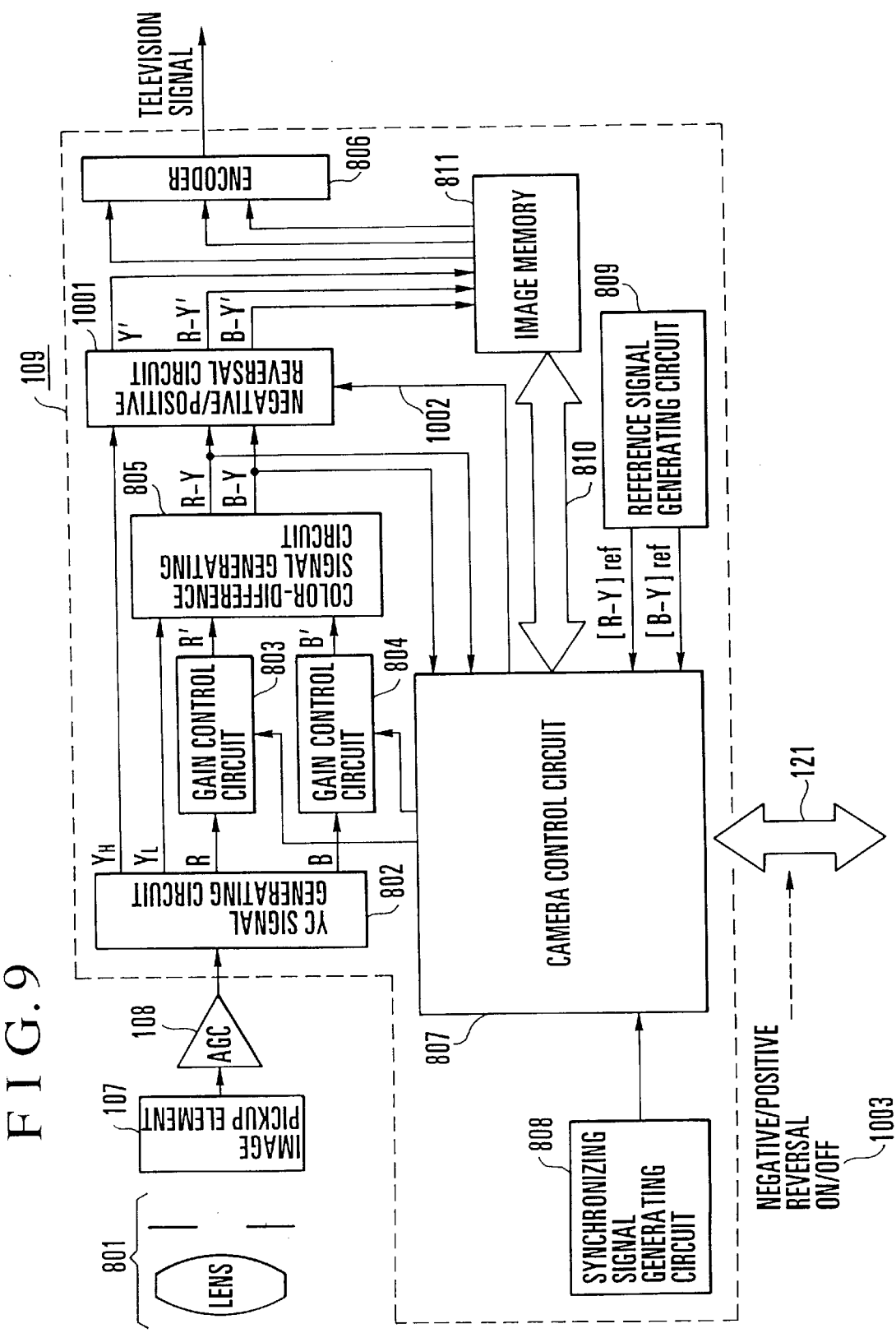
FIG. 9 is a block diagram showing the construction of the camera signal processing circuit shown in FIG. 6.

FIG. 9 is a block diagram showing the internal construction of the camera signal processing circuit 109. Although simplified in illustration, a lens system 801 includes the first lens group 102, the variator lens 103, the iris 104, the third lens group 105 and the focusing/compensating lens 106 all of which are shown in FIG. 6. A YC signal generating circuit 802 separates luminance signals $Y_H$ and $Y_L$ and color signals R and B from the output of the AGC circuit 108 and outputs these signals $Y_H$, $Y_L$, R and B. A camera control circuit 807 detects the levels of color-difference signals R-Y and B-Y and adjusts the gains of R and B gain control circuits 803 and 804 so as to provide appropriate white balance, and the gain control circuits 803 and 804 output adjusted color signals R' and B', respectively. A color-difference signal generating circuit 805 generates the color-difference signals R-Y and B-Y from the luminance signal $Y_L$ and the color signals R' and B', and an encoder 806 generates a television signal from the luminance signal $Y_H$ and the color-difference signals R-Y and B-Y.

A synchronizing signal generating circuit 808 supplies a synchronizing signal to the camera control circuit 807, and a reference signal generating circuit 809 generates reference signals $[R-Y]_{ref}$ and $[B-Y]_{ref}$ for adjusting the respective gains of the gain control circuits 803 and 804. An image memory 811 is connected to the camera control circuit 807 by a communication line 810 and is provided for storing a still image. Luminance signals and color-difference signals from the YC signal generating circuit 802 and the color-difference signal generating circuit 805 are inputted into the image memory 811, and the image memory 811 outputs still-image information to the encoder 806 or passes therethrough image information supplied from the YC signal generating circuit 802 and the color-difference signal generating circuit 805, without modification in accordance with a control signal from the camera control circuit 807.

Figure 10:
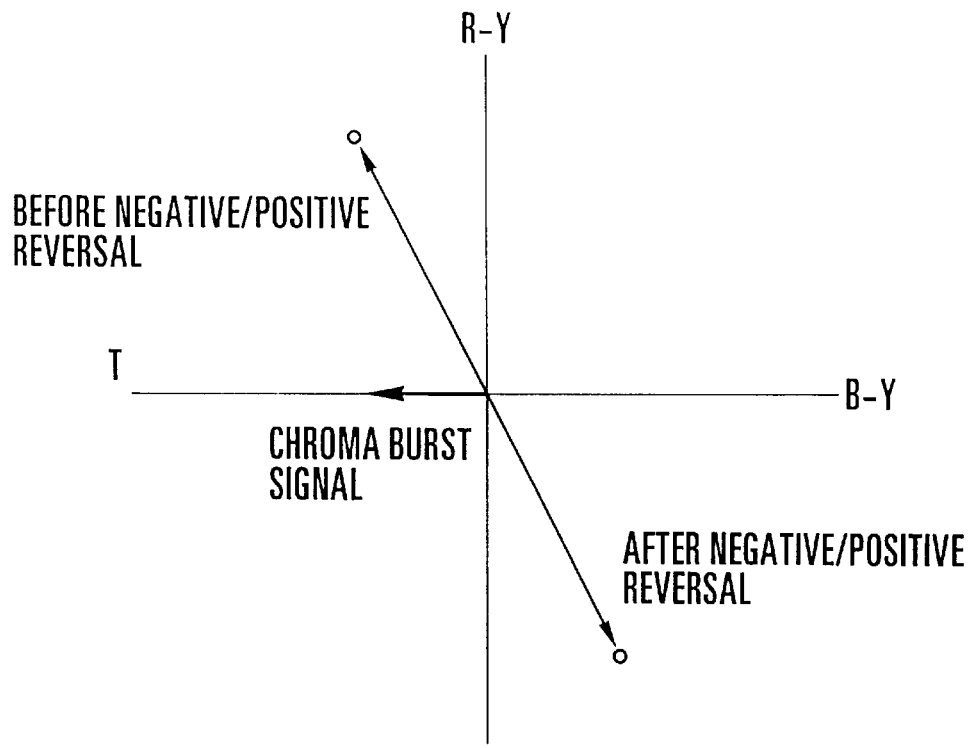
FIG. 10 is a characteristic chart showing the manner of reversal of color-difference signals.
Figure 11:
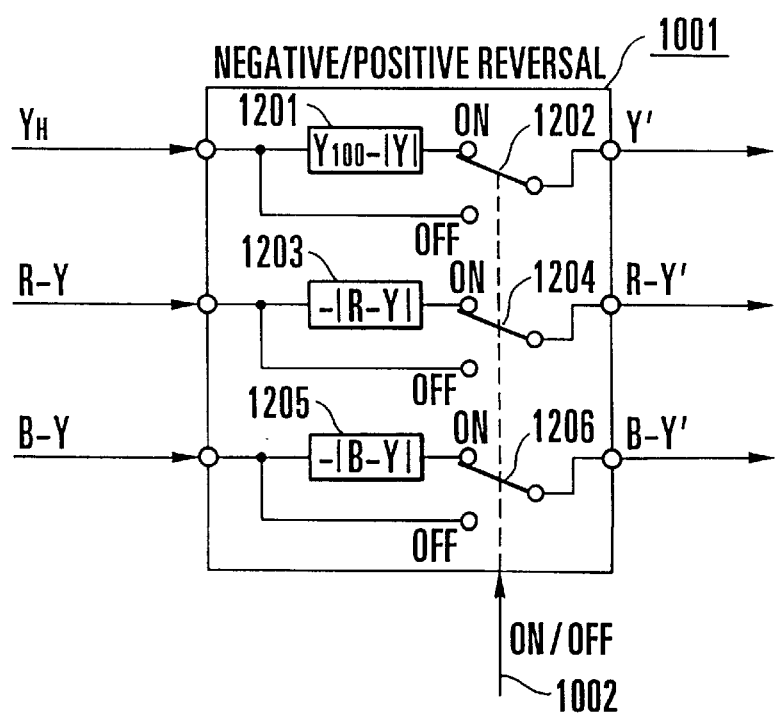
FIG. 11 is a circuit diagram showing one example of the construction of a negative/positive reversal circuit.

A negative/positive reversal circuit 1001 reverses each of the signals $Y_H$, R-Y and B-Y. FIG. 10 shows one example of an indication of color-difference vectors respectively indicating negative and positive states of a color negative film. As is apparent from FIG. 10, the color-difference vectors are 180° reverse to each other between the two negative and positive states. The construction of the negative/positive reversal circuit 1001 is shown in FIG. 11. In the construction shown in FIG. 11, the input luminance signal $Y_H$ is reversed from a bright portion to a dark portion and from a dark portion to a bright portion. Specifically, for example, in a computing circuit 1201, an absolute value of the input luminance signal within the range of from a black level based on a black level reference to a luminance level of white 100% is subtracted from the luminance level of white 100%, whereby a luminance component which is reversed in the relationship between the bright portion and the dark portion on the basis of a white 100% reference is taken out. In a computing circuit 1203, the R-Y signal is reversed on the R-Y axis as viewed in FIG. 10, and in a computing circuit 1205, the B-Y signal is reversed on the B-Y axis as viewed in the FIG. 10. By reversing each of the luminance signal and the color-difference signals in the above-described manner, a negative video image can be converted into a positive video image.

Switches 1202, 1204 and 1206 interlockingly operate in response to a negative/positive reversal signal 1002, and are arranged to output the aforesaid corresponding reversed signals when they are turned on, or the corresponding input signals without modification when they are turned off. The negative/positive reversal signal 1002 is outputted from the camera control circuit 807. An operator determines whether to execute such negative/positive reversal, by operating the switch group 120. This information passes through the communication line 123, the system controller 119, the communication line 122 and the lens/camera control circuit 118, and is transmitted to the camera control circuit 807 through the communication line 121 as shown at 1003 in FIG. 9. On the basis of the transmitted information, the camera control circuit 807 outputs the negative/positive reversal signal 1002.

Figure 12:
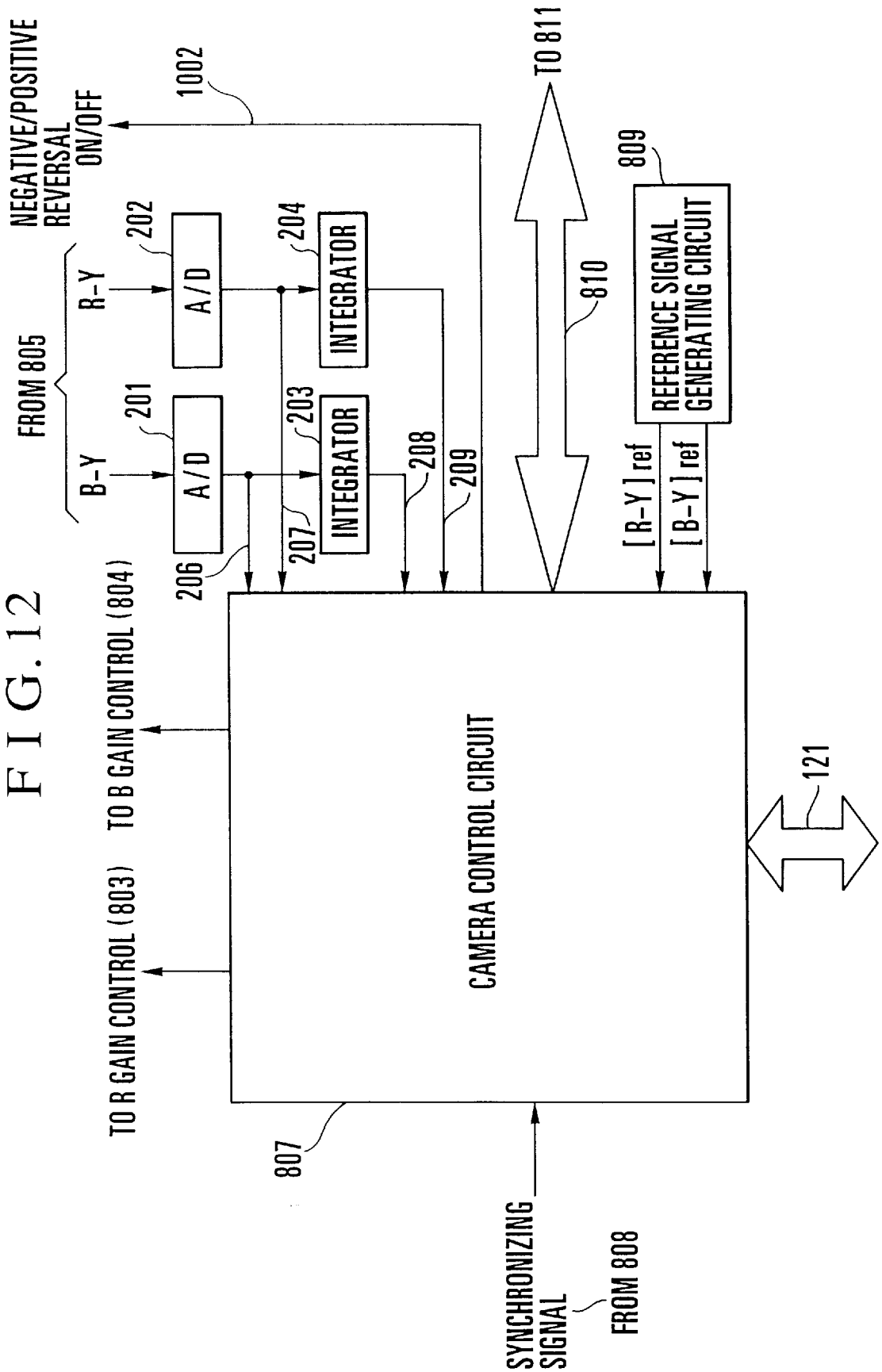
FIG. 12 is a block diagram showing the camera control circuit shown in FIG. 9 and its peripheral portion.

FIG. 12 shows in more detail a portion of the construction of the camera signal processing circuit 109 according to the second embodiment, i.e., only the camera control circuit 807 of FIG. 9 and its peripheral portion. In FIG. 12, reference numerals indicative of constituent elements to which the respective blocks shown in FIG. 12 are connected correspond to the reference numerals shown in FIG. 9.

The camera control circuit 807 in the second embodiment employs a microcomputer. For this reason, the R-Y and B-Y color-difference signals outputted from the color-difference signal generating circuit 805 are converted into digital signals by A/D converters 201 and 202, respectively, and these digital signals are inputted into the camera control circuit 807. The outputs of the A/D converters 201 and 202 are inputted into the camera control circuit 807 through terminals 206 and 207, respectively, and the camera control circuit 807 uses the input digital signals to control the R- and B-signal gain control circuits 803 and 804 shown in FIG. 9, respectively. The outputs of the A/D converters 201 and 202 are inputted to integrators 203 and 204, respectively, and the integral results are inputted into the camera control circuit 807 through terminals 208 and 209, respectively.

Figure 13:
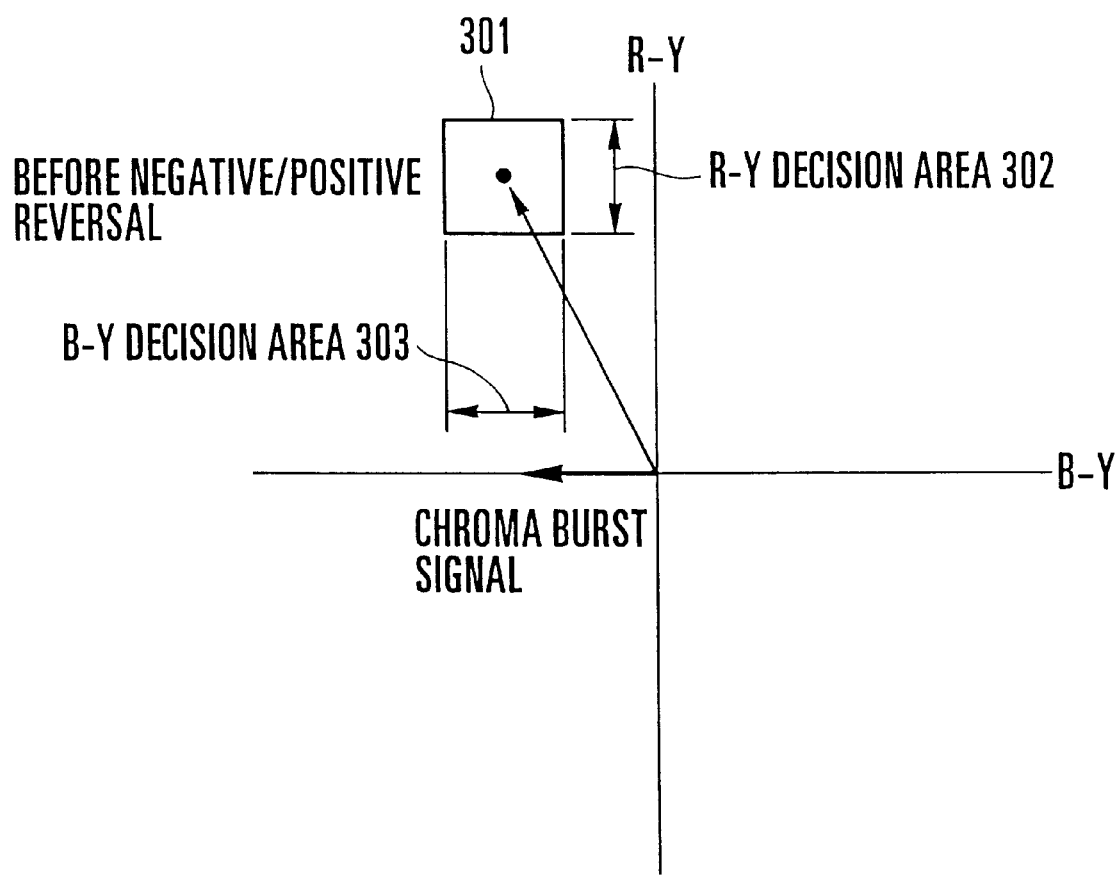
FIG. 13 is a characteristic chart aiding in describing a way of discriminating between negative film and positive film on the basis of the color-difference signals.

FIG. 13 shows the relationship between the R-Y component and the B-Y component obtained when light transmitted through the color negative film illuminated by a predetermined backlight is photographed with the video camera and the R-Y and B-Y color-difference signals are integrated by the respective integrators 204 and 203 shown in FIG. 12. As shown in FIG. 13, the relationship between the R-Y and B-Y color-difference signals is represented by a color-difference vector distributed approximately in the area indicated at 301 in FIG. 13. Accordingly, the camera control circuit 807 observes the B-Y and R-Y color-difference signals inputted through the terminals 208 and 209, and determines that a negative film is being photographed, i.e., the film adapter is attached, on condition that the R-Y component is in the decision area 302 and the B-Y component is in the decision area 303.

Figure 14:
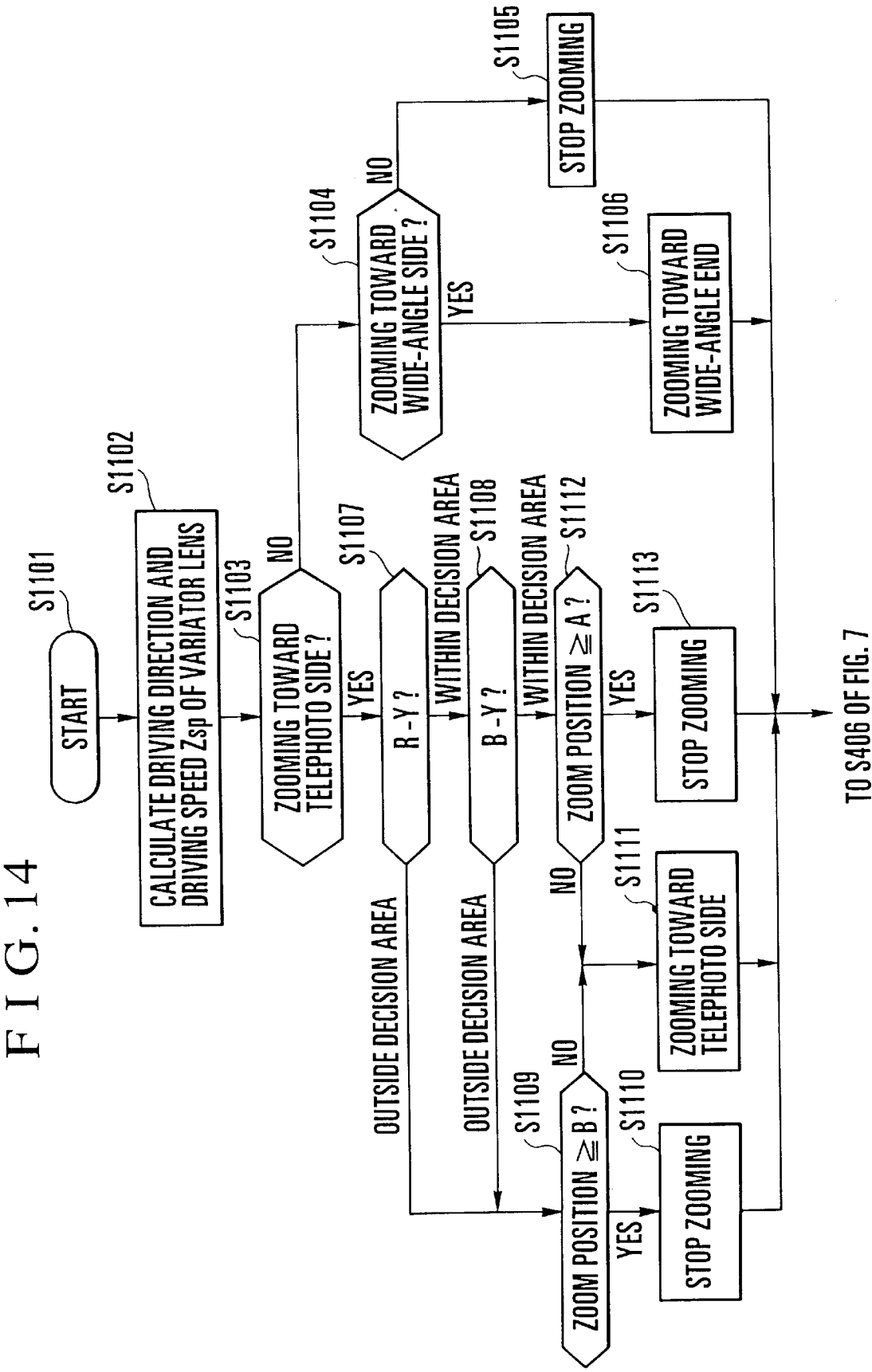
FIG. 14 is a flowchart showing a magnification varying operation according to a second embodiment.

FIG. 14 is a flowchart of an operational flow of the second embodiment, and shows the operation of detecting through the camera control circuit 807 whether a negative film is being photographed, automatically detecting whether a film adapter is attached, and varying a zooming-possible area.

If the process is started in Step S1101, in Step 1102, the driving direction and the driving speed Zsp for the variator lens 103 are calculated from the information indicative of the state of the zoom switch unit, which information is obtained form the system controller 119 in Step S403 of FIG. 7.

In Step S1103, it is determined whether zooming toward the telephoto end has been selected. If the zooming toward the telephoto end has not been selected, the process proceeds to Step S1104, in which zooming toward the wide-angle end has been selected. If the zooming toward the wide-angle end has not been selected, it is determined that the zoom switch is not being pressed, and zooming is stopped in Step S1105. If it is determined in Step S1104 that the zooming toward the wide-angle end has been selected, the process proceeds to Step S1106, in which the variator lens 103 is driven toward the wide-angle end. At this time, if the position of the variator lens 103 is a far wider-angle side than the wide-angle end (indicated at W in FIG. 3), zooming is stopped in Step S1105. If it is determined in Step S1103 that the zooming toward the telephoto end has been selected, the process proceeds to Step S1107, in which it is determined whether the R-Y signal inputted through the terminal 209 is in the R-Y decision area 302 shown in FIG. 13. If the R-Y signal is outside the R-Y decision area 302, it is determined that the film adapter is not attached, and the process proceeds to Step S1109. If the R-Y signal is within the R-Y decision area 302, the process proceeds to Step S1108, in which it is determined whether the B-Y signal inputted through the terminal 208 is in the B-Y decision area 303 shown in FIG. 13. If the B-Y signal is outside the B-Y decision area 303, it is determined that the film adapter is not attached, and the process proceeds to Step S1109.

Figure 3:
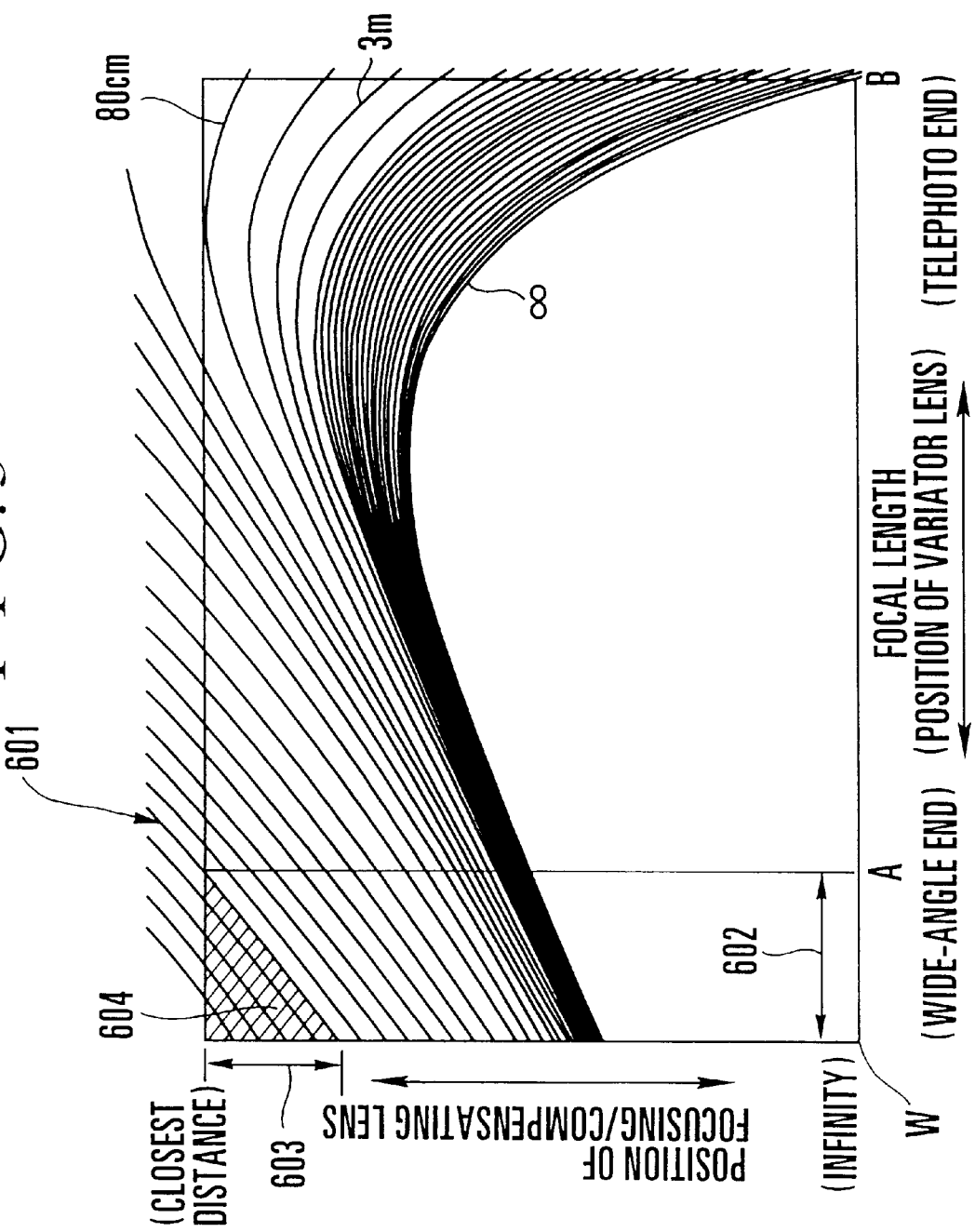
FIG. 3 is a characteristic chart showing the positional relationship between a variator lens and a focusing/compensating lens.

In Step S1109, it is determined whether the position of the variator lens 103 is a more telephoto side than the telephoto end (indicated at B in FIG. 3). It is assumed here that if the position of the variator lens 103 is a more telephoto side than the telephoto end, the position of the variator lens 103 exceeds the telephoto end B. If the position of the variator lens 103 exceeds the telephoto end B, the process proceeds to Step S1110, in which the variator lens 103 is stopped. If it is determined in Step S1109 that the position of the variator lens 103 does not exceed the telephoto end B, i.e., the position of the variator lens 103 is a wider-angle side than the telephoto end, the process proceeds to Step S1111, in which the variator lens 103 is driven toward the telephoto end. If it is determined in Step S1107 and the Step S1108 that the R-Y signal and the B-Y signal are in the respective R-Y decision areas 302 and 303 and the film adapter is attached, the process proceeds to Step S1112, in which it is determined whether the position of the variator lens 103 is a more telephoto side than the position A shown in FIG. 3. If the position of the variator lens 103 is a more telephoto side than the position A shown in FIG. 3, the process proceeds to Step S1113, in which the variator lens 103 is stopped because focusing is impossible with the film adapter being attached when the position of the variator lens 103 is a more telephoto side than the position A. If the position of the variator lens 103 is more wide-angle side than the position A in Step S1112, the process proceeds to Step S1111, in which the variator lens 103 is driven toward the telephoto end.

According to the second embodiment, even if the operator does not manually operate the switch 128 of FIG. 6 to select a switch position for selecting the operation of detecting whether the film adapter is attached, the zooming-possible area can be automatically varied when a negative film is being photographed, whereby it is possible to avoid the phenomenon of the negative film being incapable of being focused.

Incidentally, a negative/positive reversal on/off switch (not shown) which is included in the switch group 120 of FIG. 6 may be omitted. If the VTR-integrated type camera is arranged so that a negative/positive reversal function, when the attachment of the film adapter is automatically detected, automatically operates to automatically vary the zooming-possible area, the VTR-integrated type camera can be made far easier to operate. Accordingly, even if an image pickup operation for obtaining a video image from a negative film is performed immediately after normal video shooting has been performed, it is possible to pick up an optimum image while effecting smooth focusing, without the need for a complicated operation.

Incidentally, the method of automatically detecting the attachment of negative film is not limited to only the above-described one, and a method disclosed in Japanese Patent Application No. Hei 8-322714 may also be employed.

(Third Embodiment)

An image pickup apparatus according to a third embodiment is constructed similarly to that shown in FIG. 6.

Figure 15:
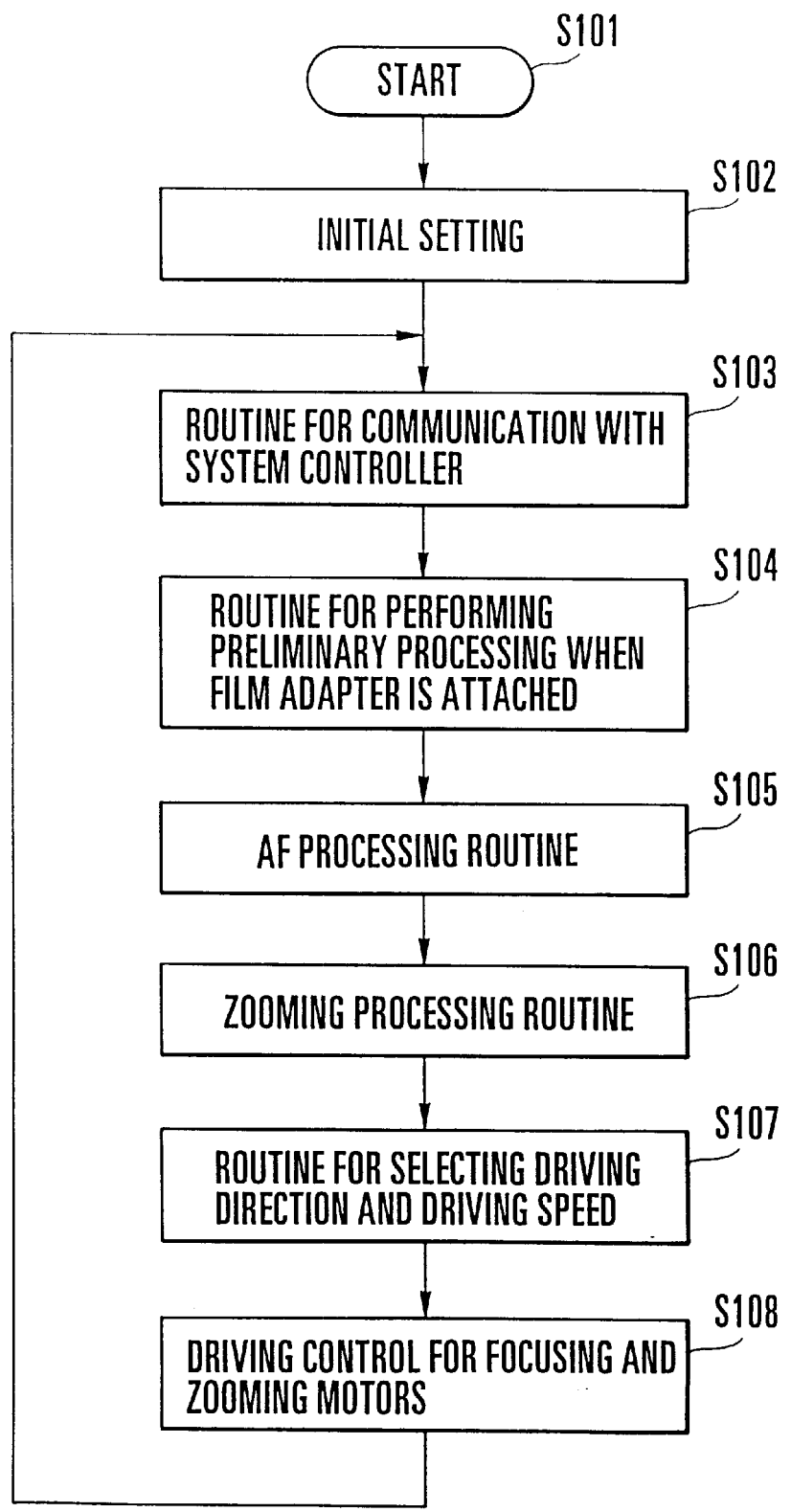
FIG. 15 is a flowchart showing a control operation according to each of the third and fifth embodiments.

FIG. 15 shows a control flow according to the third embodiment, which is processed in the lens/camera control circuit 118. Step S101 indicates the start of processing. Step S102 is an initial setting routine for executing the processing of initializing various ports and a RAM in the lens/camera control circuit 118. Step S103 is a routine for intercommunication with the system controller 119. In Step S103, zoom switch unit information and magnification varying operation information, such as the position of the variator lens 103, are communicated between the lens/camera control circuit 118 and the system controller 119. step S104 is a processing routine for forcedly moving the variator lens 103 to a lens-focusable focal length area when the film adapter is attached or when the mode for photographing a subject located at a predetermined distance is selected. Step S104 will be described later in detail with reference to FIG. 16.

Step S105 is an AF processing routine in which an AF evaluation signal is processed and automatic focus adjustment processing is performed according to a variation in the AF evaluation signal. Step S106 is a zooming processing routine for processing a focus compensating operation to be executed for maintaining an in-focus state during a magnification varying operation. Step S107 is a routine for making selection from among driving directions and driving speeds for the variator lens 103 and the focusing/compensating lens 106 which have been calculated through Steps S104 to S106, according to the forced movement operation during the attachment of the film adapter, an AF mode, a magnification varying operation or the like, and executing setting so as not to drive the lenses beyond their respective telephoto ends, wide-angle ends, closest-distance ends or infinity ends all of which are set by software so as not to prevent the lenses from coming into contact with end portions of their respective mechanical portions. In Step S108, the lens/camera control circuit 118 outputs control signals to the variator lens driver 113 and the focusing/compensating lens driver 115 according to the driving directions and the driving speeds for the variator lens 103 and the focusing/compensating lens 106 which have been determined in Step S107, thereby controlling the respective motors to drive or stop the variator lens 103 and the focusing/compensating lens 106. After the completion of the processing of Step S108, the process returns to Step S103. Incidentally, the entire processing shown in FIG. 15 is executed in synchronism with each vertical synchronizing period (in the processing of Step S103, the process waits for the arrival of the next vertical synchronizing signal).

Figure 16:
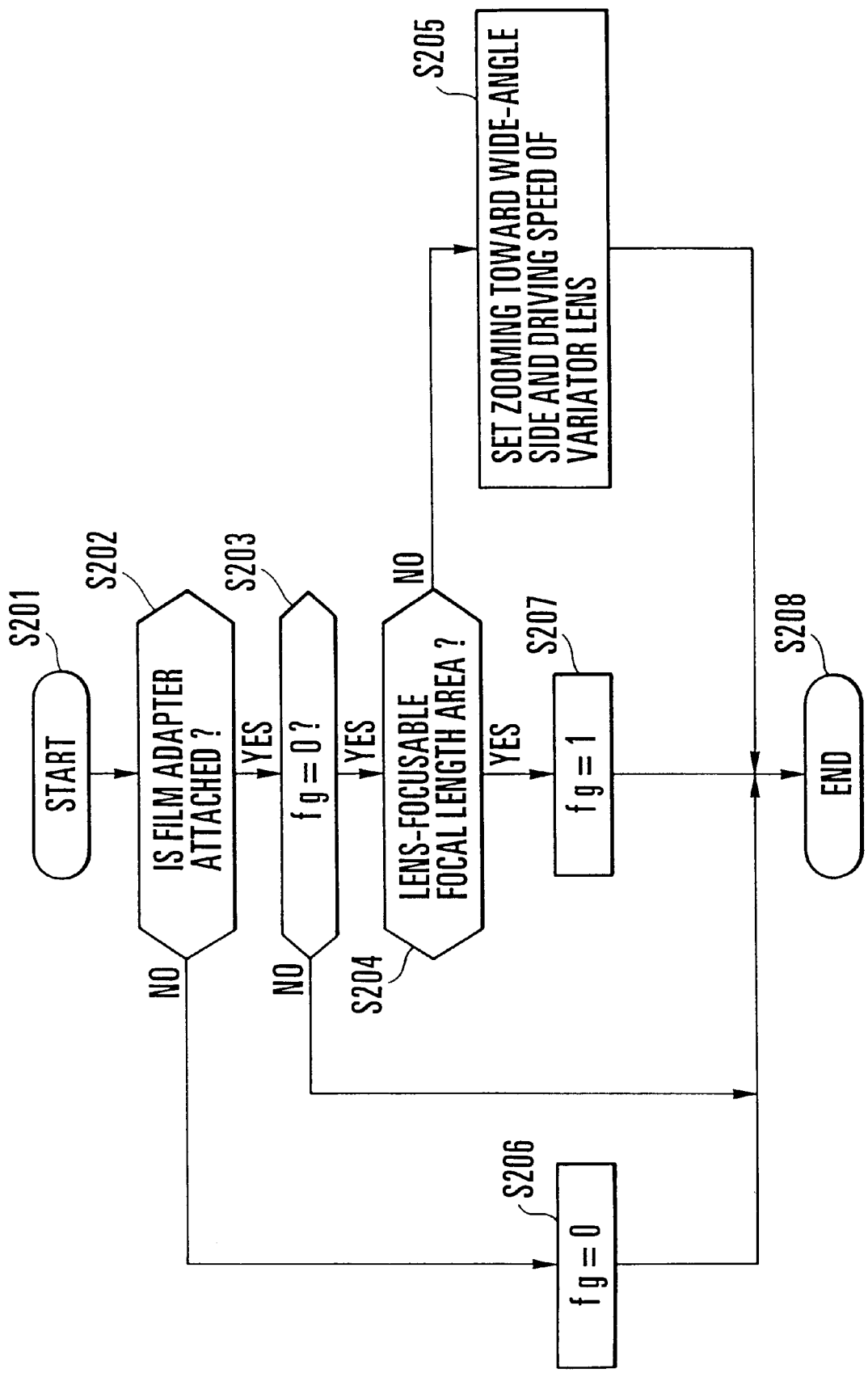
FIG. 16 is a flowchart showing a magnification varying operation according to the third embodiment.

FIG. 16 shows an operational flow according to the third embodiment, and shows in detail the contents of the processing routine of Step S104 of FIG. 15 for forcedly moving the variator lens 103 to the lens-focusable focal length area when the film adapter is attached. Step S201 indicates the start of the subroutine shown in FIG. 16. In Step S202, it is determined whether the film adapter is attached. If the film adapter is not attached, the process proceeds to Step S206, in which a flag fg is set to fg=0. Then, the process proceeds to Step S208. The flag fg is set to fg=1 when the variator lens 103, after the attachment of the film adapter, is forcedly moved up to the lens-focusable focal length area to complete the required preparation relative to the attachment of the film adapter. If it is determined in Step S202 that the film adapter is attached, the process proceeds to Step S203, in which it is determined whether the preparation-complete flag (fg) is set to a high level. If fg=1, it is determined that the preparation is completed, and the process proceeds to Step S208. If fg=0 in Step S203, it is determined in Step S204 whether the current position of the variator lens 103 is within the lens-focusable focal length area. If the current position of the variator lens 103 is within the lens-focusable focal length area, the process proceeds to Step S207, in which the preparation-complete flag (fg) is set to the high level, and the process proceeds to Step S208. If it is determined in Step S204 that the current position of the variator lens 103 is not within the lens-focusable focal length area, the process proceeds to Step S205, in which the driving direction of the variator lens 103 is set to the wide-angle side and the driving speed of the variator lens 103 is set. After that, the process proceeds to Step S208, in which the routine for processing the preparation relative to the attachment of the film adapter is completed.

In the above-described processing, the operation of moving the variator lens 103 to the lens-focusable focal length area when the film adapter is attached is the operation of moving the variator lens 103 to a wider-angle side than the position A as viewed in FIG. 3. The operation of moving the variator lens 103 to the lens-focusable focal length area when the film adapter is attached indicates the operation of moving the variator lens 103 to a wider-angle side than the position A as viewed in FIG. 3. Accordingly, since any position on the wider-angle side can be known in advance before the attachment of the film adapter, the variator lens 103 can be made to move anywhere on the wider-angle side than the position A shown in FIG. 3.

It is determined in Step S202 whether the film adapter is attached, but even if it is determined in Step S202 whether the mode for photographing a subject located at a predetermined distance is selected (the photographer can select the mode by operating the corresponding switch (not shown) contained in the switch group 120), processing similar to the above-described one is carried out. Incidentally, as described previously, the actual driving of the lens variator lens 103 is carried out in Step S107 of FIG. 15.

If the variator lens motor 110 is a stepping motor, the driving of the variator lens 103 is performed in a manner similar to that described previously in connection with the first embodiment, in accordance with the variator-lens driving bit (wide-angle or telephoto) and the variator-lens driving speed Zsp both of which have been determined in the processing routine shown in FIG. 16. Although the above description has referred to the operation of the variator lens 103, a similar operation is performed as to the focusing/compensating lens 106.

As described above with reference to FIG. 16, when the film adapter is attached, the variator lens 103 is forcedly moved to the lens-focusable focal length area if the variator lens 103 is, not within the lens-focusable focal length area. This is because if the variator lens 103 is positioned on a more telephoto side than the position A as viewed in FIG. 3, the cam loci diverge so that an in-focus point can only be found outside the range over which the focusing/compensating lens 106 can move. However, if the photographer cannot correctly recognize that the variator lens 103 is being forcedly moved since the film adapter is attached, the photographer may erroneously recognize the forced movement as a malfunction of the image pickup apparatus. For this reason, when the film adapter is attached, in the processing of Step S103 of FIG. 15, the lens/camera control circuit 118 informs the system controller 119 that the variator lens 103 is being forcedly moved.

In addition, the system controller 119 controls the character generator 127 to display in the LCD 126 a display image corresponding to the received information indicating that the variator lens 103 is being forcedly moved, thereby enabling the photographer to recognize that forced zooming is being performed since the film adapter is attached.

According to the third embodiment, it is possible to avoid the phenomenon of a film becoming incapable of being focused when the film adapter is attached, by forcedly moving the variator lens 103 to the lens-focusable focal length area when the film adapter is attached. In addition, since the photographer can be informed through the LCD 126 that the variator lens 103 is being forcedly moved to the lens-focusable focal length area since the film adapter is attached, it is possible to prevent the photographer from erroneously recognizing the status of photography during forced zooming when the film adapter is attached.

(Fourth Embodiment)

In the description of the third embodiment, reference has been made to the method of forcedly moving the variator lens 103 to the lens-focusable focal length area when the attachment of the film adapter is detected from the state of the switch 128 or when the mode for photographing a subject located at a predetermined distance is selected. In the following description of a fourth embodiment, reference will be made to a method applicable to an arrangement which does not have the switch 128, which method includes automatically detecting the attachment of the film adapter and, when the film adapter is attached, forcedly moving the variator lens 103 to the lens-focusable focal length area.

The construction of an image pickup apparatus according to the fourth embodiment is similar to the construction shown in FIG. 6, except that the film adapter detecting switch 128 is omitted from the block diagram of FIG. 6. The internal construction of the camera signal processing circuit 109 shown in FIG. 6 is as shown in FIGS. 9 and 12.

A method of detecting whether a negative film is being photographed, i.e., whether a film adapter is attached, and a negative/positive reversal method are similar to the methods described previously with reference to FIGS. 10, 11 and 13.

Figure 17:
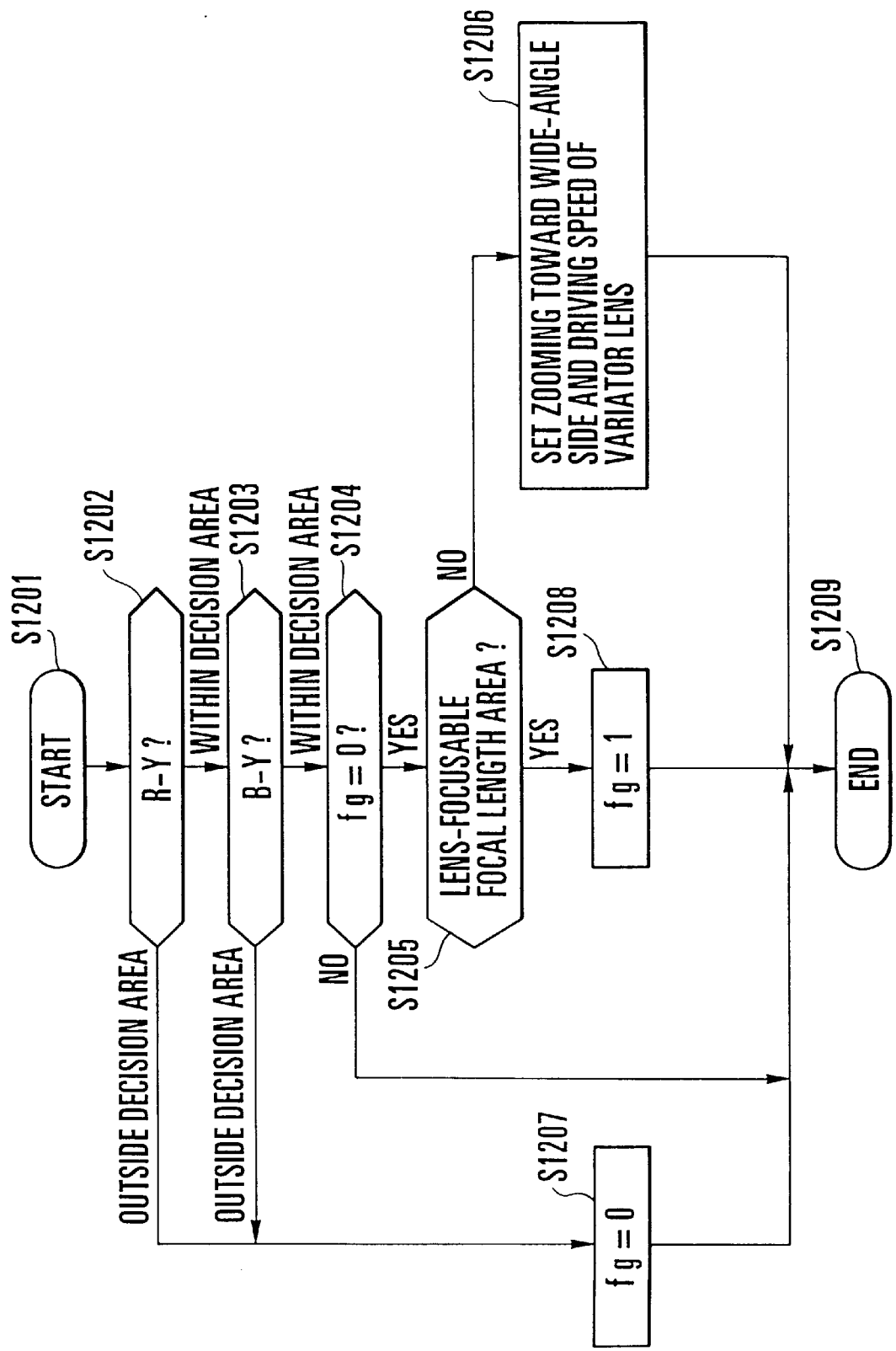
FIG. 17 is a flowchart showing a magnification varying operation according to a fourth embodiment.

FIG. 17 is a flowchart showing a control flow according to the fourth embodiment, for detecting, through the camera control circuit 807 shown in FIGS. 9 and 12, whether a negative film is being photographed, to automatically detect the attachment of the film adapter, and forcedly moving the variator lens 103 to the lens-focusable focal length area when the negative film is attached.

Step S1201 indicates the start of the subroutine shown in FIG. 17. In Step S1202, it is determined whether the R-Y signal inputted through the terminal 209 shown in FIG. 12 is in the R-Y decision area 302 shown in FIG. 13. If the R-Y signal is outside the R-Y decision area 302, it is determined that the film adapter is not attached, and the process proceeds to Step S1207. If the R-Y signal is within the R-Y decision area 302, the process proceeds to Step S1203, in which it is determined whether the B-Y signal inputted through the terminal 208 is in the B-Y decision area 303. If the B-Y signal is outside the B-Y decision area 303, it is determined that the film adapter is not attached, and the process proceeds to Step S1207.

In Step S1207, the flag fg is set to fg=0, and the process proceeds to Step S1209. The flag fg is set to fg=1 when the variator lens 103, after the attachment of the film adapter, is forcedly moved up to the lens-focusable focal length area to complete the required preparation relative to the attachment of the film adapter. If it is determined in Step S1202 that the R-Y signal inputted through the terminal 209 is in the R-Y decision area 302 and it is then determined in Step S1203 that the B-Y signal inputted through the terminal 208 is in the B-Y decision area 303, i.e., if it is determined that the film adapter is attached, the process proceeds to Step S1204, in which it is determined whether the preparation-complete flag (fg) is set to the high level.

If fg=1, it is determined that the preparation is completed, and the process proceeds to Step S1209. If fg=0 in Step S1204, it is determined in Step S1205 whether the current position of the variator lens 103 is within the lens-focusable focal length area, i.e., whether the current position of the variator lens 103 is a wider-angle side than the position A as viewed in FIG. 3. If the current position of the variator lens 103 is within the lens-focusable focal length area, the process proceeds to Step S1208, in which the preparation-complete flag (fg) is set to the high level, and the process proceeds to Step S1209. If it is determined in Step S1205 that the current position of the variator lens 103 is not within the lens-focusable focal length area, the process proceeds to Step S1206, in which the driving direction of the variator lens 103 is set to the wide-angle side and the driving speed of the variator lens 103 is set. After that, the process proceeds to Step S1209, in which the routine for processing the preparation relative to the attachment of the film adapter is completed.

In the above-described processing, the operation of moving the variator lens 103 to the lens-focusable focal length area when the film adapter is attached is the operation of moving the variator lens 103 to a wider-angle side than the position A as viewed in FIG. 3. Accordingly, since any position on the wider-angle side can be known in advance before the attachment of the film adapter, the variator lens 103 can be made to move anywhere on the wider-angle side than the position A shown in FIG. 3.

According to the fourth embodiment, even if the operator does not operate the switch 128 to manually select the lens-driving operation required for the attachment of the film adapter, the variator lens 103 is automatically forcedly moved to the lens-focusable focal length area when photography of a negative film is to be started, whereby it is possible to avoid the phenomenon of the negative film being incapable of being focused when the film adapter is attached.

In addition, the negative/positive reversal on/off switch (not shown) which is included in the switch group 120 of FIG. 6 may be omitted. If the VTR-integrated type camera is arranged so that the negative/positive reversal function, when the attachment of the film adapter is automatically detected, automatically operates to automatically drive the variator lens 103 to the lens-focusable focal length area, the VTR-integrated type camera can be made far easier to operate. Accordingly, even if a video image is to be obtained from a negative film after normal video shooting has been performed, it is possible to pick up an optimum image while effecting smooth focusing, without the need for a complicated operation.

(Fifth Embodiment)

An image pickup;apparatus according to a fifth embodiment is constructed similarly to that shown in FIG. 6. The fifth embodiment uses the control flow shown in FIG. 15, and the feature of the fifth embodiment resides in the processing of Step S104.

Figure 18:
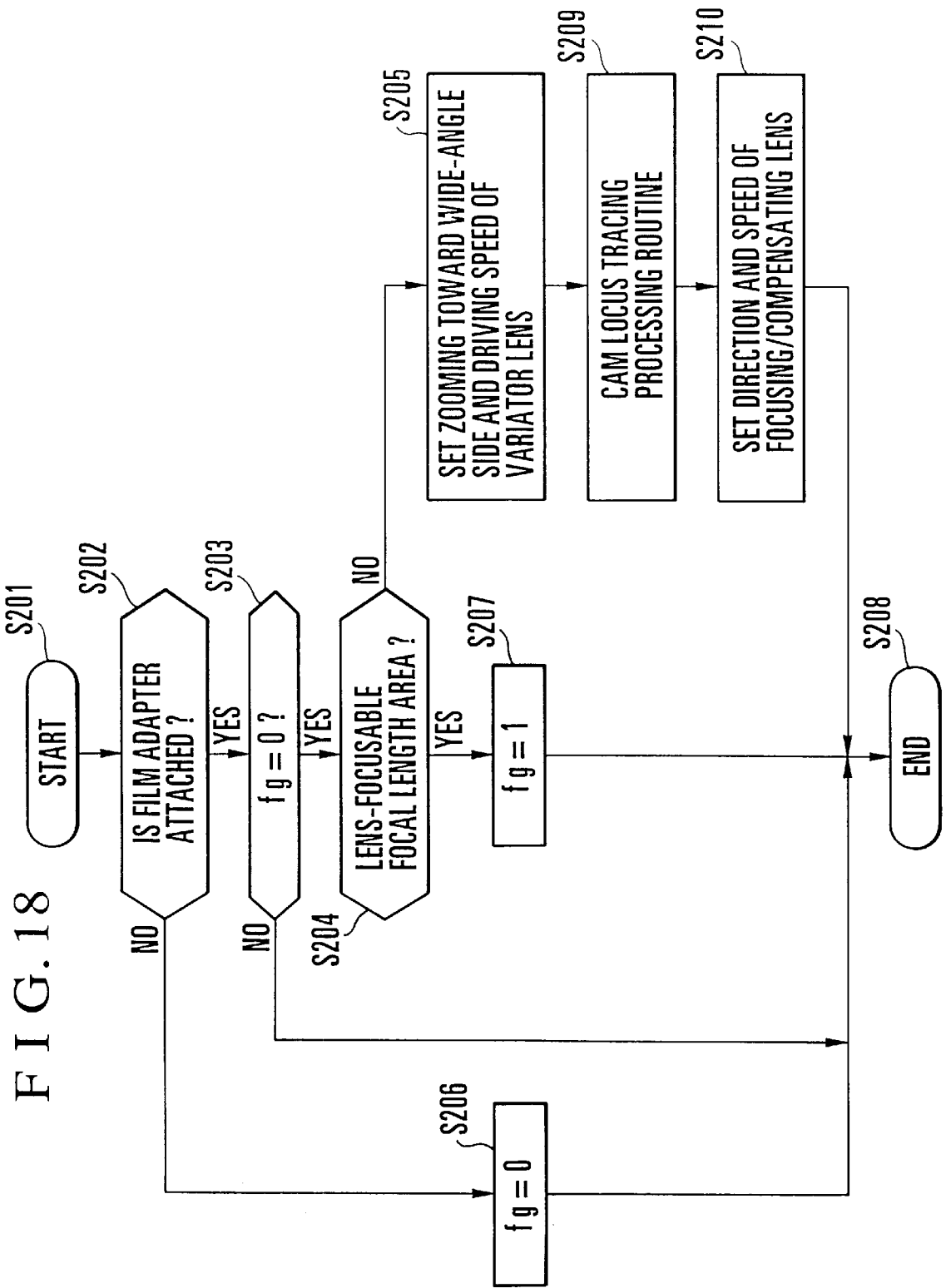
FIG. 18 is a flowchart showing a magnification varying operation and a focusing operation according to the fifth embodiment.
Figure 19:
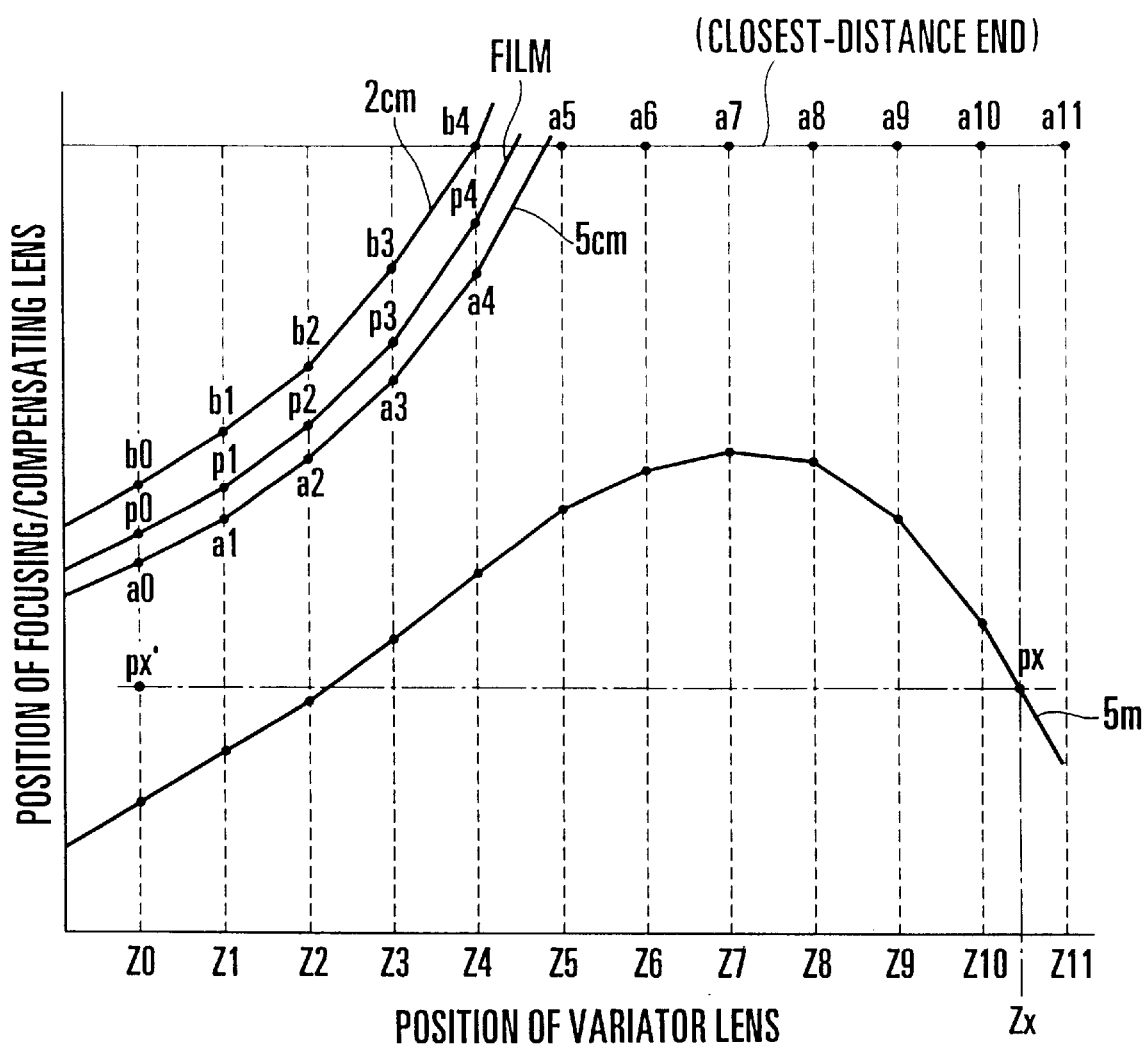
FIG. 19 is a characteristic chart aiding in describing the magnification varying operation and the focusing operation according to the fifth embodiment.

FIG. 18 shows an operational flow according to the fifth embodiment, and shows in detail the contents of the processing routine of Step S104 of FIG. 15 for forcedly moving the variator lens 103 to the lens-focusable focal length area when the film adapter is attached. In FIG. 18, identical reference numerals are used to denote steps substantially identical to, the processing steps shown in FIG. 16, and the description thereof is omitted. In the flowchart of FIG. 18, Steps S209 and S210 are added to the steps shown in FIG. 16. Referring to FIG. 18, in Step S205, the driving direction of the variator lens 103 is set to the wide-angle side, and the driving speed of the variator lens 103 is set. Then, in Step S209, a cam locus tracing operation is performed. FIG. 19 shows part of the representative cam locus table stored in an AF microcomputer of the focusing/compensating lens driver 115.

In FIG. 19, a cam locus (p0, p1, . . . ) denoted by "FILM" is a cam locus to be traced by the focusing/compensating lens 106 to maintain an in-focus state when the film adapter is attached with a film or the like being located at a predetermined distance. A cam locus (a0, a1, . . . ) denoted by "5 cm" is a stored cam locus to be traced by the focusing/compensating lens 106 for a subject distance of 5 cm, and a cam locus (B0, b1, . . . ) denoted by "2 cm" is a stored cam locus to be traced by the focusing/compensating lens 106 for a subject distance of 2 cm. If the variator lens 103 traces either of the stored cam loci denoted by "5 cm" and "2 cm", the focusing/compensating lens 106 passes the closest-distance end defined on a software basis when the variator lens 103 lies on a more telephoto side than the vicinity of Z4. Therefore, if the variator lens 103 lies on a more telephoto side than the vicinity of Z4, the closest-distance end of each of the stored cam loci denoted by "5 cm" and "2 cm" becomes a5, a6, . . . The stored cam locus denoted by "FILM" to be traced by the focusing/compensating lens 106 when the film adapter is attached at the predetermined subject distance is located between the stored cam loci denoted by "5 cm" and "2 cm".

In the cam locus table stored in the AF microcomputer, the cam locus denoted by "5 cm" is closest to the cam locus to be traced when the film adapter is attached at the predetermined subject distance. Which cam locus becomes closest to the cam locus relative to the predetermined subject distance depends on what representative cam loci are selected or the type of optical system of the film adapter. In the following description, it is assumed that the stored closest cam locus is the cam locus relative to a subject distance of 5 cm. Furthermore, by way of example, it is assumed that the lens-focusable focal length area of the variator lens 103 lies on a more telephoto side than the position A as viewed in FIG. 3, and that the current position of the variator lens 103 is Zx as viewed in FIG. 19 and the current position of the focusing/compensating lens 106 is px as viewed in FIG. 19. If only the variator lens 103 is made to move to the lens-focusable focal length area, for example, the wide-angle end without causing the focusing/compensating lens 106 to trace a cam locus, the position of the focusing/compensating lens 106 becomes px', so that the film or the like attached to the film adapter is not brought into focus.

If the variator lens 103 is made to move to the lens-focusable focal length area, i.e., the wide-angle side, while the focusing/compensating lens 106 is being made to trace the cam locus relative to the attachment of the film adapter, the amount of defocusing can be minimized. Accordingly, if the current position of the focusing/compensating lens 106 is px, a destination to be reached by the focusing/compensating lens 106 when the variator lens 103 is made to move toward the wide-angle end becomes a10 and the positional difference a10-px becomes a distance $\Delta F$ by which to move the focusing/compensating lens 106. The driving speed of the focusing/compensating lens 106 is, therefore, calculated by dividing the distance $\Delta F$ by the time required for the variator lens 103 to move from Zx to Z10 by a positional difference $\Delta Z$, that is:

$$Fsp = \Delta F * Zsp / |\Delta Z| \qquad (4)$$

where

Fsp: driving speed of the focusing/compensating lens 106, and

Zsp: driving speed of the variator lens 103.

Figure 4:
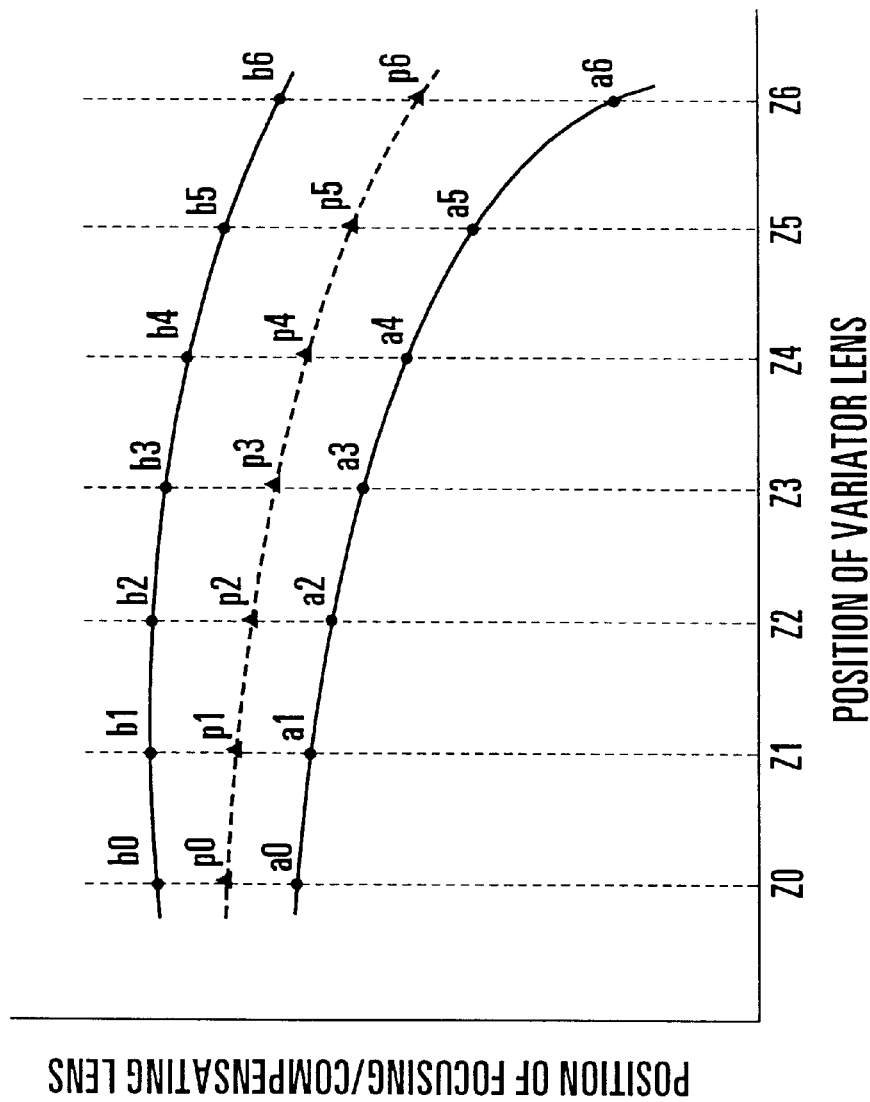
FIG. 4 is a characteristic chart aiding in describing a cam locus tracing method for the focusing/compensating lens.
Figure 5:
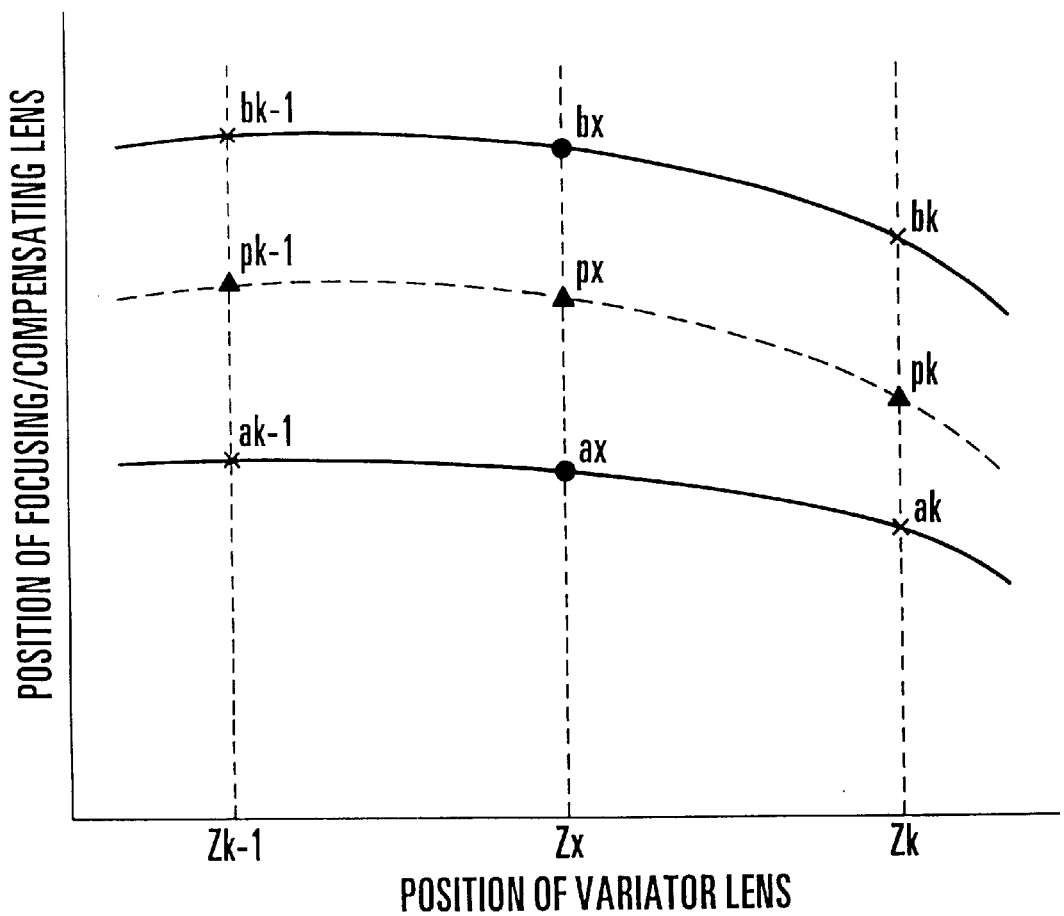
FIG. 5 is a characteristic chart aiding in describing a method for interpolating the position of the variator lens.

In the above description, a10 and Z10 are the destinations indicated by values contained in the stored cam locus table, which are closest to the current position on a wide-angle side than the current position. Then, in Step S210, if the distance $\Delta F$ is positive, the driving direction of the focusing/compensating lens 106 is set to the closest-distance end, while if the distance $\Delta F$ is negative, the driving direction of the focusing/compensating lens 106 is set to the infinity end, and the driving speed Fsp of the focusing/compensating lens 106 is set. If the position of the variator lens 103 is a wider-angle side than Z4, the position of the film adapter is an intermediate one between the subject distances of 5 cm and 2 cm, and p3 is a destination to be reached by the focusing/compensating lens 106 when the variator lens 103 moves from Z4 to Z3. As shown in FIG. 4, p3 is a point determined when a3 and b3 contained in the respective stored cam loci (5 cm) and (2 cm) are multiplied by β/γ, and hence, the aforesaid equation (1) becomes:

$$p3=(|p4-a4|/|b4-a4|)\times|b3-a3|+a3. \quad (5)$$

In this manner, while the variator lens 103 is being forcedly moved, the focusing/compensating lens 106 is made to move so that the focusing/compensating lens 106 can trace p2, p1 and p0 which allow the film or the like attached to the film adapter to be in focus. Incidentally, if representative cam loci which contain in-focus positions for the film or the like attached to the film adapter are stored in the representative cam locus table, a calculation such as Equation (5) may be omitted, and a position at which the focusing/compensating lens 106 can bring the film or the like into focus according to the position of the variator lens 103 needs only to be read from the stored representative cam locus table. Then, the process proceeds to Step S208, in which the preliminary processing routine for the attachment of the film adapter is completed.

Incidentally, the operation of moving the variator lens 103 to the lens-focusable focal length area when the film adapter is attached indicates the operation of moving the variator lens 103 to a wider-angle side than the position A as viewed in FIG. 3, and any position on the wider-angle side can be known in advance, as described previously in connection with the third embodiment. In addition, in Step S202, the decision made as to whether the film adapter is attached may be replaced with a decision made as to whether the mode for photographing a subject located at a predetermined distance has been selected, as described previously in connection with the third embodiment. Furthermore, the driving of the variator lens 103 is performed in a manner similar to that described previously in connection,with each of the first and third embodiments, in accordance with the variator-lens driving bit (wide-angle or telephoto) and the variator-lens driving speed Zsp.

Furthermore, as in the case of the third embodiment, when the film adapter is attached, the lens/camera control circuit 118 informs the system controller 119 that the variator lens 103 is being forcedly moved, so that the photographer can correctly recognize that the variator lens 103 is being forcedly moved since the film adapter is attached. In addition, the system controller 119 controls the character generator 127 to display in the LCD 126 a display image corresponding to the received information indicating that the variator lens 103 is being forcedly moved, thereby enabling the photographer to recognize that forced zooming is being performed since the film adapter is attached.

According to the fifth embodiment, it is possible to avoid the phenomenon of a film being defocused during the forced movement of the variator lens 103 when the film adapter is attached, by causing the focusing/compensating lens 106 to trace an in-focus cam locus relative to the film or the like attached to the film adapter while the variator lens 103 is being forcedly moved to the lens-focusable focal length area. In addition, since the photographer can be informed through the LCD 126 that the variator lens 103 is being forcedly moved to the lens-focusable focal length area since the film adapter is attached, it is possible to prevent the photographer from erroneously recognizing the status of photography during forced zooming when the film adapter is attached.

(Sixth Embodiment)

In the description of a sixth embodiment, reference will be made to a method applicable to an arrangement which does not have the switch 128, which method includes automatically detecting the attachment of the film adapter and, when the film adapter is attached, forcedly moving the variator lens 103 to the lens-focusable focal length area while moving the focusing/compensating lens 106 to an in-focus cam locus relative to a predetermined position at which a subject is located. The construction of the internal construction of the camera signal processing circuit 109 is as shown in FIGS. 9 and 12. A method of detecting whether a negative film, i.e., a film adapter is attached, and a negative/positive reversal method are similar to the methods described previously in connection with the second and fourth embodiments.

Figure 20:
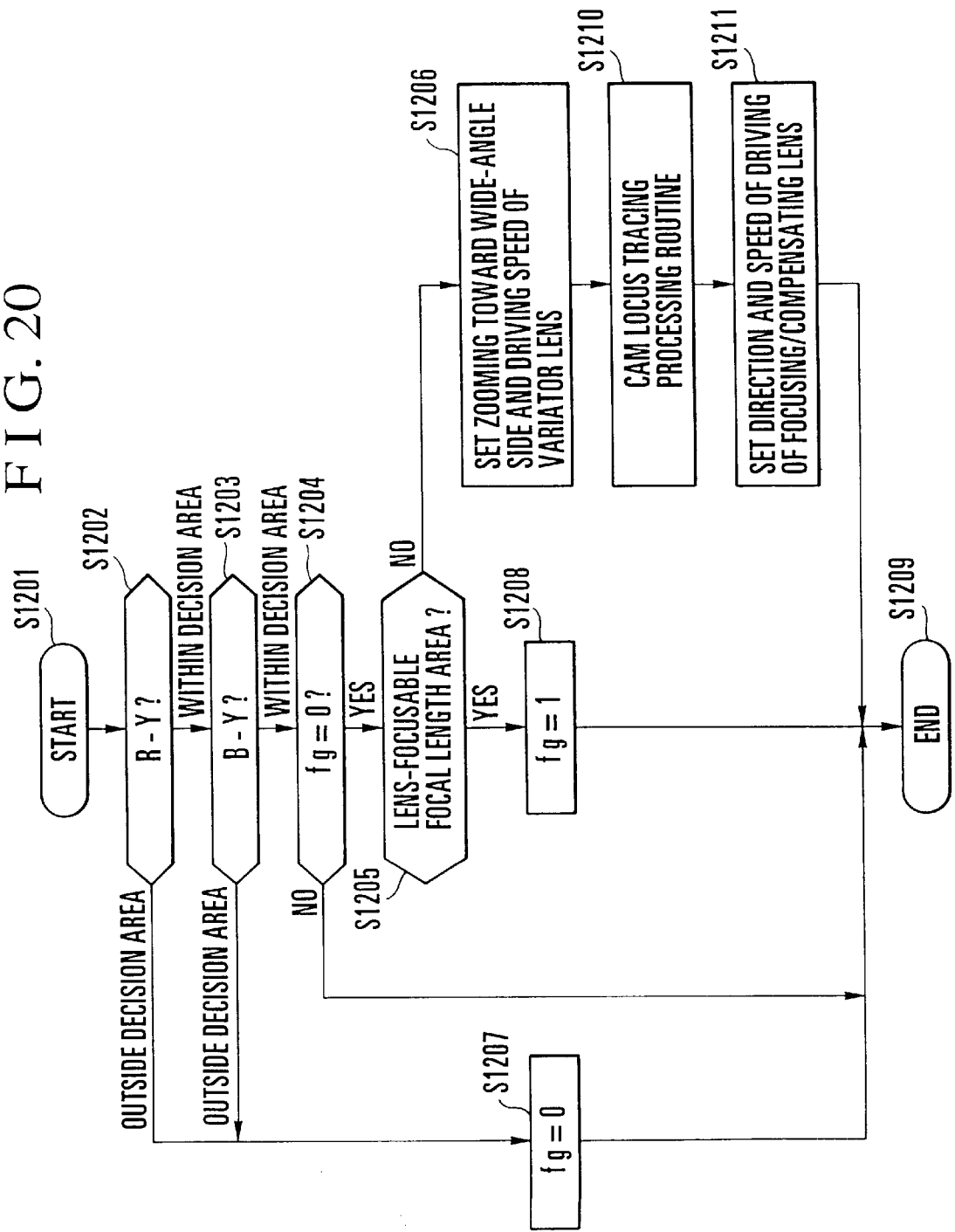
FIG. 20 is a flowchart showing a magnification varying operation and a focusing operation according to a sixth embodiment.

FIG. 20 is a flowchart showing a control flow according to the sixth embodiment, for detecting, through the camera control circuit 807 shown in FIGS. 9 and 12, whether a negative film is being photographed, to automatically detect the attachment of the film adapter, and, when the negative film is attached, forcedly moving the variator lens 103 to the lens-focusable focal length area while causing the focusing/compensating lens 106 to trace an in-focus cam locus a predetermined position at which a subject is located. In the flowchart of FIG. 20, Steps S1210 and S1211 are added to the steps shown in FIG. 17. In FIG. 20, identical reference numerals are used to denote steps substantially identical to the processing steps shown in FIG. 17, and the description thereof is omitted.

Referring to FIG. 20, in Step S1206, the driving direction of the variator lens 103 is set to the wide-angle side, and the driving speed of the variator lens 103 is set. Then, the process proceeds to Steps S1210 and S1211, in which the focusing/compensating lens 106 is driven so that it can trace an in-focus cam locus relative to the film attached to the film adapter. This method is the same as the method used insteps S209 and S210 described above in connection with the fifth embodiment. Then, the process proceeds to Step S1209, in which the preliminary processing routine for the attachment of the film adapter is completed.

In the above-described processing, the operation of moving, when the film adapter is attached, the variator lens 103 to the lens-focusable focal length area while causing the focusing/compensating lens 106 to trace an in-focus cam locus relative to the predetermined position at which the subject is located indicates the operation of moving the variator lens 103 along a cam locus 601 on a wider-angle side than the position A as viewed in FIG. 3. Accordingly, since any position on the wider-angle side can be known in advance before the attachment of the film adapter, the variator lens 103 can be made to move anywhere on the wider-angle side than the position A shown in FIG. 3.

According to the sixth embodiment, even if the operator does not operate the switch 128 to manually select the lens-driving operation required for the attachment of the film adapter, when photograph of a negative film is to be started, the variator lens 103 is automatically forcedly moved to the lens-focusable focal length area while the focusing/compensating lens 106 is being made to trace the in-focus cam locus relative to the predetermined position at which the subject is located. Accordingly, it is possible to avoid the phenomenon of the film being defocused during the forced movement of the variator lens 103 when the film adapter is attached.

Incidentally, the negative/positive reversal on/off switch which is included in the switch group 120 of FIG. 6 may be omitted. If the VTR-integrated type camera is arranged so that the negative/positive reversal function, when the attachment of the film adapter is automatically detected, automatically operates to automatically forcedly move the variator lens 103 to the lens-focusable focal length area while causing the focusing/compensating lens 106 to trace an in-focus cam locus relative to the predetermined position at which a subject is located, the VTR-integrated type camera can be made far easier to operate. Accordingly, even if an image pickup operation for obtaining a video image from a negative film is performed immediately after normal video shooting has been performed, it is possible to pick up an optimum image while effecting smooth focusing, without the need for a complicated operation.

As described above, according to the above-described embodiments, when a mode for photographing a subject located at a predetermined distance is effective, an area in which first lens means is movable during a magnification varying operation can be varied to avoid the zooming operation of moving a variator lens to a focusing-impossible area. Accordingly, if a negative or positive film or the like is to be photographed with a video camera by using, for example, a film adapter or the like, a zooming-possible area is varied so that zooming is made possible on only a wide-angle side and the variator lens is inhibited from moving to the focusing-impossible area, whereby it is possible to prevent the subject from being greatly defocused.

Furthermore, since the first lens means is forcedly moved to a lens-focusable focal length area when the mode for photographing a subject located at a predetermined distance is selected, it is possible to avoid occurrence of a focusing-impossible state when such mode is selected. Accordingly, if a negative or positive film or the like is to be photographed with the video camera by using, for example, the film adapter or the like, a variator lens is forcedly moved to a lens-focusable focal length area if the variator lens is not located in the lens-focusable focal length area at the time of start of such mode, whereby it is possible to prevent focusing from becoming impossible at the time of start of the mode to cause a greatly defocused state.

Furthermore, when holding means for placing the subject at the predetermined distance is in the state of being attached to the image pickup apparatus, or when the operation of attaching such holding means to the image pickup apparatus is performed, it is possible to automatically execute control for moving the first lens means and forcedly performing the aforesaid magnification varying operation.

Furthermore, it is possible to automatically perform the aforesaid control by detecting through electrical processing the fact that the aforesaid mode has been set.

Furthermore, it is possible to obtain a sharp positive image in a case where an image is picked up from a negative film located at a predetermined distance.

Furthermore, it is possible to perform focus adjustment which causes second lens means to maintain an in-focus state according to the magnification varying operation of the first lens means.

Furthermore, since it is possible to inform a user that the aforesaid magnification varying operation is forcedly performed by control means, the user can be prevented from erroneously recognizing the magnification varying operation as a malfunction.

Furthermore, it is possible to pick up an image with a photographic film or a negative film being securely set at the predetermined distance.

(Seventh Embodiment)

A seventh embodiment of the present invention will be described below.

Although the above-described first to sixth embodiments are intended to solve problems resulting from a zooming function, the following seventh to eighteenth embodiments are intended to optimize an automatic focus adjustment (AF) function for close-up photography with a film adapter or the like being attached to the image pickup apparatus.

The seventh to eighteenth embodiments will be described below in that order together with their common background.

In the above-described negative/positive reversal function, video information simply obtainable from a negative film literally has the form of the reversal of a positive image. For example, FIG. 10, which has been referred to previously, shows one example of an indication of color-difference vectors respectively indicating negative and positive states of a color negative film. As is apparent from FIG. 10, the color-difference vectors are 180° reverse to each other between the two negative and positive states.

Figure 21:
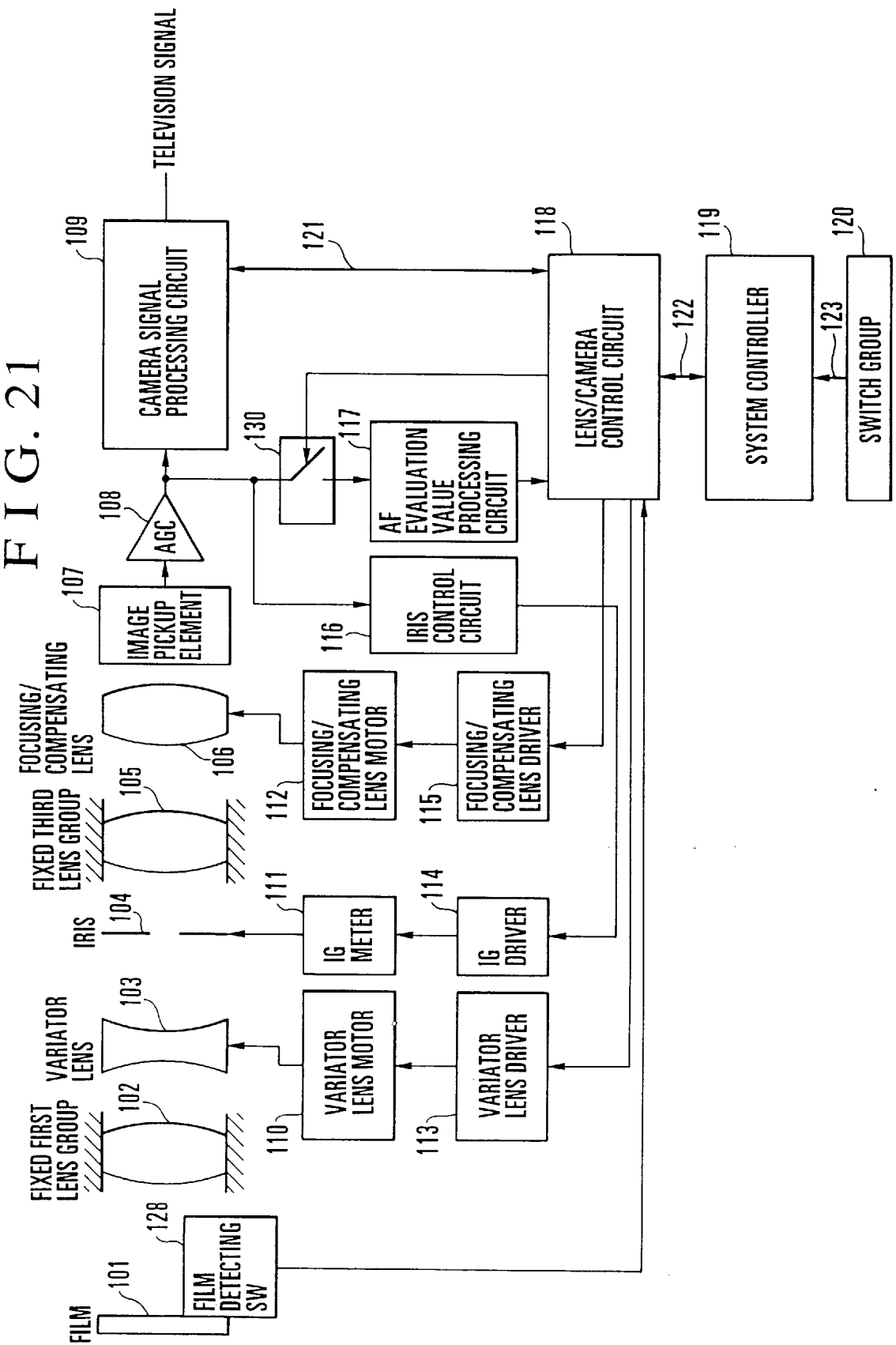
FIG. 21 is a block diagram showing the construction of an image pickup apparatus according to each of seventh, eleventh and fifteenth embodiments.

FIG. 21 is a block diagram schematically showing the construction of a VTR-integrated type camera which is presupposed by the seventh embodiment. In FIG. 21, identical reference numerals are used to denote constituent elements identical to those shown in FIG. 16, and the description thereof is omitted.

Figure 2:
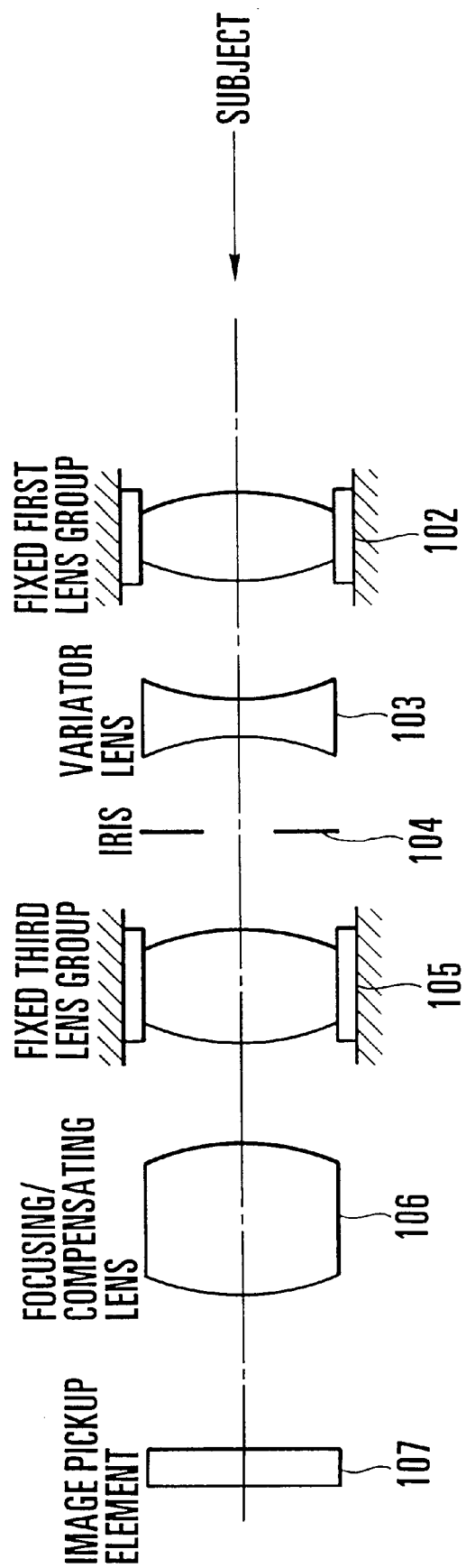
FIG. 2 is a schematic view of the construction of an inner focus type lens system.

The lens system used in the construction shown in FIG. 21 is the inner focus type lens system shown in FIG. 2.

A gate circuit 130 which is represented as a switch in FIG. 21 is controlled by the lens/camera control circuit 118, and serves to set a picture area from which to extract a video signal for focus detection. In FIG. 21, the illustration of the output side of the camera signal processing circuit 109 is omitted.

In the inner focus type lens system, as described previously with reference to FIG. 3, if an in-focus image is to be obtained on an image pickup surface when a film located at an extremely close distance from the fixed first lens group 102 is being photographed by using the film adapter 903 shown in FIG. 1, the combination of the positions of the variator lens 103 and the focusing/compensating lens 106 must be contained in a portion 604 defined by three areas 601, 602 and 603 in FIG. 3.

Figure 33:
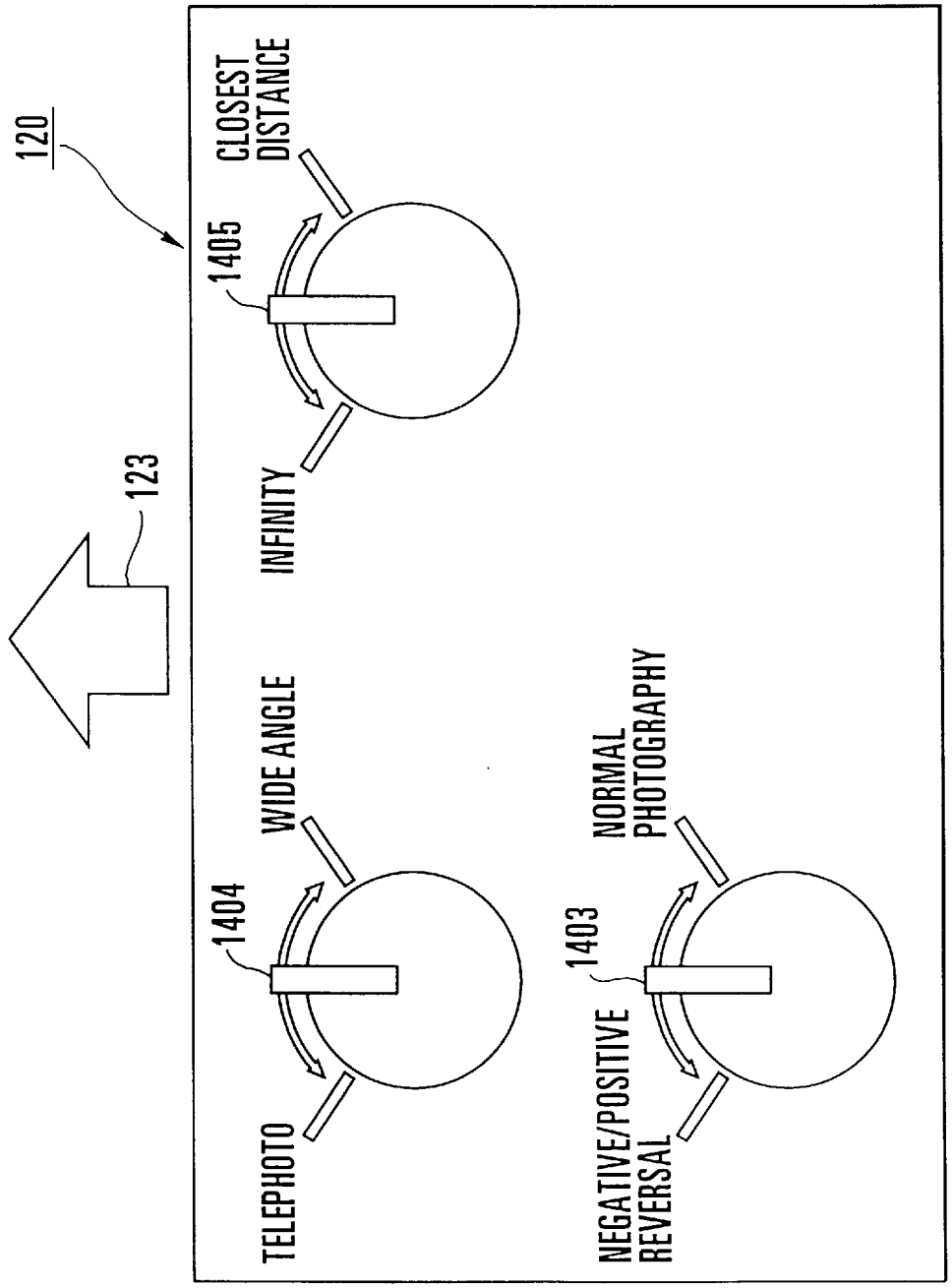
FIG. 33 is a schematic view of a switch group.

Accordingly, if the film is to be photographed in the manner shown in FIG. 1, as shown in FIG. 33 by way of example, not only is it necessary to set the position of the variator lens 103 to a position inside the area 602 by manually operating a magnification varying rate adjusting switch 1404 disposed in the switch group 120, but also it is necessary to actuate an autofocus circuit or to move the focusing/compensating lens 106 into the area 603 by manually operating a manual focusing/compensating lens moving switch 1405 disposed in the switch group 120.

Figure 34:
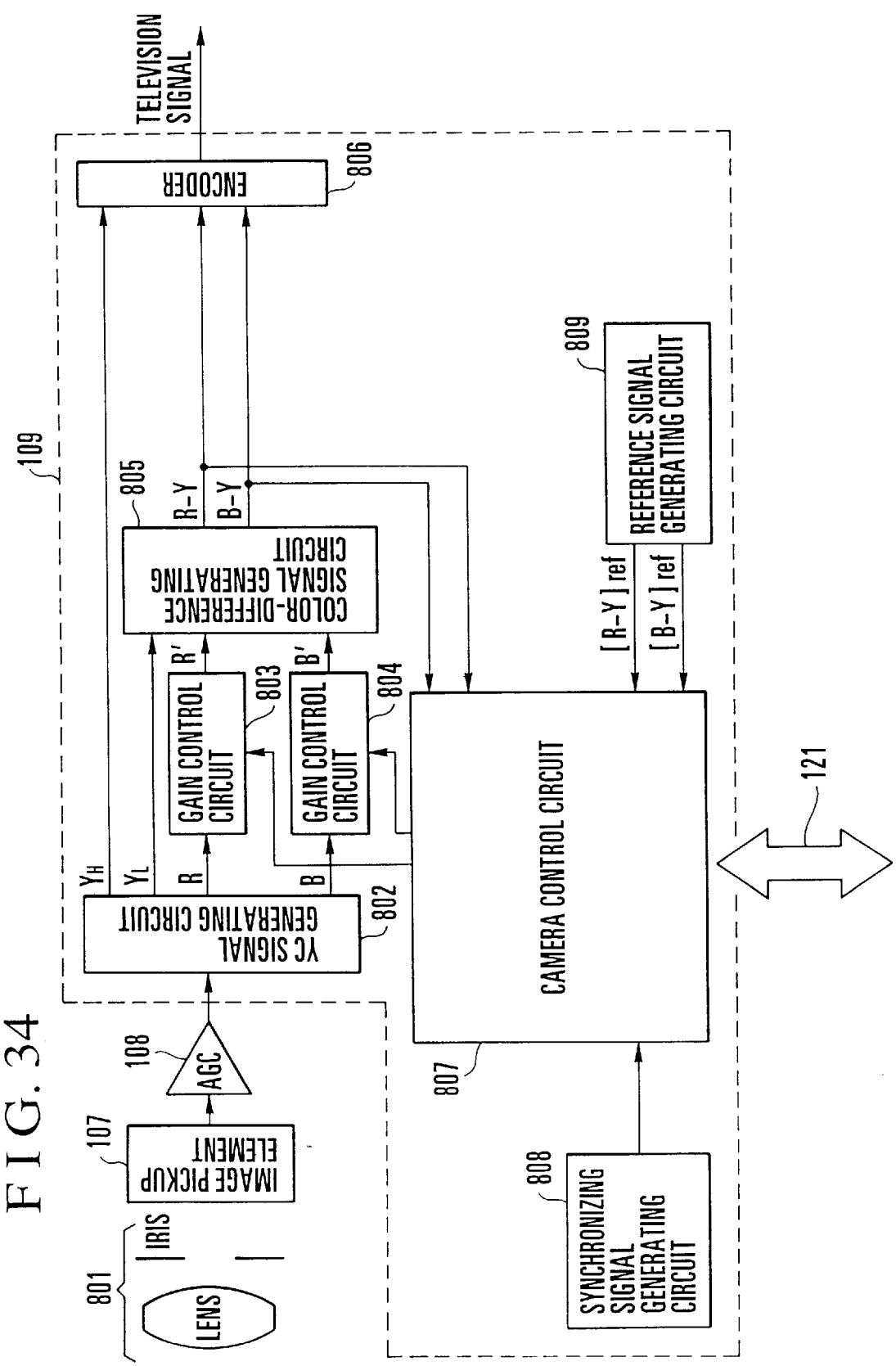
FIG. 34 is a block diagram of the internal construction of a camera signal processing circuit.

FIG. 34 is a block diagram showing the internal construction of the camera signal processing circuit 109 which is not provided with a negative/positive reversal function. Although simplified in illustration, the lens system 801 includes the first lens group 102, the variator lens 103, the iris 104, the third lens group 105 and the focusing/compensating lens 106 all of which are shown in FIG. 21 and 2. The YC signal generating circuit 802 separates luminance signals $Y_H$ and $Y_L$ and color signals R and B from the output of the AGC circuit 108 and outputs these signals $Y_H$, $Y_L$, R and B. The camera control circuit 807 detects the levels of color-difference signals R-Y and B-Y and adjusts the gains of the R and B gain control circuits 803 and 804 so as to provide appropriate white balance, and the gain control circuits 803 and 804 output adjusted color signals R' and B', respectively. The color-difference signal generating circuit 805 generates the color-difference signals R-Y and B-Y from the luminance signal $Y_L$ and the color signals R' and B', and the encoder 806 generates a television signal from the luminance signal $Y_H$ and the color-difference signals R-Y and B-Y. The synchronizing signal generating circuit 808 supplies a synchronizing signal to the camera control circuit 807, and the reference signal generating circuit 809 generates the reference signals $[R-Y]_{ref}$ and $[B-Y]_{ref}$ for adjusting the respective gains of the gain control circuits 803 and 804.

The construction of the camera signal processing circuit 109 to which a negative/positive reversal function is added is similar to that shown in FIG. 9. Unlike the construction shown in FIG. 34, the negative/positive reversal circuit 1001, the image memory 811 and the communication line 810 are inserted before the encoder 806, and the negative/positive reversal on/off signals 1002 and 1003 are communicated. The negative/positive reversal circuit 1001 reverses each of the signals $Y_H$, R-Y and B-Y. The construction of the negative/positive reversal circuit 1001 is shown in FIG. 11. In the construction shown in FIG. 11, the input luminance signal $Y_H$ is reversed from a bright portion to a dark portion and from a dark portion to a bright portion. Specifically, for example, in the computing circuit 1201, an absolute value of the input luminance signal within the range of, from a black level based on a black level reference to a luminance level of white 100% is subtracted from the luminance level of white 100%, whereby a luminance component which is reversed in the relationship between the bright portion and the dark portion on the basis of a white 100% reference is taken out. In the computing circuit 1203, the R-Y signal is reversed on the R-Y axis, and in the computing circuit 1205, the B-Y signal is reversed on the B-Y axis.

By reversing each of the luminance signal and the color-difference signals in the above-described manner, a negative video image can be converted into a positive video image. The switches 1202, 1204 and 1206 interlockingly operate in response to the negative/positive reversal on/off signal 1002, and are arranged to output the aforesaid corresponding reversed signals when they are turned on, or the corresponding input signals without modification when they are turned off. The negative/positive reversal on/off signal 1002 is outputted from the camera control circuit 807. An operator determines whether to execute such negative/positive reversal, by switching a negative/positive reversal function selecting switch 1403 in the switch group 120 shown in FIG. 33. This information passes through the communication line 123, the system controller 119, the communication line 122 and the lens/camera control circuit 118, and is transmitted to the camera control circuit 807 through the communication line 121 as shown at 1003 in FIG. 9. On the basis of the transmitted information, the camera control circuit 807 outputs the negative/positive reversal signal 1002.

The autofocus system of the image pickup apparatus will be described below.

An apparatus such as a video camera employs a focusing method which includes detecting, as an evaluation value, the sharpness of an image from a video signal indicative of an image of a subject, and controlling the position of a focusing lens so that the evaluation value becomes a maximum. As the valuation value, it is general practice to use the strength of a high-frequency component of a video signal extracted by a band-pass filter, and the like. During the photography of a normal subject, if the subject is out of focus, the evaluation value is small, but as the subject is gradually brought into focus, the evaluation value becomes larger. If the subject is completely focused, the evaluation value reaches a maximum. Accordingly, during the control of the focusing/compensating lens 106, if the evaluation value is small, the focusing/compensating lens 106 is moved as fast as possible in the direction in which the evaluation value becomes greater, and as the evaluation value becomes greater, the focusing/compensating lens 106 is moved slower so that the focusing/compensating lens 106 is precisely stopped on "the top of a hill". Such an autofocus system is generally called a hill-climbing autofocus system (hereinafter referred to as "hill-climbing AF"). With the recent reductions in the size and weight of cameras, the hill-climbing AF system has become popular in latest video cameras, because the hill-climbing AF system makes it possible to realize a simple AF system.

Figure 35:
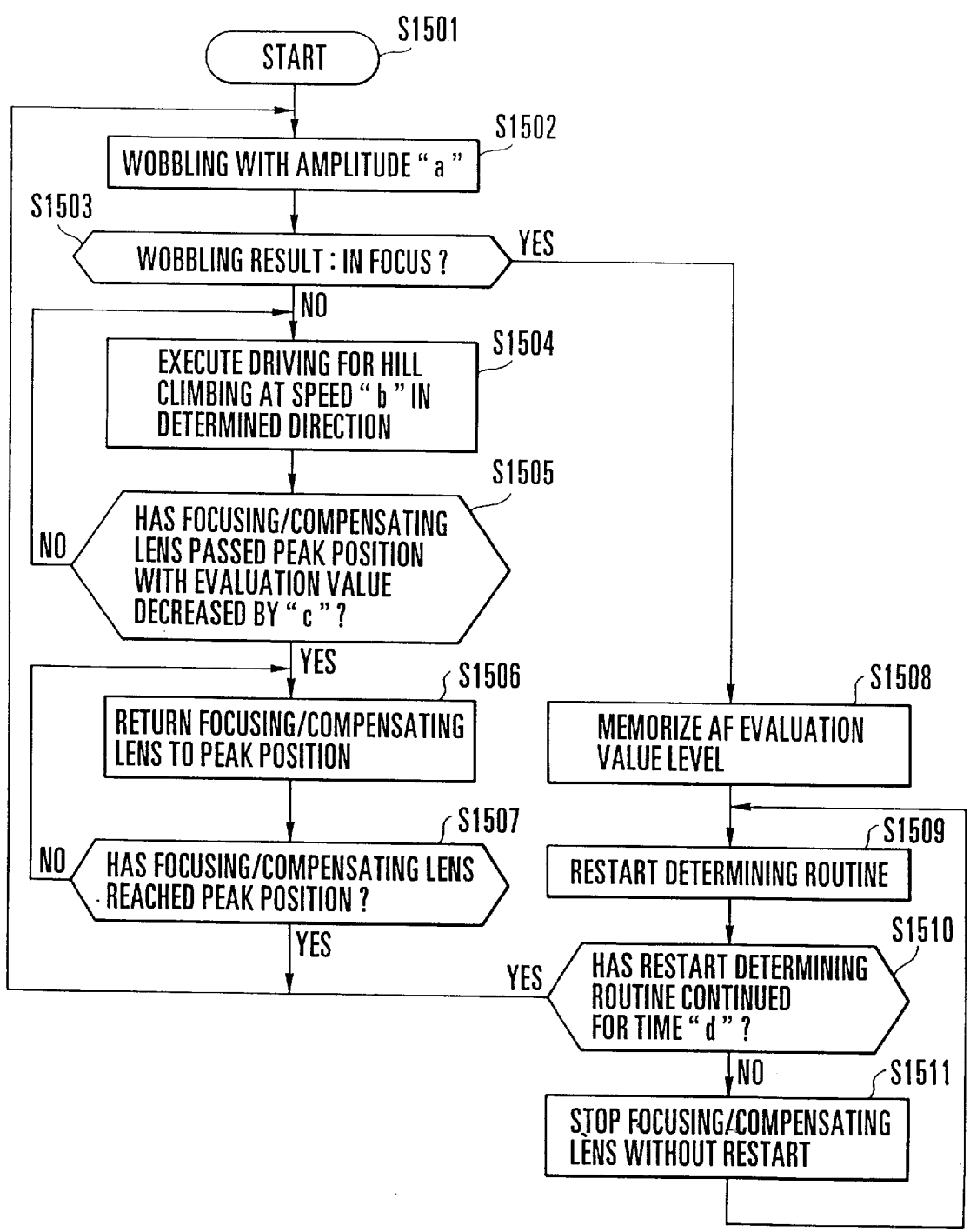
FIG. 35 is a flowchart of general AF control.

FIG. 35 is a flowchart of AF control to be processed in the lens/camera control circuit 118.

Step S1501 indicates the start of the process. The lens/camera control circuit 118 obtains an AF evaluation value while driving the focusing/compensating lens 106 by a small amount equivalent to an amplitude "a" through a wobbling operation, and determines whether the current state of focus is an in-focus state or an out-of-focus state (Step S1502). (If it is determined that the state of focus is an out-of-focus state, it is determined whether the state of focus is a near-focus state or a far-focus state.) Then, in Step S1503, it is determined whether the focusing/compensating lens 106 is currently in focus, from the result of the wobbling operation. If it is determined that the focusing/compensating lens 106 is in focus, the lens/camera control circuit 118 stops the focusing/compensating lens 106, and the process proceeds to a restart monitoring routine which starts from Step S1508. If it is determined in Step S1503 that the focusing/compensating lens 106 is not in focus, the process proceeds to Step S1504 to execute the hill-climbing operation of driving the focusing/compensating lens 106 at a speed "b" in a direction determined by the result of the decision made through the wobbling operation.

In Step S1505, it is determined whether the focusing/compensating lens 106 has passed an in-focus point, i.e., the peak of the AF evaluation signal. If the focusing/compensating lens 106 has not passed the peak of the AF evaluation signal, the lens/camera control circuit 118 continues the hill-climbing operation. If the focusing/compensating lens 106 has passed the peak with the AF evaluation signal decreased by a predetermined amount "c", the lens/camera control circuit 118 returns the focusing/compensating lens 106 to the peak (S1506 and S1507).

While the operation of returning the focusing/compensating lens 106 to the peak is being performed, the state of a subject may vary, as by panning. For this reason, when the focusing/compensating lens 106 reaches the peak, the process returns to Step S1502 to again execute a wobbling operation in order to determine whether the current position of the focusing/compensating lens 106 exactly is the peak, i.e., an in-focus point.

If it is determined in Step S1503 that the focusing/compensating lens 106 is in focus, the process proceeds to the restart monitoring routine which starts from Step S1508. In Step S1508, first, the lens/camera control circuit 118 memorizes the AF evaluation value level obtained during the in-focus state. Step S1509 is a restart determining routine for determining whether the current AF evaluation value level has varied compared to the AF evaluation signal level memorized in Step S1508 during the in-focus state. For example, if the current AF evaluation value level has varied by not less than a predetermined percent with respect to the memorized signal level, it is determined that the state of the subject has changed, as by panning, and the driving of the focusing/compensating lens 106 needs to be restarted. If the amount of variation in the current AF evaluation value level is less than the predetermined percent, it is determined that the state of the subject has not changed and the driving of the focusing/compensating lens 106 does not need to be restarted. Then, if it is determined in Step S1510, according to the result of the decision made in Step S1509, that a decision to restart the driving of the focusing/compensating lens 106 has not continued for a period of time "d", the focusing/compensating lens 106 is stopped at that position. Then, the process returns to Step S1508, in which restart monitoring is again performed. If it is determined in Step S1510 that the decision to restart the driving of the focusing/compensating lens 106 has continued for the period of time "d", the process returns to Step S1502, in which the wobbling operation is again performed to determine in which direction to move the focusing/compensating lens 106. By repeating the above-described operation, the focusing/compensating lens 106 is operated so that an in-focus state can be maintained at all times.

In general, AF systems for image pickup apparatus such as cameras are mechanisms which are arranged to determine a photography status, as it were, in a arbitrary manner and adjust a lens position to a state which will be suited to the photography status, and the photographing intention of a photographer occasionally may not be reflected to a photographed image. For example, when a distant subjects and near subjects are present in a scene whose image is being picked up, if an AF operation is executed on the basis of information obtainable from the entire picture, any one of the subjects may be brought into focus, but the image pickup apparatus is incapable of determining whether the subject which is in focus is a main subject which the photographer intends to focus.

To avoid such a situation, it is general practice to adopt a method of measuring the distance to a subject present in the center of the picture in a center-weighted manner and executing AF on the basis of the measured result, as shown in FIG. 36(a). This is because many photographers desire to locate main subjects in the centers of pictures.

However, in the above-described conventional example, since the focusing/compensating lens is wobbled with an amplitude which does not cause conspicuous defocusing, the lens/camera control circuit occasionally erroneously determines in which direction to move the focusing/compensating lens. In addition, the lens/camera control circuit occasionally makes an erroneous decision since the hill-climbing speed of the focusing/compensating lens is reduced so that an image being photographed does not move unnaturally, or since the amount of decrease in an AF evaluation signal value for making a decision as to a peak is set so that the focusing/compensating lens invisibly passes the peak. In addition, after the focusing/compensating lens has passed the peak, the lens/camera control circuit again confirms through wobbling whether the focusing/compensating lens is in focus, even though panning or the like, is not at all performed. As a result, it takes an unnecessary time until the focusing/compensating lens reaches an in-focus point. Furthermore, even if a film is moved to a slight extent, the driving of the focusing/compensating lens is restarted.

If a subject such as a film or a print is moved when the subject is being photographed by using a film adapter or the like, a video signal fluctuates so that an AF evaluation value varies and an AF operation is restarted. As a result, the AF operation does not stabilize and focus fluctuates. In addition, if an image is present in the center of a film, a print or the like, the AF operation does not stabilize and focus fluctuates. During photography of the film, the print or the like, even if a subject varies, the distance to the subject is constant at all times and hence, the AF operation need not be restarted. However, if an operation which affects focusing, such as a variation in a field angle due to zooming or a variation in exposure due to an iris operation, is performed, the AF operation need be restarted. Furthermore, as long as the subject distance is constant, if the AF evaluation value acquisition area is made as large as possible, AF performance is improved to a further extent.

It is, therefore, one object of embodiments (to be described later) to solve the above-described problems by making a wobbling amplitude larger than a normal wobbling amplitude so as to correctly determine in which direction to move a focusing/compensating lens, or by shortening a focusing time by increasing a hill-climbing speed, or by setting the amount of decrease in an AF evaluation signal value which is used for detecting whether the focusing/compensating lens has reached a peak, to a value larger than a normal amount, because there is no possibility that recording of a film, a print or the like in an out-of-focus state is performed during photography using a film adapter or the like; or by shortening the focusing time by omitting the operation of confirming through wobbling whether the focusing/compensating lens is in focus at the peak, or by increasing a restart determining time and preventing the driving of the focusing/compensating lens from being unnecessarily restarted, because panning does not occur during photography using a film adapter or the like.

According to the embodiments to be described later, there is provided an image pickup apparatus which does not perform an AF restart operation based on a variation in the state of a subject but performs an AF restart operation only when any key or the like is operated, because a subject distance is constant at all times when a film, a print or the like is being photographed by using a film adapter or the like.

According to the embodiments to be described later, there is provided an image pickup apparatus capable of enlarging an AF evaluation value acquisition area as shown in FIG. 36(b) to ensure a wider AF evaluation value acquisition area, because, when a film, a print or the like is being photographed by using a film adapter or the like, a subject distance is constant and a contention in focusing between a distant subject and a near subject need not be taken into account.

According to the embodiments to be described later, there is provided an image pickup apparatus which comprises image pickup means for converting a subject image into an electrical signal via an optical system, lens means for performing focus adjustment of the optical system, extracting means for extracting an in-focus degree signal according to an in-focus degree of the optical system from the electrical signal, setting means for selectively setting a first mode for performing a normal image pickup operation and a second mode for picking up an image of a subject located at a predetermined distance, and control means for performing focus adjustment by moving the lens means on the basis of the in-focus degree signal, the control means being arranged to perform, during the focus adjustment, focus adjustment which differs in characteristic between the first mode and the second mode.

There is also provided an image pickup apparatus which comprises image pickup means for converting a subject image into an electrical signal via an optical system, lens means for performing focus adjustment of the optical system, extracting means for extracting an in-focus degree signal according to an in-focus degree of the optical system from the electrical signal, setting means for selectively setting a first mode for performing a normal image pickup operation and a second mode for picking up an image of a subject located at a predetermined distance, and control means for performing focus adjustment by moving the lens means on the basis of the in-focus degree signal, the control means being arranged to perform, during the focus adjustment, a restart operation after an in-focus state has been obtained, which restart operation is based on focus adjustment which differs between the first mode and the second mode.

There is also provided an image pickup apparatus which comprises image pickup means for converting a subject image into an electrical signal via an optical system, lens means for performing focus adjustment of the optical system, setting means for selectively setting a first mode for performing a normal image pickup operation and a second mode for picking up an image of a subject located at a predetermined distance, extracting means for extracting an in-focus degree signal according to an in-focus degree of the optical system from an area of the electrical signal, which area is determined according to each of the first and second modes in such a manner as to differ between the first and second modes, and control means for performing focus adjustment by moving the lens means on the basis of the in-focus degree signal.

A block diagram of the entire construction of an image pickup apparatus according to the seventh embodiment is identical to the block diagram shown in FIG. 21. In the seventh embodiment, the camera control circuit 807 uses a microcomputer. During photography with the film adapter, the lens/camera control circuit 118 can determine whether a film photography mode is selected, by detecting the output of a film detecting switch 125.

Figure 22:
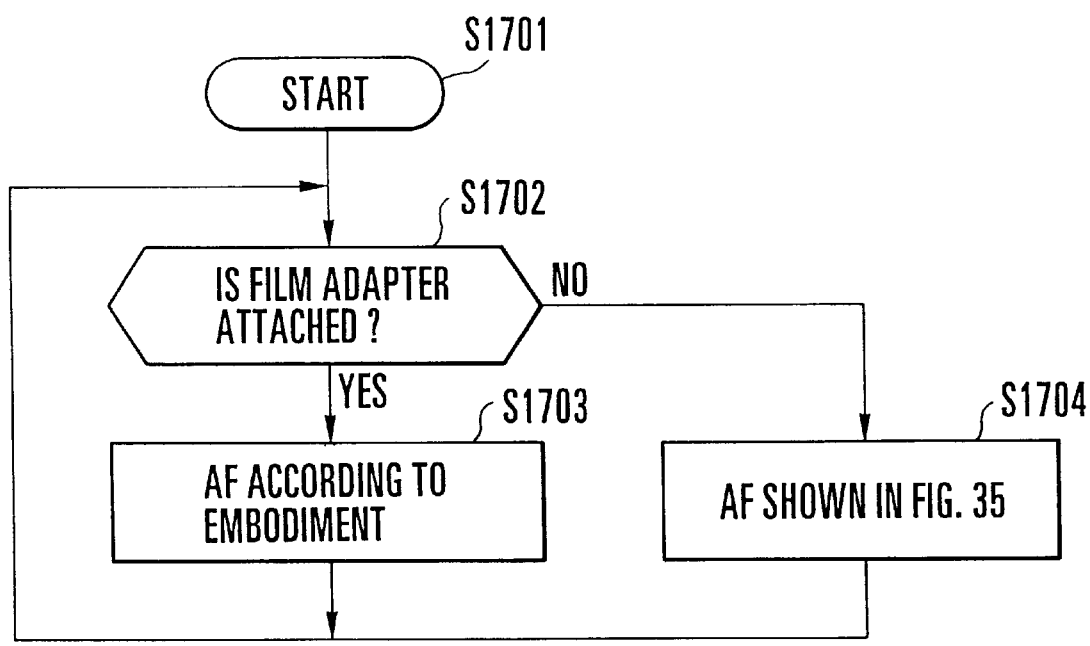
FIG. 22 is a flowchart of camera control according to each of the seventh and eleventh embodiments.

FIG. 22 is a flowchart of processing to be executed by the camera control circuit 807 in the camera signal processing circuit 109. The process is started in Step S1701, and if the attachment of the film adapter is detected in Step S1702, the process proceeds to Step S1703, in which AF control according to the seventh embodiment of FIG. 23 to be described later is performed. If the attachment of the film adapter is not detected in Step S1702, the process proceeds to Step S1704, in which the above-described AF control shown in FIG. 35 is performed. Incidentally, FIG. 22 will also be referred to in the following description of each of the eleventh and fifteenth embodiments.

Figure 23:
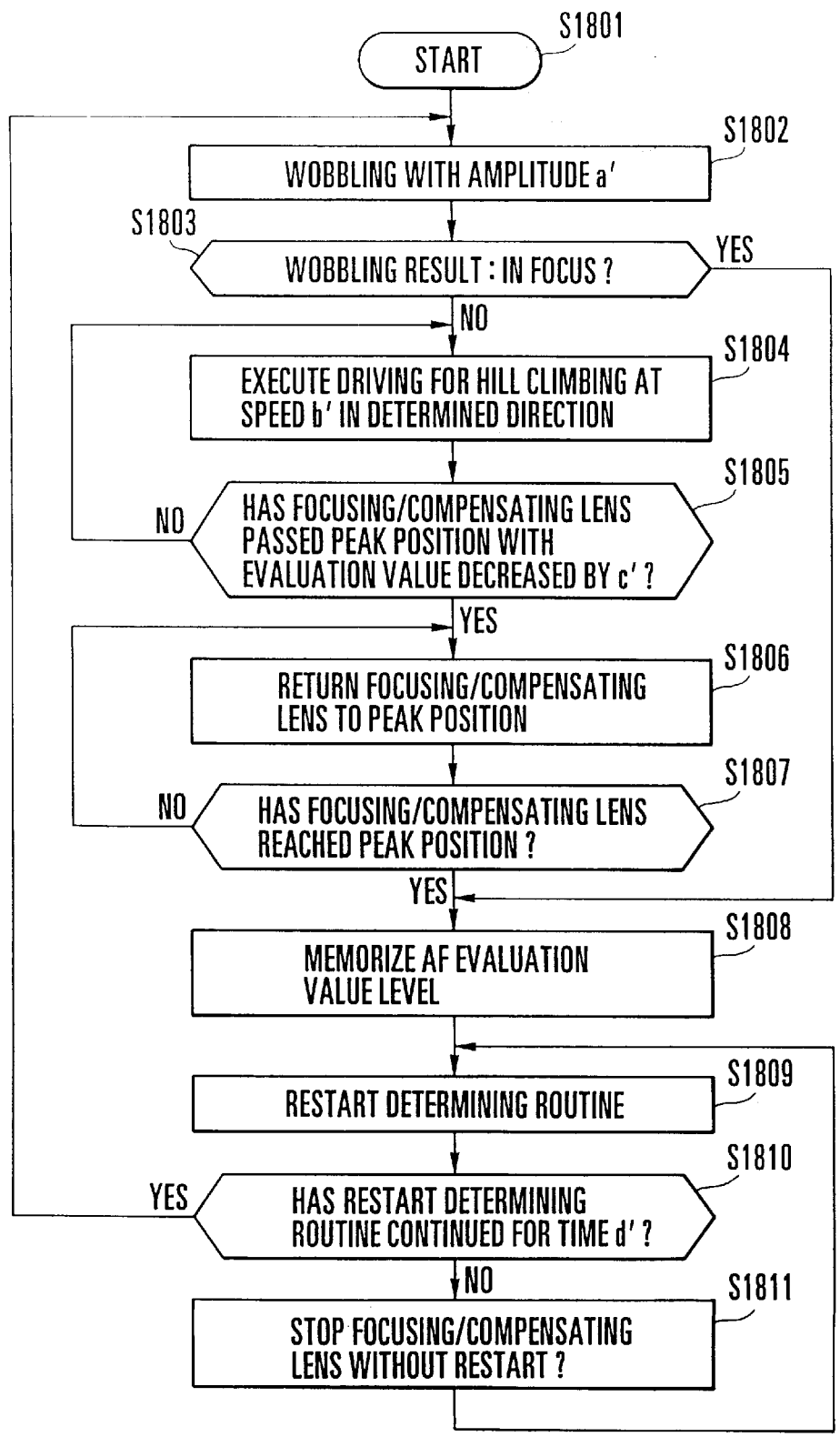
FIG. 23 is a flowchart of AF control according to each of the seventh embodiment and eighth, ninth and tenth embodiments.

FIG. 23 is a flowchart of the AF control which constitutes a feature of the seventh embodiment. This flowchart is processed in the lens/camera control circuit 118. Step S1801 indicates the start of the process. First, the lens/camera control circuit 118 obtains an AF evaluation value while driving the lens 106 with an amplitude a' larger than a normal amplitude through a wobbling operation, and determines whether the current state of focus is an in-focus state or an out-of-focus state (Step S1802). (If it is determined that the state of focus is an out-of-focus state, it is determined whether the state of focus is a near-focus state or a far-focus state.) Then, in Step S1803, it is determined whether the focusing/compensating lens 106 is currently in focus, from the result of the wobbling operation. If it is determined that the focusing/compensating lens 106 is in focus, the focusing/compensating lens 106 is stopped, and the process proceeds to a restart monitoring processing routine which starts from Step S1808.

If it is determined in Step S1803 that the focusing/compensating lens 106 is not in focus, the process proceeds to Step S1804 to execute the hill-climbing operation of driving the focusing/compensating lens 106 at a speed b' than a normal speed in a direction determined by the result of the decision made through the wobbling operation. In Step S1805, it is determined whether the focusing/compensating lens 106 has passed an in-focus point, i.e., the peak of the AF evaluation signal. If the focusing/compensating lens 106 has not passed the peak of the AF evaluation signal, the lens/camera control circuit 118 continues the hill-climbing operation. If the focusing/compensating lens 106 has passed the peak with the AF evaluation signal value decreased by a predetermined amount c' which is set to a value larger than the predetermined amount "c" used in normal AF control, the lens/camera control circuit 118 returns the focusing/compensating lens 106 to the peak (S1806 and S1807). Accordingly, it is possible to greatly reduce the possibility that the focusing/compensating lens 106 stops with an image remaining out of focus during photography. In addition, since the state of a subject does not vary, as by panning, during the operation of returning the focusing/compensating lens 106 to the peak, when the focusing/compensating lens 106 reaches the peak, the process immediately proceeds to the restart monitoring processing routine which starts from step S1808.

If it is determined in Step S1803 that the focusing/compensating lens 106 is in focus, the process proceeds to the restart monitoring processing routine which starts from Step S1808. In Step S1808, first, the lens/camera control circuit 118 memorizes the AF evaluation value level obtained during the in-focus state. Step S1809 is a restart determining routine for determining whether the current AF evaluation value level has varied compared to the AF evaluation value level memorized in Step S1808 during the in-focus state. For example, if the current AF evaluation value level has varied by not less than a predetermined percent with respect to the memorized value level, it is determined that the state of the subject has changed and the driving of the focusing/compensating lens 106 needs to be restarted. If the amount of variation in the current AF evaluation value level is less than the predetermined percent, it is determined that the state of the subject has not changed and the driving of the focusing/compensating lens 106 does not need to be restarted. Then, if it is determined in Step S1810, according to the result of the decision made in Step S1809, that a decision to restart the driving of the focusing/compensating lens 106 has not continued for a period of time d' longer than a normal period of time, the focusing/compensating lens 106 is stopped at that position. Then, the process returns to Step S1808, in which restart monitoring is again performed. If it is determined in Step S1810 that the decision to restart the driving of the focusing/compensating lens 106 has continued for the period of time d' longer than a normal period of time, the process returns to Step S1802, in which the wobbling operation is again performed to determine in which direction to move the focusing/compensating lens 106. By repeating the above-described operation, the focusing/compensating lens 106 is operated so that an in-focus state can be maintained at all times.

According to the seventh embodiment, since there is no possibility that recording of a film, a print or the like in an out-of-focus state is performed during photography using a film adapter or the like, it is possible to correctly determine in which direction to move the focusing/compensating lens 106, by making the wobbling amplitude a, larger than a normal wobbling amplitude. In addition, it is possible to shorten the focusing time required for the focusing/ compensating lens 106 to reach an in-focus point, by increasing the hill-climbing speed b'. In addition, the amount c' of decrease in the AF evaluation signal value is set to a value larger than a normal amount, and since panning does not occur, the operation of confirming through wobbling whether the focusing/compensating lens 106 is in focus at the peak of the hill is omitted, so that the focusing time can be shortened. Furthermore, by increasing the restart determining time d', it is possible to prevent the driving of the focusing/compensating lens 106 from being unnecessarily restarted.

(Eighth Embodiment)

Figure 24:
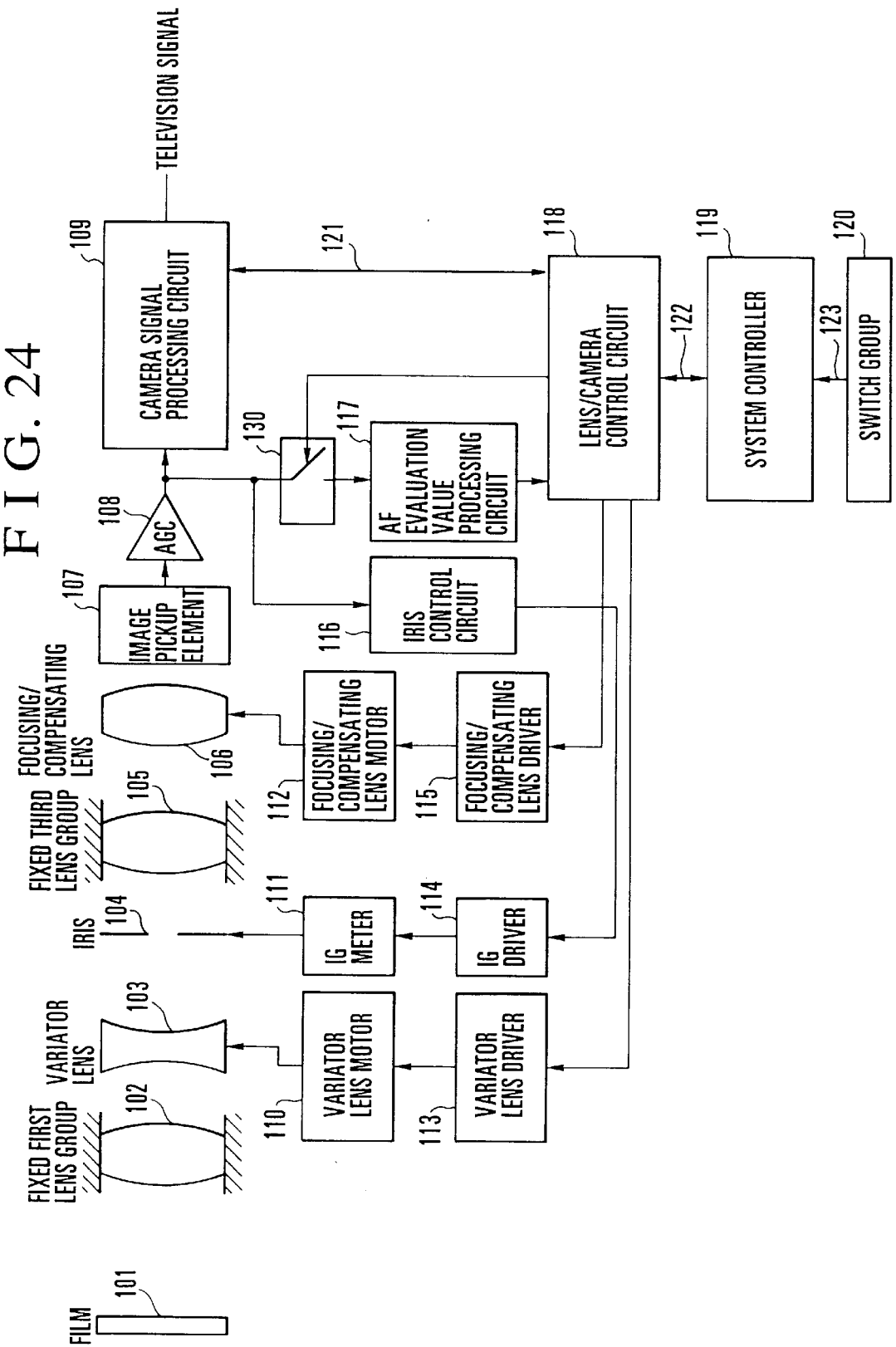
FIG. 24 is a block diagram showing the construction of an image pickup apparatus according to each of the eighth, ninth and tenth embodiments and twelfth, thirteenth, fourteenth, sixteenth, seventeenth and eighteenth embodiments.

FIG. 24 is a block diagram showing the entire construction of an image pickup apparatus according to the eighth embodiment. The construction shown in FIG. 24 is similar to that shown in FIG. 21, except for the interior of the camera signal processing circuit 109 and the omission of the film detecting switch 128.

The camera control circuit 807 and its peripheral portion, which are included in the camera signal processing circuit 109, are identical to those shown in FIG. 12, and the description thereof is omitted.

The camera control circuit 807 in the eighth embodiment employs a microcomputer, and has some functions in addition to the functions of the conventional example described previously. Since the camera control circuit 807 employs the microcomputer, the R-Y and B-Y color-difference signals outputted from the color-difference signal generating circuit 805 are converted into digital signals by the A/D converters 201 and 202, respectively, and these digital signals are inputted into the camera control circuit 807. The outputs of the A/D converters 201 and 202 are inputted into the camera control circuit 807 through the terminals 206 and 207, respectively, and the camera control circuit 807 uses the input digital signals to control the R- and B-signal gain control circuits 803 and 804 shown in FIG. 9, respectively. The outputs of the A/D converters 201 and 202 are inputted to the integrators 203 and 204, respectively, and the integral results are inputted into the camera control circuit 807 through the terminals 208 and 209, respectively.

FIG. 13 shows the relationship between the R-Y component and the B-Y component obtained when light transmitted through the color negative film illuminated by a predetermined backlight is photographed with the video camera and the R-Y and B-Y color-difference signals are integrated by the respective integrators 204 and 203 shown in FIG. 12. As shown in FIG. 13, the relationship between the R-Y and B-Y color-difference signals is represented by a color-difference vector distributed approximately in the area indicated at 301 in FIG. 13. Accordingly, the camera control circuit 807 observes the B-Y and R-Y color-difference signals inputted through the terminals 208 and 209, and determines that a negative film is attached for photography, on condition that the R-Y component is in the decision area 302 and the B-Y component is in the decision area 303.

Figure 25:
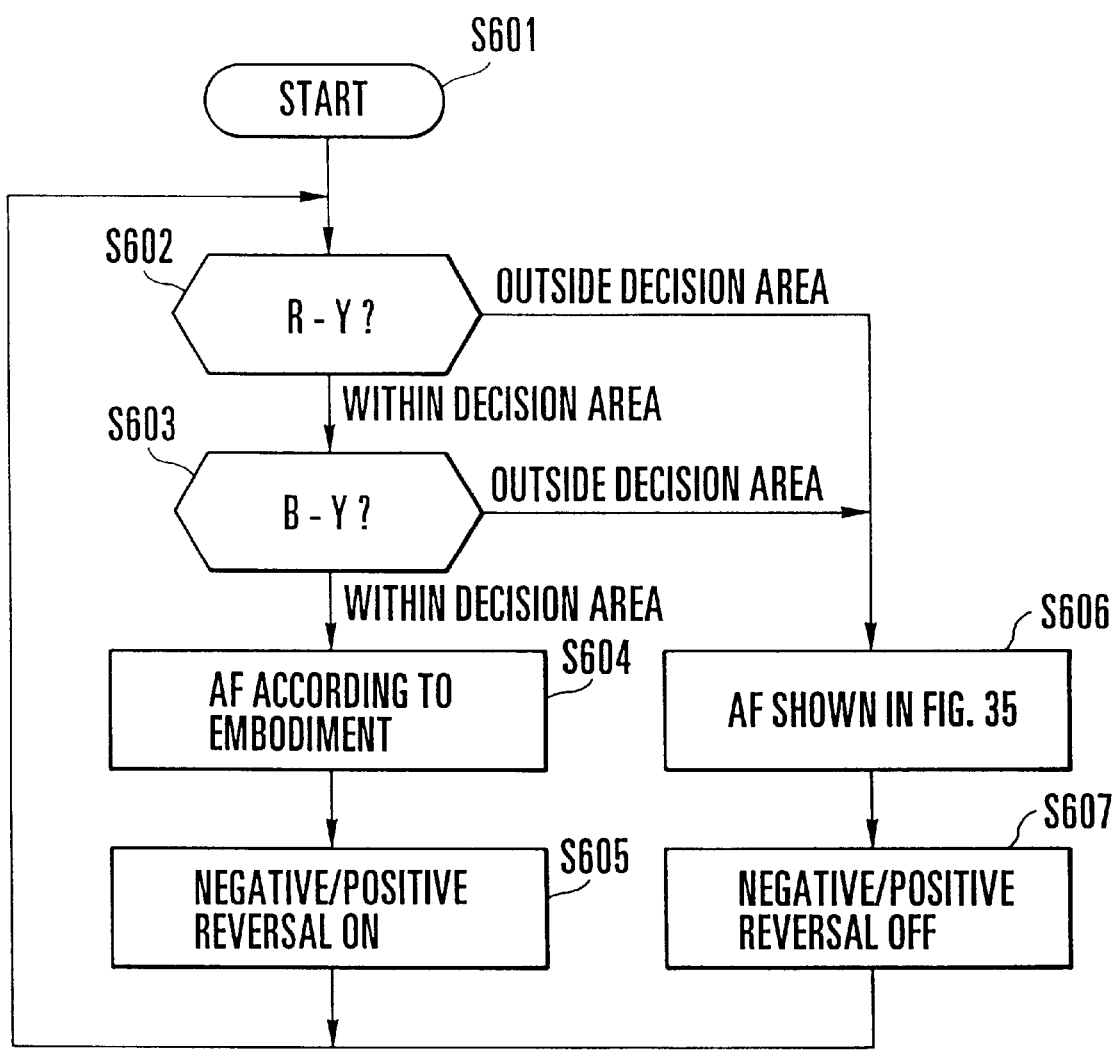
FIG. 25 is a flowchart of the operation of detecting whether a subject to be photographed is a negative film and selecting an AF mode, in each of the eighth and twelfth embodiments.

FIG. 25 is a flowchart of an operational flow of the eighth embodiment, and shows the operation of detecting through the camera control circuit 807 whether a negative film is attached for photography, and automatically selecting an AF mode.

If the process is started in Step S601, the process proceeds to Step S602, in which it is determined whether the R-Y signal inputted through the terminal 209 is in the R-Y decision area 302. If the R-Y signal is outside the R-Y decision area 302, the process proceeds to Step S606, in which the AF control shown in FIG. 35 is executed, and in Step S607, the output level of the negative/positive reversal on/off signal 1002 is turned off so that negative/positive reversal is not executed. If it is determined in Step S602 that the R-Y signal is within the R-Y decision area 302, the process proceeds to Step S603, in which it is determined whether the B-Y signal inputted through the terminal 208 is in the B-Y decision area 303. If the B-Y signal is outside the B-Y decision area 303, the process proceeds to the processing of Step S606. If the B-Y signal is within the B-Y decision area 303, the process proceeds to Step S604, in which the AF control shown in FIG. 23 according to the eighth embodiment is executed, and in Step S605, the output level of the negative/positive reversal on/off signal 1002 is turned on so that negative/positive reversal is executed. The flowchart of FIG. 25 will also be used in the twelfth embodiment to be described later.

According to the eighth embodiment, the VTR-integrated type camera can be arranged to automatically vary AF characteristics and operate its negative/positive reversal function only during photography of a negative film even if the operator does not manually select the negative/positive reversal function by switching the negative/positive reversal function selecting switch 1403 in the switch group 120. Accordingly, for example, even if an image pickup operation for obtaining a video image from a negative film is performed immediately after normal video shooting has been performed, it is possible to smoothly operate the negative/positive reversal function, without the need for a complicated operation. In addition, it is possible to correctly determine in which direction to move the focusing/compensating lens 106, by making the wobbling amplitude larger than the normal wobbling amplitude during photography of a negative film. In addition, it is possible to shorten the focusing time by increasing the hill-climbing speed. In addition, the amount of decrease in the AF evaluation signal value for determining whether the focusing/compensating lens 106 has reached the peak is set to a value larger than a normal amount, and since panning does not occur, the operation of confirming through wobbling whether the focusing/compensating lens 106 is in focus at the peak of the hill is omitted, so that the focusing time can be shortened. Furthermore, by increasing the restart determining time, it is possible to prevent the driving of the focusing/compensating lens 106 from being unnecessarily restarted.

Incidentally, the method of automatically detecting the attachment of negative film is not limited to only the above-described one, and a method disclosed in Japanese Patent Application No. Hei 8-322714 may also be employed.

(Ninth Embodiment)

Figure 26:
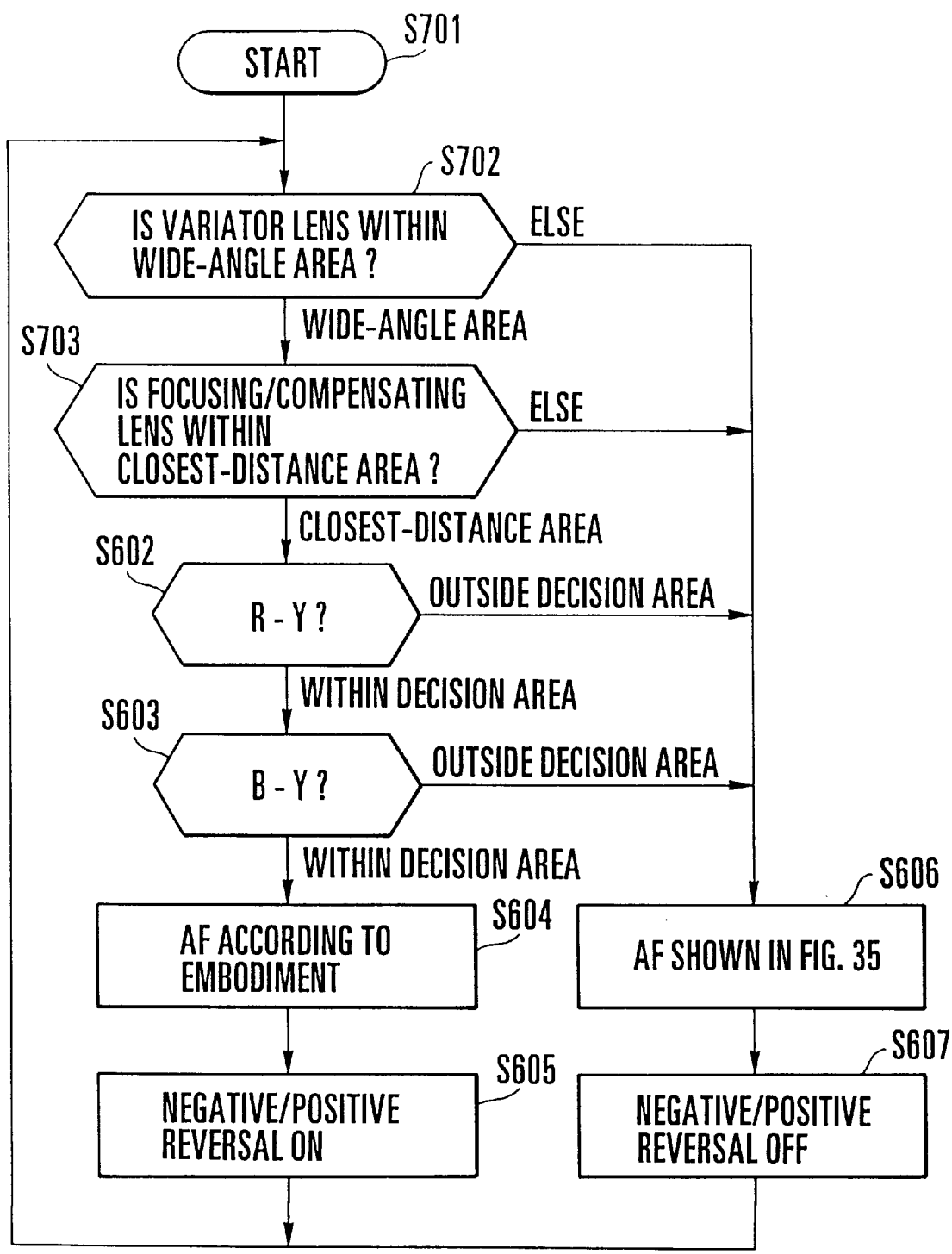
FIG. 26 is a flowchart of camera control according to each of the ninth and thirteenth embodiments.

FIG. 26 is a flowchart of processing to be executed by the camera control circuit 807 in the camera signal processing circuit 109 according to the ninth embodiment, and a new decision condition, i.e., the relationship between the positions of the variator lens 103 and the focusing/compensating lens 106 which are required to obtain an in-focus image on the image pickup surface when a subject located at an extremely close distance is being photographed, as described previously with reference to FIG. 3, is added to the decision conditions used in the above-described eighth embodiment.

If the process is started in Step S701, the process proceeds to Step S702, in which it is determined whether the variator lens 103 is in the wide-angle area 602 as viewed in FIG. 3. If the variator lens 103 is outside the wide-angle area 602, the process proceeds to Step S606 and S607, in which the apparatus is set to a state for photographing an image without negative/positive reversal in a manner similar to that described above in connection with the eighth embodiment.

If it is determined in Step S702 that the position of the variator lens 103 is in the wide-angle area 602 as viewed in FIG. 3, it is determined in Step S703 whether the position of the focusing/compensating lens 106 is in the closest-distance area 604 (the positional condition of the focusing/compensating lens 106 varies according to the position of the variator lens 103). If the position of the focusing/compensating lens 106 is outside the closest-distance area 604, the processing of Steps S606 and S607 is executed in the above-described manner. If it is determined in Step S703 that the position of the focusing/compensating lens 106 is in the closest-distance area 604, the states of the R-Y and B-Y color-difference signals are respectively detected in Steps S602 and S603 in a manner similar to that described above in connection with the eighth embodiment. If the obtained color-difference vector is in the area 301 of FIG. 13, the AF control of Step S604 of FIG. 23 is performed and the state of the apparatus is set in Step S605 so that a negative/positive reversal image is obtained. The flowchart shown in FIG. 26 will also be used in the thirteenth embodiment to be described later.

According to the ninth embodiment, since the state of the lens system is added as a decision condition, it is possible to clearly determine whether a negative film is set for photography at a closest distance, i.e., by using the film adapter. Accordingly, it is possible to automatically execute the switching of AF characteristics and the operation of turning on the negative/positive reversal function, without malfunction. In addition, it is possible to correctly determine in which direction to move the focusing/compensating lens 106, by making the wobbling amplitude larger than the normal wobbling amplitude during photography of a negative film. In addition, it is possible to shorten the focusing time by increasing the hill-climbing speed. In addition, the amount of decrease in the AF evaluation signal value for determining whether the focusing/compensating lens 106 has reached the peak is set to a value larger than a normal amount, and since panning does not occur, the operation of confirming through wobbling whether the focusing/compensating lens 106 is in focus at the peak of the hill is omitted, so that the focusing time can be shortened. Furthermore, by increasing the restart determining time, it is possible to prevent the driving of the focusing/compensating lens 106 from being unnecessarily restarted.

(Tenth Embodiment)

Figure 27:
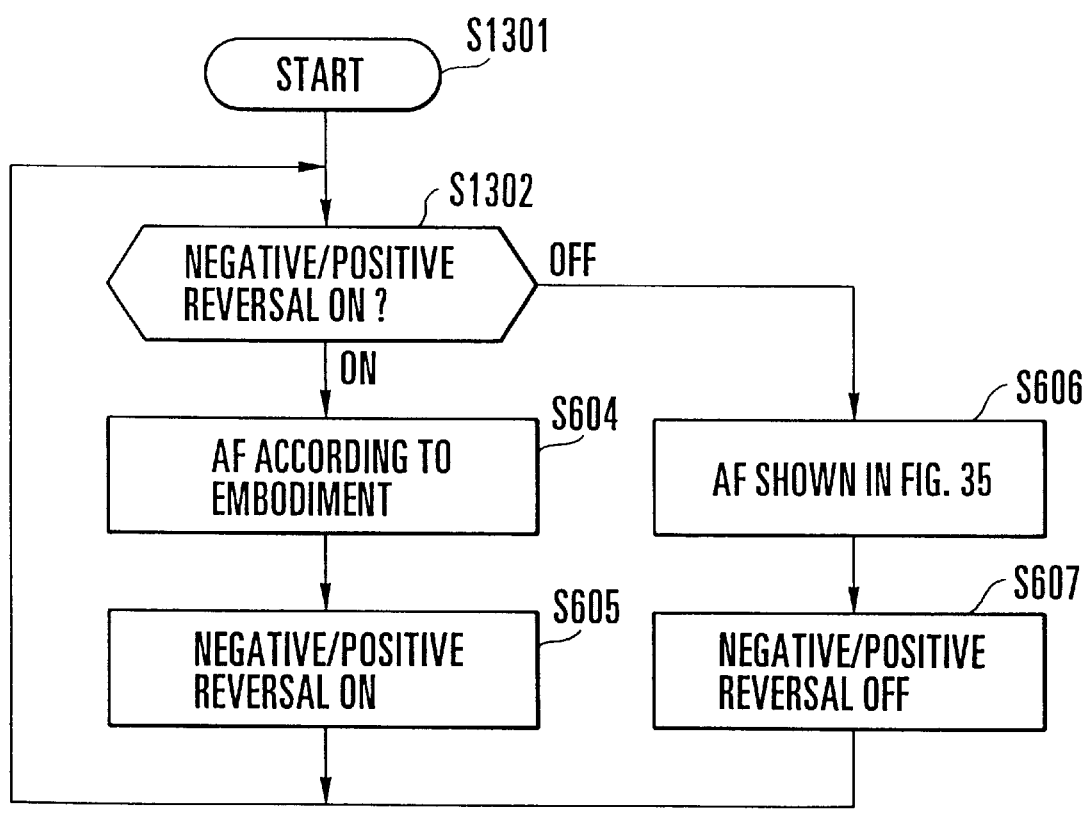
FIG. 27 is a flowchart of camera control according to each of the tenth and fourteenth embodiments.

FIG. 27 is a flowchart of processing to be executed by the camera control circuit 807 in the camera signal processing circuit 109 according to the tenth embodiment, and the diagrammatic construction of the entire apparatus is as shown in FIG. 24 and the diagrammatic construction of the camera signal processing circuit 109 is as shown in FIG. 9.

The tenth embodiment does not use automatic negative/positive film discriminating means such as that used in the eighth and ninth embodiments, and if, as described above, the operator operates the negative/positive reversal function selecting switch 1403 in the switch group 120 to turn on the negative/positive reversal function, the entire picture is automatically set to a picture area from which to obtain an AF evaluation value. The flowchart shown in FIG. 27 will also be used in the fourteenth embodiment to be described later.

If the process is started in Step S1301 of FIG. 27, it is determined whether the negative/positive reversal function has been turned on by the operator. Information indicative of the on/off state of the negative/positive reversal function is provided via the communication lines 122 and 123. If it is determined in Step S1302 that the negative/positive reversal function has been turned on, the AF control of Step S604 of FIG. 23 described above is performed, and the negative/positive reversal on/off signal 1002 is outputted as an on signal so that the negative/positive reversal function is turned on. If it is determined in Step S1302 that the negative/positive reversal function is off, the AF control shown in FIG. 35 is performed in Step S606, and the negative/positive reversal on/off signal 1002 is outputted as an off signal so that the negative/positive reversal function is turned off.

According to the tenth embodiment, even in an apparatus which does not automatically determine whether a negative film is attached for photography, since the AF characteristics are automatically varied when the negative/positive reversal function is turned on, it is possible to correctly determine in which direction to move the focusing/compensating lens 106, by making the wobbling amplitude larger than the normal wobbling amplitude, or it is possible to shorten the focusing time by increasing the hill-climbing speed. In addition, the amount of decrease in the AF evaluation signal value for determining whether the focusing/compensating lens 106 has reached the peak is set to a value larger than a normal amount, and since panning does not occur, the operation of confirming through wobbling whether the focusing/compensating lens 106 is in focus at the peak of the hill is omitted, so that the focusing time can be shortened. Furthermore, by increasing the restart determining time, it is possible to prevent the driving of the focusing/compensating lens 106 from being unnecessarily restarted.

According to the above-described seventh to tenth embodiments, if a negative film is to be photographed with a video camera by using a film adapter or the like, the AF characteristics are varied on the basis of the result of detection of the attachment of the film adapter, whereby it is possible to correctly determine in which direction to move the focusing/compensating lens 106, by making the wobbling amplitude larger than the normal wobbling amplitude, or it is possible to shorten the focusing time by increasing the hill-climbing speed. In addition, the amount of decrease in the AF evaluation signal value for determining whether the focusing/compensating lens 106 has reached the peak is set to a value larger than a normal amount, and since panning does not occur, the operation of confirming through wobbling whether the focusing/compensating lens 106 is in focus at the peak of the hill is omitted, so that the focusing time can be shortened. Furthermore, by increasing the restart determining time, it is possible to prevent the driving of the focusing/compensating lens 106 f!rom being unnecessarily restarted. Accordingly, it is possible to improve AF performance for photography with the film adapter.

Furthermore, since the AF characteristics are varied when the negative/positive reversal function of the video camera is turned on, it is possible to correctly determine in which direction to move the focusing/compensating lens 106, by making the wobbling amplitude larger than the normal wobbling amplitude, or it is possible to shorten the focusing time by increasing the hill-climbing speed. In addition, since the amount of decrease in the AF evaluation signal value for determining whether the focusing/compensating lens 106 has reached the peak is set to a value larger than a normal amount, and since panning does not occur, the operation of confirming through wobbling whether the focusing/compensating lens 106 is in focus at the peak of the hill is omitted, so that the focusing time can be shortened. Furthermore, by increasing the restart determining time, it is possible to prevent the driving of the focusing/compensating lens 106 from being unnecessarily restarted. Accordingly, it is possible to improve AF performance for photography of negative film.

Furthermore, by detecting a distinctive color-difference vector of negative film by using a white-balance circuit which is an art peculiar to video cameras, and automatically executing the operation of varying the AF characteristics and turning on the negative/positive reversal function, it is possible to eliminate awkwardness from the operation of the operator and improve AF performance for photography of negative film.

Furthermore, since a particular lens position obtainable from closest-distance focusing conditions for an image pickup lens is detected in addition to the distinctive color vector of negative film, it is possible to accurately detect the state of a negative film to be photographed with a film adapter and prevent a malfunction of the apparatus.

(Eleventh Embodiment)

A block diagram showing the diagrammatic construction of the entire image pickup apparatus according to the eleventh embodiment is identical to the block diagram shown in FIG. 21. In the eleventh embodiment, the camera control circuit 807 employs a microcomputer. During photography with a film adapter, the lens/camera control circuit 118 detects the output of the film detecting switch 128 to determine whether a film photography mode is selected.

FIG. 22 is a flowchart of processing to be executed by the camera control circuit 807 in the camera signal processing circuit 109 according to the eleventh embodiment. In Step S1703 of FIG. 22, AF control according to the eleventh embodiment is performed as shown in FIG. 28.

Figure 28:
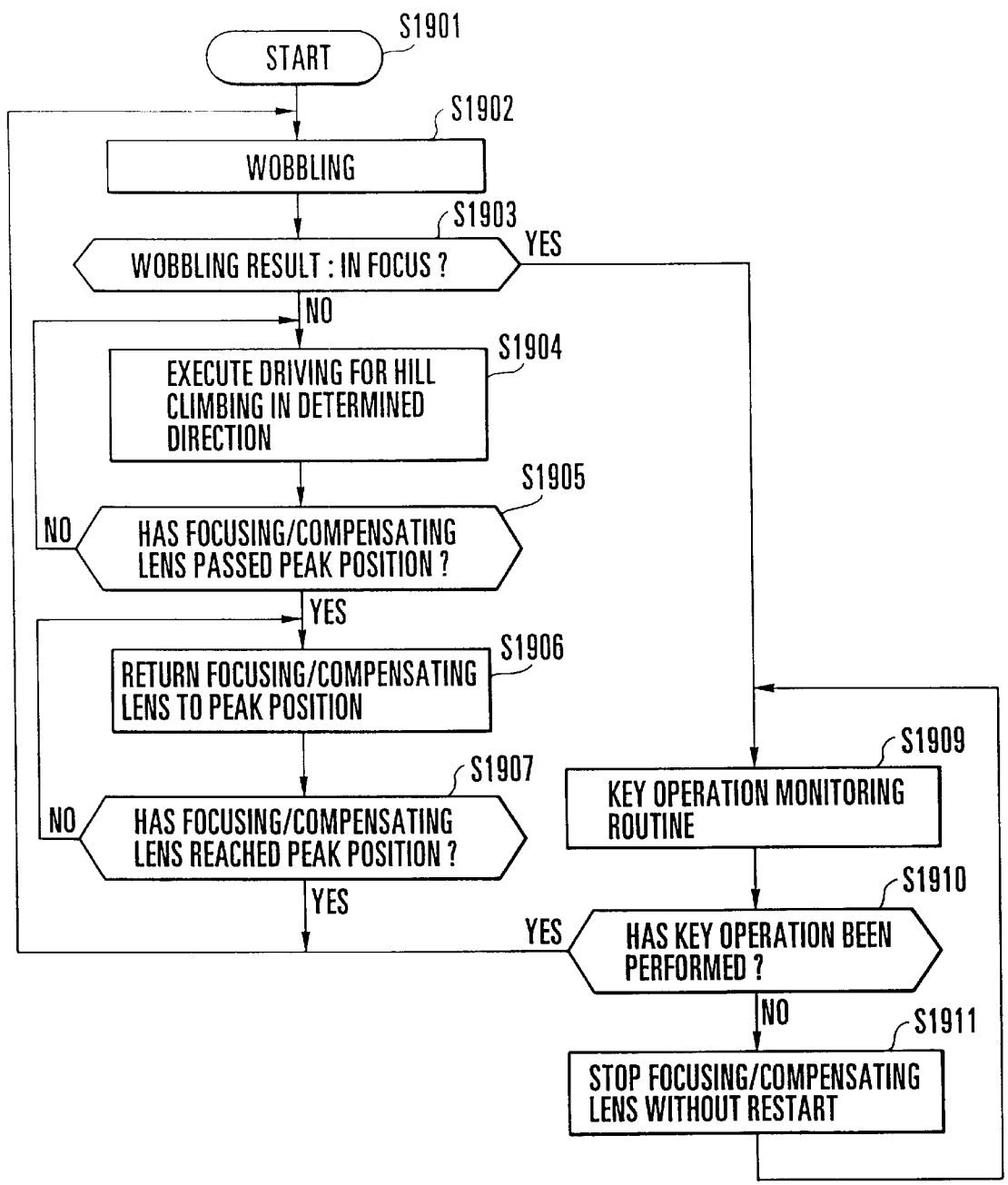
FIG. 28 is a flowchart of AF control according to each of the eleventh, twelfth, thirteenth and fourteenth embodiments.

FIG. 28 is a flowchart of the AF control according to the eleventh embodiment, which is processed in the lens/camera control circuit 118. Step S1901 indicates the start of the process. The lens/camera control circuit 118 obtains an AF evaluation value while driving the focusing/compensating lens 106 by a small amount through a wobbling operation, and determines whether the current state of focus is an in-focus state or an out-of-focus state (Step S1902). (If it is determined that the state of focus is an out-of-focus state, it is determined whether the state of focus is a near-focus state or a far-focus state.) Then, in Step S1903, it is determined whether the focusing/compensating lens 106 is currently in focus, from the result of the wobbling operation. If it is determined that the focusing/compensating lens 106 is in focus, the lens/camera control circuit 118 stops the focusing/compensating lens 106, and the process proceeds to a restart monitoring routine which starts from Step S1909.

If it is determined in Step S1903 that the focusing/compensating lens 106 is not in focus, the process proceeds to Step S1904 to execute the hill-climbing operation of driving the focusing/compensating lens 106 in a direction determined by the result of the decision made through the wobbling operation. In Step S1905, it is determined whether the focusing/compensating lens 106 has passed an in-focus point, i.e., the peak of the AF evaluation signal. If the focusing/compensating lens 106 has not passed the peak of the AF evaluation signal, the lens/camera control circuit 118 continues the hill-climbing operation. If the focusing/compensating lens 106 has passed the peak of the AF evaluation signal, the lens/camera control circuit 118 returns the focusing/compensating lens 106 to the peak (S1906 and S1907).

While the operation of returning the focusing/compensating lens 106 to the peak is being performed, the state of a subject may vary, as by panning. For this reason, when the focusing/compensating lens 106 reaches the peak, the process returns to Step S1902 to again execute a wobbling operation in order to determine whether the current position of the focusing/compensating lens 106 exactly is the peak, i.e., an in-focus point.

If it is determined in step S1903 that the focusing/compensating lens 106 is in focus, the process proceeds to the restart monitoring processing routine which starts from Step S1909. In the restart monitoring processing routine of Step S1909, it is determined whether the operation of the variator lens 103, the iris 104 or the like has been executed. If the operation of the variator lens 103, the iris 104 or the like has been executed, it is determined in step S1910 that the driving of the focusing/compensating lens 106 needs to be restarted, whereas if the operation of the variator lens 103, the iris 104 or the like has not been executed, it is determined in Step S1910 that the driving of the focusing/compensating lens 106 does not need to be restarted. If it is determined in Step S1910 that the driving of the focusing/compensating lens 106 does not need to be restarted, the process proceeds to Step S1911, in which the focusing/compensating lens 106 is stopped at that position. Then, the process returns to Step S1909, in which restart monitoring is again performed. If it is determined in Step S1910 that the driving of the focusing/compensating lens 106 needs to be restarted, the process returns to Step S1902, in which the wobbling operation is again performed to determine in which direction to move the focusing/compensating lens 106. By repeating the above-described operation, the focusing/compensating lens 106 is operated so that an in-focus state can be maintained at all times.

According to the eleventh embodiment, even if the state of a subject varies due to film transporting or the like during the use of a film adapter, it is possible to stabilize AF because the driving of the focusing/compensating lens 106 does not need to be restarted. On the other hand, if an operation which causes defocusing, such as the operation of moving the variator lens 103, the iris 104 or the like, is executed, the driving of the focusing/compensating lens 106 can be restarted to prevent the focusing/compensating lens 106 from stopping with an image remaining out of focus during photography.

(Twelfth Embodiment)

A block diagram showing the diagrammatic construction of the entire image pickup apparatus according to the twelfth embodiment is identical to the block diagram shown in FIG. 24. The twelfth embodiment only differs from the art shown in FIG. 24 in respect of the internal construction of the camera signal processing circuit 109 shown in FIG. 21 and in that the film detecting switch 128 is omitted.

The construction of the peripheral portion of the camera control circuit 807 which is composed of a microcomputer within the camera signal processing circuit 109 is shown in FIG. 12.

FIG. 25 is a flowchart of processing to be executed by the camera control circuit 807, for detecting whether a negative film is attached for photography and automatically selecting the AF mode. If it is determined through Steps S601 to S603 that the R-Y and B-Y signals are within the predetermined area and a negative film is attached for positive photography, the process proceeds to Step S604, in which the AF control shown in FIG. 28 is performed, and the output level of the negative/positive reversal on/off signal 1002 is turned on so that negative/positive reversal is executed.

According to the twelfth embodiment, the VTR-integrated type camera can be arranged to automatically restart the driving of the focusing/compensating lens 106 and operate the negative/positive reversal function only during photography of a negative film in response to an operation of any key even if the operator does not manually select the negative/positive reversal function by switching the negative/positive reversal function selecting switch 1403 in the switch group 120. Accordingly, for example, even if an image pickup operation for obtaining a video image from a negative film is performed immediately after normal video shooting has been performed, it is possible to smoothly operate the negative/positive reversal function, without the need for a complicated operation. In addition, even if the state of a subject varies due to film transporting or the like during photography of the negative film, it is possible to stabilize AF because the driving of the focusing/compensating lens 106 does not need to be restarted. On the other hand, if an operation which causes defocusing, such as the operation of moving the variator lens 103, the iris 104 or the like, is executed, the driving of the focusing/compensating lens 106 can be restarted to prevent the focusing/compensating lens 106 from stopping with an image remaining out of focus during photography.

(Thirteenth Embodiment)

FIG. 26 is a flowchart of processing to be executed by the camera control circuit 807 in the camera signal processing circuit 109 according to the thirteenth embodiment, and a new decision condition, i.e., the relationship between the positions of the variator lens 103 and the focusing/compensating, lens 106 which are required to obtain an in-focus image on the image pickup surface when a subject located at an extremely close distance is being photographed, as described previously with reference to FIG. 3, is added to the decision conditions used in the above-described twelfth embodiment.

If it is determined through Steps S602 and S603 that a negative film is attached for photography, the process proceeds to Step S604, in which the AF control shown in FIG. 28 is performed, and in Step S605, the state of the apparatus is set so that a negative-to-positive reversed image is obtained.

According to the thirteenth embodiment, since the state of the lens system is added as a decision condition, it is possible to clearly determine whether negative film is set for photography at a closest distance, i.e., by using a film adapter, and it is also possible to automatically execute the switching of an AF restart operation and the operation of turning on the negative/positive reversal function, without malfunction. Accordingly, even if the state of a subject varies due to film transporting or the like during photography of the negative film, it is possible to stabilize AF because the driving of the focusing/compensating lens 106 does not need to be restarted. On the other hand, if an operation which causes defocusing, such as the operation of moving the variator lens 103, the iris 104 or the like, is executed, the driving of the focusing/compensating lens 106 can be restarted to prevent the focusing/compensating lens 106 from stopping with an image remaining out of focus during photography.

(Fourteenth Embodiment)

FIG. 27 is a flowchart of processing to be executed by the camera control circuit 807 in the camera signal processing circuit 109 according to the fourteenth embodiment, and the diagrammatic construction of the entire apparatus is as shown in FIG. 24 and the diagrammatic construction of the camera signal processing circuit 109 is as shown in FIG. 9.

Similarly to the tenth embodiment, the fourteenth embodiment is arranged so that if the operator operates the negative/positive reversal function selecting switch 1403 in the switch group 120 to turn on the negative/positive reversal function, the entire picture is automatically set to a picture area from which to obtain an AF evaluation value.

If it is determined in Step S1302 that the negative/positive reversal function has been turned on by the operator, the process proceeds to Step S604, in which the AF control shown in FIG. 28 is performed, and in Step S605, the negative/positive reversal on/off signal 1002 is outputted as an on signal.

According to the fourteenth embodiment, even in an apparatus which does not automatically determine whether a negative film is attached for photography, when the negative/positive reversal function is turned on, the AF restart method is automatically changed so that even if the state of a subject varies due to film transporting or the like, it is possible to stabilize AF because the driving of the focusing/compensating lens 106 does not need to be restarted. On the other hand, if an operation which causes defocusing, such as the operation of moving the variator lens 103, the iris 104 or the like, is executed, the driving of the focusing/compensating lens 106 can be restarted to prevent the focusing/compensating lens 106 from stopping with an image remaining out of focus during photography.

According to the above-described eleventh to fourteenth embodiments, if a film is to be photographed with a video camera by using a film adapter or the like, an AF restart operation is executed in response to an operation of a key without performing an AF restart operation based on an AF evaluation value obtained from a film-adapter detection operation. Accordingly, it is impossible to improve the AF performance required for photography with the film adapter.

Furthermore, if the negative/positive reversal of the video camera is turned on, the AF restart operation is executed in response to an operation of any key without performing the AF restart operation based on the AF evaluation value. Accordingly, it is possible to improve the AF performance required for photography of negative film.

Furthermore, since a distinctive color-difference vector of negative film is detected by using a white-balance circuit which is an art peculiar to video cameras and the operation of varying an AF restart method and the operation of turning on the negative/positive reversal function are automatically executed, it is possible to eliminate awkwardness from the operation of the operator and improve the AF performance required for photography of negative film.

Furthermore, since a particular lens position obtainable from closest-distance focusing conditions for an image pickup lens is detected in addition to the distinctive color vector of negative film, it is possible to accurately detect the state of a negative film to be photographed with a film adapter and prevent a malfunction of the apparatus.

(Fifteenth Embodiment)

A block diagram showing the diagrammatic construction of the entire image pickup apparatus according to the fifteenth embodiment is identical to the block diagram shown in FIG. 21. In the fifteenth embodiment, whether to select a film-adaptor photography mode can be determined by detecting the output of the film detecting switch 128 by means of the lens/camera control circuit 118 composed of a microcomputer.

Figure 29:
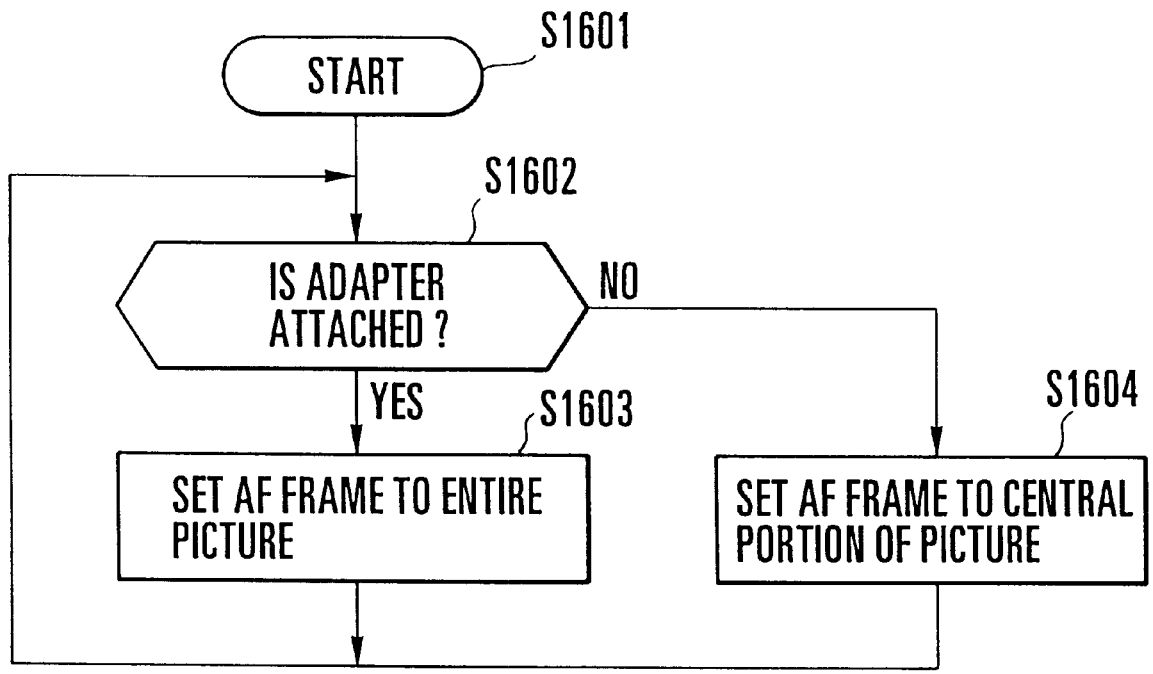
FIG. 29 is a flowchart of camera control according to the fifteenth embodiment.

FIG. 29 is a flowchart of processing to be executed by the camera control circuit 807 in the camera signal processing circuit 109 according to the fifteenth embodiment. The process is started in Step S1601, and if the attachment of the film adapter is detected in Step S1602, the process proceeds to Step S1603, in which the entire picture is set to a picture area from which to obtain an AF evaluation value. If the attachment of the film adapter is not detected in Step S1602, the process proceeds to Step S1604, in which a central portion of the picture is set to a picture area from which to obtain an AF evaluation value.

According to the fifteenth embodiment, during the use of the film adapter, it is possible to set the entire picture to the picture area from which to obtain an AF evaluation value, so that it is possible to improve the AF performance required during the use of the film adapter.

(Sixteenth Embodiment)

A block diagram showing the diagrammatic construction of the entire image pickup apparatus according to the sixteenth embodiment is identical to the block diagram shown in FIG. 24. The construction of the peripheral portion of the camera control circuit 807 which is composed of a microcomputer within the camera signal processing circuit 109 is shown in FIG. 12.

FIG. 30 is a flowchart of processing to be executed by the camera control circuit 807, for detecting whether a negative film is attached for photography and automatically selecting the AF mode. If the process is started in Step S801, the process proceeds to Step S802, in which it is determined whether the R-Y signal inputted through the terminal 209 is in the R-Y decision area 302. If the R-Y signal is outside the R-Y decision area 302, the process proceeds to Step S806, in which a central portion of the picture is set to the picture area from to obtain an AF evaluation value, and in Step S807, the negative/positive reversal on/off signal 1002 is turned off so that negative/positive reversal is not executed. If the R-Y signal is within the R-Y decision area 302, the process proceeds to Step S803, in which it is determined whether the B-Y signal inputted through the terminal 208 is in the B-Y decision area 303. If the B-Y signal is outside the B-Y decision area 303, the process proceeds to Step S806. If it is determined in Step S803 that the B-Y signal is within the B-Y decision area 303, the process proceeds to Step S804, in which the entire picture is set to the picture area from to obtain an AF evaluation value, and in Step S805, the negative/positive reversal on/off signal 1002 is turned on so that negative/positive reversal is executed.

According to the sixteenth embodiment, the VTR-integrated type camera can be arranged to automatically set, only during photography of a negative film, the entire picture to the picture area from which to obtain an AF evaluation value, and operate the negative/positive reversal function, even if the operator does not manually select the negative/positive reversal function by switching the negative/positive reversal function selecting switch 1403 in the switch group 120. Accordingly, for example, even if an image pickup operation for obtaining a video image from a negative film is performed immediately after normal video shooting has been performed, it is possible to smoothly operate the negative/positive reversal function, without the need for a complicated operation. Accordingly, during photography of the negative film, it is possible to set the entire picture to the picture area from to obtain an AF evaluation value, whereby it is possible to improve the AF performance required for the photography of the negative film.

(Seventeenth Embodiment)

Figure 31:
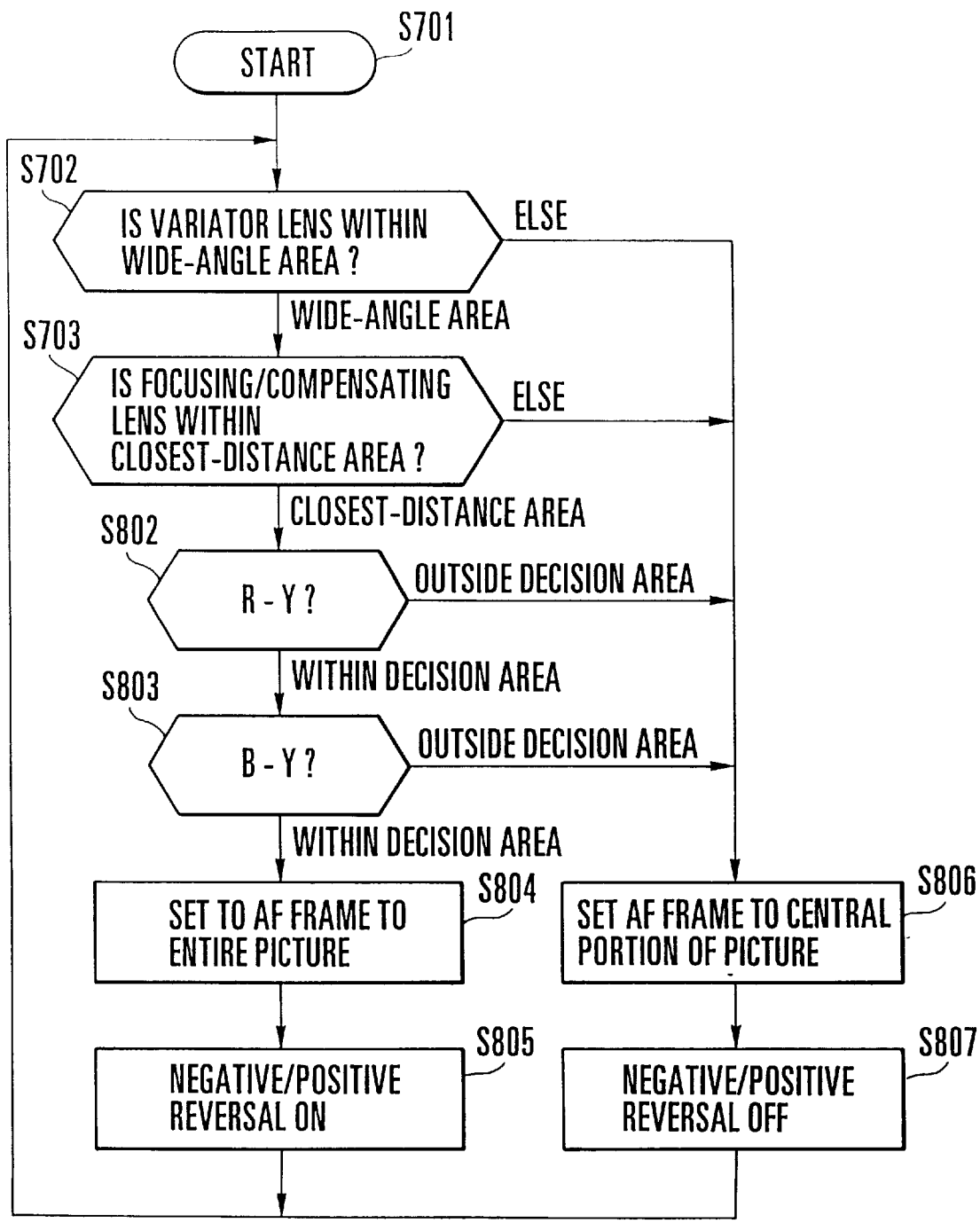
FIG. 31 is a flowchart of camera control according to the seventeenth embodiment.

FIG. 31 is a flowchart of processing to be executed by the camera control circuit 807 in the camera signal processing circuit 109 according to the seventeenth embodiment, and a new decision condition, i.e., the relationship between the positions of the variator lens 103 and the focusing/compensating lens 106 which are required to obtain an in-focus image on the image pickup surface when a subject located at an extremely close distance is being photographed, as described previously with reference to FIG. 3, is added to the decision conditions used in the above-described sixteenth embodiment.

If the process is started in Step S701, the process proceeds to Step S702, in which it is determined whether the variator lens 103 is in the wide-angle area 602 as viewed in FIG. 3.

If the variator lens 103 is outside the wide-angle area 602, the process proceeds to Step S806 and S807, in which the apparatus is set to a state for photographing an image in a moving-image mode without negative/positive reversal.

If it is determined in Step S702 that the position of the variator lens 103 is in the wide-angle area 602 as viewed in FIG. 3, it is determined in Step S703 whether the position of the focusing/compensating lens 106 is in the closest-distance area 604 (the positional condition of the focusing/compensating lens 106 varies according to the position of the variator lens 103). If the position of the focusing/compensating lens 106 is outside the closest-distance area 604, the processing of Steps S806 and S807 is executed in the above-described manner. If it is determined in Step S703 that the position of the focusing/compensating lens 106 is in the closest-distance area 604, the states of the R-Y and B-Y color-difference signals are respectively detected in Steps S802 and S803. If the obtained color-difference vector is in the area 301 of FIG. 13, the process proceeds to Step S804, in which the entire picture is set to the picture area from which to obtain an AF evaluation value, and in Step S605, the state of the apparatus is set so that a negative-to-positive reversed image is obtained.

According to the seventeenth embodiment, since the state of the lens system is added as a decision condition, it is possible to clearly determine whether a negative film is set for photography at a closest distance, i.e., by using a film adapter, and it is also possible to automatically execute the switching of the AF evaluation value acquisition areas and the operation of turning on the negative/positive reversal function, without malfunction. Accordingly, during photography of the negative film, it is possible to set the entire picture to the picture area from to obtain an AF evaluation value, whereby it is possible to improve the AF performance required for the photography of the negative film.

(Eighteenth Embodiment)

Figure 32:
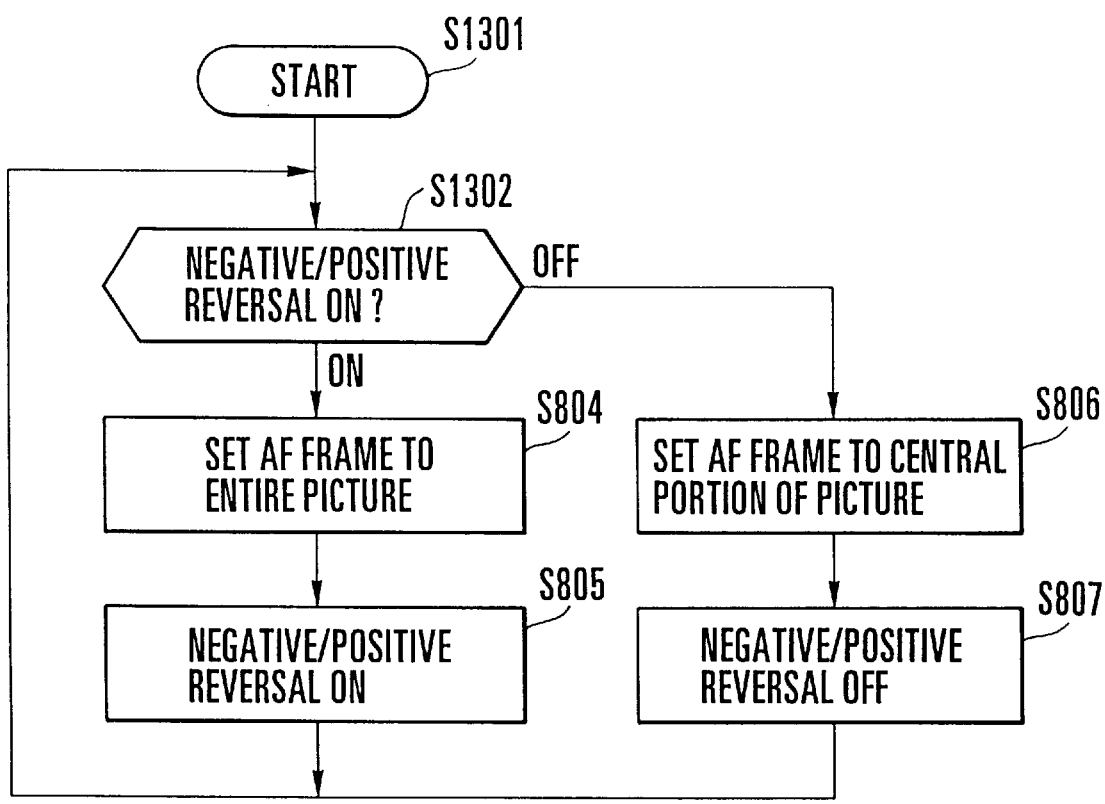
FIG. 32 is a flowchart of camera control according to the eighteenth embodiment.

FIG. 32 is a flowchart of processing to be executed by the camera control circuit 807 in the camera signal processing circuit 109 according to the eighteenth embodiment, and the diagrammatic construction of the entire apparatus is as shown in FIG. 24 and the diagrammatic construction of the camera signal processing circuit 109 is as shown in FIG. 34.

The eighteenth embodiment is arranged so that if the operator operates the negative/positive reversal function selecting switch 1403 in the switch group 120 to turn on the negative/positive reversal function, the entire picture is automatically set to the picture area from which to obtain an AF evaluation value.

If the process is started in Step S1301, the process proceeds to Step S1302, in which it is determined in Step S1301 that the negative/positive reversal function has been turned on by the operator. Information indicative of the on state of the negative/positive reversal function is provided via the communication lines 122 and 123 as described previously. If it is determined in Step S1302 that the negative/positive reversal function has been turned on, the process proceeds to Step S804, in which the entire picture is set to the picture area from which to obtain an AF evaluation value, and in Step S805, the negative/positive reversal on/off signal 1002 is outputted as an on signal so that the negative/positive reversal function is turned on. If it is determined in Step S1302 that the negative/positive reversal function is off, the process proceeds to Step S806, in which a central portion of the picture is set to the picture area from which to obtain an AF evaluation value, and in Step S807, the negative/positive reversal on/off signal 1002 is outputted as an off signal so that the negative/positive reversal function is turned off.

According to the eighteenth embodiment, even in an apparatus which does not automatically determine whether a negative film is attached for photography, when the negative/positive reversal function is off, the entire picture can be automatically set to the picture area from which to obtain an AF evaluation value, so that it is possible to improve AF performance.

According to the above-described fifteenth to eighteenth embodiments, if a film is to be photographed with a video camera by using a film adapter or the like, the picture area from which to obtain an AF evaluation value can be enlarged through a film-adapter detection operation, whereby it is possible to improve the AF performance required for photography with the film adapter.

Furthermore, if the negative/positive reversal of the video camera is turned on, the picture area from which to obtain an AF evaluation value is automatically enlarged, whereby it is possible to improve the AF performance required for photography of negative film.

Furthermore, since a distinctive color-difference vector of negative film is detected by using a white-balance circuit which is an art peculiar to video cameras and the operation of enlarging the picture area from which to obtain an AF evaluation value and the operation of turning on the negative/positive reversal function are automatically executed, it is possible to eliminate awkwardness from the operation of the operator and improve the AF performance required for photography of negative film.

Furthermore, since a particular lens position obtainable from closest-distance focusing conditions for an image pickup lens is detected in addition to the distinctive color vector of negative film, it is possible to accurately detect the state of a negative film to be photographed with a film adapter and prevent a malfunction of the apparatus.

According to the seventh to eighteenth embodiments, it is possible to readily and securely perform a focus adjusting operation with high precision during a mode for picking up an image of a subject located at a predetermined distance such as a closest distance.

Furthermore, in the case of making focus adjustment while performing wobbling, during the aforesaid mode, it is possible to securely determine in which. direction to move lens means.

Furthermore, in the case of making focus adjustment by a hill-climbing method, it is possible to shorten the focusing time during the aforesaid mode.

Furthermore, in the case of making focus adjustment by a hill-climbing method, it is possible to prevent a focus adjusting operation from unnecessarily restarting during the aforesaid mode.

Furthermore, during the aforesaid mode, it is possible to prevent a focus adjusting operation from unnecessarily restarting after an in-focus state has been reached.

Furthermore, during the aforesaid mode, since the lens means remains in a stopped state so long as a user or the like does not execute an operation of any key after an in-focus state has been reached, it is possible to improve the performance of focus adjustment.

Furthermore, it is possible to improve the performance of focus adjustment during the aforesaid mode.

Furthermore, it is possible to more appropriately set the aforesaid mode according to the position of the lens means, whereby it is possible to improve the performance of focus adjustment.

Furthermore, the seventh to eighteenth embodiments can be particularly effectively used in a case where a subject is a negative image.

What is claimed is:

1. An image pickup apparatus comprising:

first lens means for varying a focal length and performing a magnification varying operation;

second lens means for performing focus adjustment;

image pickup means for picking up a subject image passing through said first and second lens means and converting the picked-up subject image into an electrical signal;

setting means for selectively setting a first mode in which a photographing distance is not restricted and a second mode in which a photographing distance is fixed at a specified position, said setting means including removable holding means for holding the subject at the predetermine distance;

detecting means for detecting a setting of the mode, said detecting means detecting attachment of said holding means; and control means for performing control for shifting an area in which said first lens means is movable during the magnification varying operation to a predetermined area in the case that the setting of the second mode is detected by said detecting means.

2. An image pickup apparatus comprising:

image pickup means for converting a subject image into an electrical signal via an optical system;

lens means for performing focus adjustment of the optical system;

extracting means for extracting an in-focus degree signal according to an in-focus degree of said optical system from the electrical signal;

setting means for selectively setting a first mode in which a photographic distance is not restricted and a second mode in which a photographing distance is fixed at a specified position, said setting means setting the second mode when removable adapter means for holding the subject at the predetermined distance is attached; and control means for performing focus adjustment by moving said lens means on the basis of the in-focus degree signal, said control means being arranged to perform, during the focus adjustment, focus adjustment which differs in characteristic between the first mode and the second mode.

3. An image pickup apparatus comprising:

first lens means for varying a focal length and performing a magnification varying operation;

second lens means for performing focus adjustment;

image pickup means for picking up a subject image passing through said first and second lens means and converting the picked-up subject image into an electrical signal;

setting means for selectively setting a first mode in which a photographing distance is not restricted and a second mode in which a photographing distance is fixed at a specified position, detecting means for detecting a setting of the mode;

control means for performing control for shifting an area in which said first lens means is movable during the magnification varying operation to a predetermined area in the case that the setting of the second mode is detected by said detecting means;

signal processing means for processing the electrical signal obtained from said image pickup means and generating a color signal; and said detecting means detecting the setting of the mode when the color signal is in a predetermined decision area.

4. An image pickup apparatus comprising:

first lens means for varying a focal length and performing a magnification varying operation;

second lens means for performing focus adjustment;

image pickup means for picking up a subject image passing through said first and second lens means and converting the picked-up subject image into an electrical signal;

setting means for selectively setting a first mode in which a photographing distance is not restricted and a second mode in which a photographing distance is fixed at a specified position;

detecting means for detecting a setting of the mode;

control means for performing control for shifting an area in which said first lens means is movable during the magnification varying operation to a predetermined area in the case that the setting of the second mode is detected by said detecting means; and signal processing means for performing, when the mode is set, reversal processing of the electrical signal obtained from said image pickup means.

5. An image pick-up apparatus comprising:

first lens means for varying a focal length and performing a magnification varying operation;

second lens means for performing focus adjustment;

image pickup means for picking up a subject image passing through said first and second lens means and converting the picked-up subject image into an electrical signal;

setting means for selectively setting a first mode in which a photographing distance is not restricted and a second mode in which a photographing distance is fixed at a specified position, said setting means including a removable holding means for holding the subject at the predetermined distance;

detecting means for detecting setting of the mode, said detecting means detecting attachment of said holding means; and control means for performing control for forcedly moving said first lens means to a lens-focusable focal length area in the case that the setting of the second mode is detected by said detecting means.

6. An image pickup apparatus comprising:

first lens means for varying a focal length and performing a magnification varying operation;

second lens means for performing focus adjustment;

image pickup means for picking up a subject image passing through said first and second lens means and converting the picked-up subject image into an electrical signal;

setting means for selectively setting a first mode in which a photographing distance is not restricted and a second mode in which a photographing distance is fixed at a specified position;

detecting means for detecting setting of the mode;

control means for performing control for forcedly moving said first lens means to a lens-focusable focal length area in the case that the setting of the second mode is detected by said detecting means;

signal processing means for processing the electrical signal obtained from said image pickup means and generating a color signal; and said detecting means detecting the setting of the mode when the color signal is in a predetermined decision area.

7. An image pickup apparatus comprising:

first lens means for varying a focal length and performing a magnification varying operation;

second lens means for performing focus adjustment;

image pickup means for picking up a subject image passing through said first and second lens means and converting the picked-up subject image into an electrical signal;

setting means for selectively setting a first mode in which a photographing distance is not restricted and a second mode in which a photographing distance is fixed at a specified position;

detecting means for detecting setting of the mode;

control means for performing control for forcedly moving said first lens means to a lens-focusable focal length area in the case that the setting of the second mode is detected by said detecting means; and signal processing means for performing when the mode is set, reversal processing of the electrical signal obtained from said image pickup means.

8. An image pickup apparatus comprising:

image pickup means for converting a subject image into an electrical signal via an optical system;

lens means for performing focus adjustment of the optical system;

extracting means for extracting an in-focus degree signal according to an in-focus degree of said optical system from the electrical signal;

setting means for selectively setting a first mode in which a photographing distance is not restricted and a second mode in which a photographing distance is fixed at a specified position, said setting means setting the second mode when a color signal obtained by processing the electrical signal is in a predetermined area; and control means for performing focus adjustment by moving said lens means on the basis of the in-focus degree signal said control means being arranged to perform, during the focus adjustment, focus adjustment which differs in characteristic between the first mode and the second mode.

9. An image pickup apparatus comprising:

image pickup means for converting a subject image into an electrical signal via an optical system;

lens means for performing focus adjustment of the optical system;

extracting means for extracting an in-focus degree signal according to an in-focus degree of said optical system from the electrical signal;

setting means for selectively setting a first mode in which a photographing distance is not restricted and a second mode in which a photographing distance is fixed at a specified position;

control means for performing focus adjustment by moving said lens means on the basis of the in-focus degree signal said control means being arranged to perform, during the focus adjustment, focus adjustment which differs in characteristic between the first mode and the second mode; and signal processing means for providing a positive image by performing reversal processing of the electrical signal during setting of the second mode.

10. An image pickup apparatus comprising:

image pickup means for converting a subject image into an electrical signal via an optical system;

lens means for performing focus adjustment of the optical system;

extracting means for extracting an in-focus degree signal according to an in-focus degree of said optical system from the electrical signal;

setting means for selectively setting a first mode in which a photographing distance is not restricted and a second mode in which a photographing distance is fixed at a specified position, said setting means setting the second mode when removable adapter means for holding the subject at the predetermined distance is attached; and control means for performing focus adjustment by moving said lens means on the basis of the in-focus degree signal, said control means being arranged to perform, during the focus adjustment, a restart operation after an in-focus state has been obtained, which restart operation is based on focus adjustment which differs between the first mode and the second mode.

11. An image pickup apparatus comprising;

image pickup means for converting a subject image into an electrical signal via an optical system;

lens means for performing focus adjustment of the optical system;

extracting means for extracting an in-focus degree signal according to an in-focus degree of said optical system from the electrical signal;

setting means for selectively seeing a first mode in which a photographing distance is not restricted and a second mode in which a photographing distance is fixed at a specified position, said setting means setting the second mode when a color signal obtained by processing the electrical signal is in a predetermined area; and control means for performing focus adjustment by moving said lens means on the basis of the in-focus degree signal, said control means being arranged to perform, during the focus adjustment, a restart operation after an in-focus state has been obtained, which restart operation is based on focus adjustment which differs between the first mode and the second mode.

12. An image pickup apparatus comprising:

image pickup means for converting a subject image into an electrical signal via an optical system;

lens means for performing focus adjustment of the optical system;

extracting means for extracting an in-focus degree signal according to an in-focus degree of said optical system from the electrical signal;

setting means for selectively setting a first mode in which a photographing distance is not restricted and a second mode in which a photographing distance is fixed at a specified position;

control means for performing focus adjustment by moving said lens means on the basis of the in-focus degree signal, said control means being arranged to perform, during the focus adjustment, a restart operation after an in-focus state has been obtained, which restart operation is based on focus adjustment which differs between the first mode and the second mode; and signal processing means for providing a positive image by performing reversal processing of the electrical signal during setting of the second mode.

13. An image pickup apparatus comprising:

image pickup means for converting a subject image into an electrical signal via an optical system;

lens means for performing focus adjustment of the optical system;

setting means for selectively setting a first mode in which a photographing distance is not restricted and a second mode in which a photographing distance is fixed at a specified position, said setting means setting the second mode when removable adapter means for holding the subject at the predetermined distance is attached;

extracting means for extracting an in-focus degree signal according to an in-focus degree of said optical system from an area of the electrical signal, which area is determined according to each of the first and second modes in such a manner as to differ between the first and second modes; and control means for performing focus adjustment by moving said lens means on the basis of the in-focus degree signal.

14. An image pickup apparatus comprising:

image pickup means for converting a subject image into an electrical signal via an optical system;

lens means for performing focus adjustment of the optical system;

setting means for selectively setting a first mode in which a photographing distance is not restricted and a second mode in which a photographing distance is fixed at a specified position, said setting means setting the second mode when a color signal obtained by processing the electrical signal is in a predetermined area;

extracting means for extracting an in-focus degree signal according to an in-focus degree of said optical system from an area of the electrical signal, which area is determined according to each of the first and second modes in such a manner as to differ between the first and second modes; and control means for performing focus adjustment by moving said lens means on the basis of the in-focus degree signal.

15. An image pickup apparatus comprising:

image pickup means for converting a subject image into an electrical signal via an optical system;

lens means for performing focus adjustment of the optical system;

setting means for selectively setting a first mode in which a photographing distance is not restricted and a second mode in which a photographing distance is fixed at a specified position;

extracting means for extracting an in-focus degree signal according to an in-focus degree of said optical system from an area of the electrical signal, which area is determined according to each of the first and second modes in such a manner as to differ between the first and second modes;

control means for performing focus adjustment by moving said lens means on the basis of the in-focus degree signal; and signal processing means for providing a positive image by performing reversal processing of the electrical signal during setting of the second mode.

16. An image pickup apparatus according to claim 5, 6 or 7, further comprising memory means for storing in-focus positions of said second lens means relative to positions of said first lens means according to subject distances, and computing means for finding an in-focus position of said second lens means relative to a movement of said first lens means on the basis of positions of said respective first and second lens means and information stored in said memory means, said control means performing focus adjustment for moving said second lens means to said in-focus position, in association with said control.

17. An image pickup apparatus according to claim 1, 3, 4, 5, 6 or 7, further comprising informing means for informing a user that said control means is performing said control.

18. An image pickup apparatus according to claim 1, 3, 4, 5, 6 or 7, wherein the subject located at the predetermined distance is a photographic film.

19. An image pickup apparatus according to claim 18, wherein the photographic film is a negative film.

20. An image pickup apparatus according to claim 2, 8 or 9 wherein said control means moves said lens means while vibrating said lens means with a small amplitude, said control means being arranged to perform, when moving said lens means, the focus adjustment which differs in characteristic, by causing the small amplitude to differ between the first mode and the second mode.

21. An image pickup apparatus according to claim 2, 8 or 9, wherein said control means performs hill-climbing focus adjustment, said control means being arranged to perform, during the hill-climbing focus adjustment, the focus adjustment which differs in characteristic, by causing a moving speed of said lens means to differ between the first mode and the second mode.

22. An image pickup apparatus according to claim 2, 8 or 9, wherein said control means performs hill-climbing focus adjustment, said control means being arranged to perform, during the hill-climbing focus adjustment, the focus adjustment which differs in characteristic, by causing an amount of decrease in the in-focus degree signal for determining whether the in-focus degree signal has passed a peak to differ between the first mode and the second mode.

23. An image pickup apparatus according to claim 2, 8 or 9, wherein said control means performs hill-climbing focus adjustment, said control means being arranged to perform, during the hill-climbing focus adjustment, the focus adjustment which differs in characteristic, by immediately stopping said lens means during the second mode without reconfirming the in-focus degree signal.

24. An image pickup apparatus according to claim 2, 8 or 9, wherein said control means performs hill-climbing focus adjustment, said control means being arranged to perform, during the hill-climbing focus adjustment, the focus adjustment which differs in characteristic, by causing a time period during which the in-focus degree signal varies until focus adjustment is restarted after said lens means has been stopped to differ between the first mode and the second mode.

25. An image pickup apparatus according to claim 10, 11 or 12, wherein said control means performs hill-climbing focus adjustment, said control means being arranged to perform the restart operation when an operation of any key occurs with said lens means being in a stopped state in which an in-focus state is obtainable during the second mode.

26. An image pickup apparatus according to claim 14, wherein said setting means sets the second mode when said lens means lies in a predetermined area.

* * * * *

UNITED STATES PATENT AND TRADEMARK OFFICE
CERTIFICATE OF CORRECTION

PATENT NO. : 6,433,824 B1
DATED : August 13, 2002
INVENTOR(S) : Taeko Tanaka et al.

It is certified that error appears in the above-identified patent and that said Letters Patent is hereby corrected as shown below:

Title page,
Item [30], Foreign Application Priority Data, delete "Dec. 9, 1906" and insert -- Dec. 27, 1996 --; delete "80-349313" and insert -- 08-349313 --; delete "HEI08-349312" and insert -- 08-349312 --.

Column 1,
Line 38, delete "film;" and insert -- film --.

Column 5,
Line 40, delete "according,to" and insert -- according to --.

Column 17,
Line 65, delete "(B0, b1, ...)" and insert -- (b0, b1, ...) --.

Column 25,
Line 27, after "when" delete "a".

Column 28,
Line 65, delete "a," and insert -- a' --.

Column 29,
Line 65, delete "302,," and insert -- 302, --.

Column 32,
Line 46, delete "f!rom" and insert -- from --.

Column 40,
Line 16, delete "predetermine" and insert -- predetermined --.

Signed and Sealed this

Twenty-eighth Day of October, 2003

JAMES E. ROGAN
*Director of the United States Patent and Trademark Office*